US011782771B2

United States Patent
Jha et al.

(10) Patent No.: US 11,782,771 B2
(45) Date of Patent: Oct. 10, 2023

(54) METHOD AND SUBSYSTEM WITHIN A DISTRIBUTED LOG-ANALYTICS SYSTEM THAT AUTOMATICALLY DETERMINES AND ENFORCES LOG-RETENTION PERIODS FOR RECEIVED LOG-EVENT MESSAGES

(71) Applicant: VMware, Inc., Palo Alto, CA (US)

(72) Inventors: Ritesh Jha, Karnataka (IN); Jobin Raju George, Karnataka (IN); Pushkar Patil, Karnataka (IN); Vaidic Joshi, Karnataka (IN); Nikhil Jaiswal, Karnataka (IN)

(73) Assignee: VMware, Inc., Palo Alto, CA (US)

( * ) Notice: Subject to any disclaimer, the term of this patent is extended or adjusted under 35 U.S.C. 154(b) by 97 days.

(21) Appl. No.: 17/326,169

(22) Filed: May 20, 2021

(65) Prior Publication Data

US 2022/0374292 A1  Nov. 24, 2022

(51) Int. Cl.
*G06F 9/54* (2006.01)
*G06F 16/18* (2019.01)
*G06F 9/50* (2006.01)

(52) U.S. Cl.
CPC ............ *G06F 9/542* (2013.01); *G06F 9/5072* (2013.01); *G06F 9/546* (2013.01); *G06F 16/1805* (2019.01)

(58) Field of Classification Search
CPC ........ G06F 9/542; G06F 9/546; G06F 9/5072; G06F 16/1805
See application file for complete search history.

(56) References Cited

U.S. PATENT DOCUMENTS

| | | | | |
|---|---|---|---|---|
| 2005/0055422 A1* | 3/2005 | Campbell | .............. | G06Q 30/04 709/217 |
| 2005/0144520 A1* | 6/2005 | Tuma | ...................... | G06F 16/27 714/E11.121 |
| 2006/0271784 A1* | 11/2006 | Bolosky | ................ | H04L 51/212 713/170 |
| 2007/0010241 A1* | 1/2007 | Wachter | ................ | H04W 24/00 455/423 |
| 2009/0006061 A1* | 1/2009 | Thukral | .................. | G16H 50/20 703/11 |
| 2009/0055489 A1* | 2/2009 | Agarwal | .............. | G06Q 10/107 709/206 |
| 2009/0089390 A1* | 4/2009 | Fein | ......................... | G06F 15/16 709/207 |
| 2009/0216698 A1* | 8/2009 | Bouchard | .............. | G06N 20/00 706/46 |

(Continued)

*Primary Examiner* — Tuan C Dao

(57) ABSTRACT

The current document is directed to methods and systems that efficiently process and store log/event messages generated within distributed computer facilities. Various different types of initial processing steps may be applied to a stream of log/event messages received by a message-collector system or a message-ingestion-and-processing subsystem. The currently disclosed methods and systems employ additional pre-processing steps to identify the types of received log/event messages, monitor event-type-associated log/event-message-usage-delay histories, and employ time-series-analysis-based and/or neural-network-based estimation of event-type-associated log/event-message usage to efficiently store log/event-messages in low-cost and low-latency storage facilities.

20 Claims, 79 Drawing Sheets

(56) References Cited

U.S. PATENT DOCUMENTS

| | | | |
|---|---|---|---|
| 2017/0019312 A1* | 1/2017 | Meyer | G06N 20/00 |
| 2018/0158099 A1* | 6/2018 | Ford | G06Q 30/0246 |
| 2018/0349221 A1* | 12/2018 | Harutyunyan | G06F 11/079 |
| 2019/0155953 A1* | 5/2019 | Brown | G06F 16/9038 |
| 2019/0199659 A1* | 6/2019 | Jain | H04L 67/55 |
| 2021/0216517 A1* | 7/2021 | Graefe | G06F 16/2246 |

* cited by examiner

```
2013-12-02T10:44:24.095Z li-qe-esx5.vmware.com Rhttpproxy:
[28989B90 verbose 'Proxy Req 46691'] Connected to
localhost:8307 ——1112                          1106

2013-12-02T10:44:24.094Z li-qe-esx5.vmware.com Rhttpproxy:
[FFFC2B90 verbose 'Proxy Req 46691'] new proxy client
TCP (local=127.0.0.1:80, peer=127.0.0.1:50155)

2013-12-02T10:44:24.093Z li-qe-esx5.vmware.com Rhttpproxy:
[28989B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'halservices' opID=WFU-ed393333]
[VpxaHalServices] VMGuestDiskChange Event for vm(6) 59

2013-12-02T18:48:51.395Z strata-esx1.eng.vmware.com Vpxa:
[65B5AB90 verbose 'hostdvm' opID=WFU-ed393333]
[VpxaHalVmHostagent] 59: GuestInfo changed 'guest.disk'

2013-12-02T18:48:51.395Z strata-esx1.eng.vmware.com Vpxa:
[65B5AB90 verbose 'VpxaHalCnxHostagent' opID=WFU-ed393333]
[VpxaHalCnxHostagent::ProcessUpdate] Applying updates from
123718 to 123719 (at 123718)

2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Received callback
2013-12-02T18:48:51.360Z li-dev-esx6.eng.vmware.com Hostd:
[617C1B90 error 'SoapAdapter.HTTPService'] HTTP Transaction
```

FIG. 11

| | criteria | action | parameters |
|---|---|---|---|
| rule 1 | includes (msg, "phrase_1") AND NOT includes (msg, "term_1") AND field (msg, field_type_1) == "phrase_2" OR includes (msg, "phrase_1") AND includes (msg, "term_2") | Forward | destinations = {add1, add2, add3, add4} |
| rule 2 | includes (msg, "phrase_3") AND field (msg, field_type_2) == "phrase_4" AND field (msg, field_type_3) > 10 | Sample | 1 : 10 |
| ... | ... | ... | ... |
| rule n | field (msg, field_type_2367) == "phrase_3761" AND includes (msg, "term_4617") OR includes (msg, "phrase_3762") AND field (msg, field_type_2367) == "phrase_3763" | Drop | |

FIG. 19

| 2020-07-30T 13:17:39 – 08:00 | INFO | [TransApp] | : | T-comp | : | ID-a3651f8 |

Timestamp — 2304    Level    Application    Action    Transaction ID

```
          ⎰ 2308
         2306
YEAR            (?>\d\d){1,2}
MONTHNUM        (?:0?[1-9]|1[0-2])
MONTHDAY        (?:(?:0[1-9])|(?:[12][0-9])|(?:3[01]))[1-9])
HOUR            (?:2[0123]|[01]?[0-9])
MINUTE          (?:[0-5][0-9])
SECOND          (?:(?:[0-5]?[0-9]|60)(?:[.,][0-9]+)?)
ISO8601_TIMEZONE (?:Z|[+-]?%{HOUR}(?::?%{MINUTE}))
TIMESTAMP_ISO8601 %{YEAR}-%{MONTHNUM}-%{MONTHDAY}[T ]%{HOUR}:?%{MINUTE}(?::?%{SECOND})?%
                 {ISO8601_TIMEZONE}?
2312⎿

LOGLEVEL ([Aa]lert|ALERT|[Tt]race|TRACE|[Dd]ebug|DEBUG|[Nn]otice|NOTICE|[Ii]nfo|INFO|[Ww]arn?
         (?:ing)?|WARN?(?:ING)?|[Ee]rr?(?:or)?|ERR?(?:OR)?|[Cc]rit?(?:ical)?|CRIT?(?:ICAL)
         ?|[Ff]atal|FATAL|[Ss]evere|SEVERE|EMERG(?:ENCY)?|[Ee]merg(?:ency)?)
                                                                                          ⎱
                                                                                         2310
DATA .*?
```

FIG. 23B

```
typedef vector<node> Layer;
typedef double(*ActivationFunction)(double x);
class node;
typedef node* NodePtr;
```
— 2602

```
class node
{
    private:
        double output;                          — 2606
        ActivationFunction g;                   — 2607
        vector<double> weights;                 — 2608
        vector<NodePtr> inputs;                 — 2609
    public:
        void activate();                        — 2610
        void setOutput(double out){output = out;}
        double getOutput() { return output;}
};
```
— 2604, 2612

```
class neuralNet
{
    private:
        int numLayers;                          — 2616
        vector<Layer> layers;                   — 2618
    public:
        void f(vector<double> x, vector<double>& y);
};
```
— 2614, 2620

```
void node::activate()
{
    int j;
    double sum = weights[0] * -1;

for (j = 0; j < inputs.getDimension(); j++)
        sum += inputs[j]->getOutput() * weights[j+1];
    output = g(sum);
}
```
— 2622

```
void neuralNet::f(vector<double> x, vector<double>& y)
{
    int i, j;

for (j = 0; j < layers[0].getDimension(); j++) layers[0][j].setOutput(x[j]);   — 2626 for (i = 1; i < numLayers; i++)
        for (j = 0; j < layers[i].getDimension(); j++)                              — 2627
            layers[0][j].activate();

for (j = 0; j < layers[numLayers - 1].getDimension(); j++)                      — 2628
        y[j] = layers[numLayers - 1][j].getOutput();
}
```
— 2624

FIG. 26

$$E = \frac{1}{2}\left(\text{length}\left(y - \hat{f}(x)\right)\right)^2$$

$$= \frac{1}{2}\left(y - \hat{f}(x)\right) \cdot \left(y - \hat{f}(x)\right)$$

$$= \frac{1}{2}\sum_i \left(y_i - \hat{f}(x)_i\right)^2$$

$$= \frac{1}{2}\sum_i (y_i - a_i)^2, \text{where } i \in \text{output nodes}$$

$\Big\}$ 2802

$$\frac{\partial E}{\partial w_{i,j}} = \frac{\partial}{\partial w_{i,j}}\left(\frac{1}{2}\sum_k (y_k - a_k)^2\right), \text{where } k \in \text{output nodes}$$

$$= -(y_i - a_i)\frac{\partial a_i}{\partial w_{i,j}}$$

$$= -\left(y_i - g\left(\sum_j a_j w_{i,j}\right)\right)\frac{\partial}{\partial w_{i,j}}g\left(\sum_j a_j w_{i,j}\right)$$

$$= -\left(y_i - g\left(\sum_j a_j w_{i,j}\right)\right)g'\left(\sum_j a_j w_{i,j}\right)\frac{\partial}{\partial w_{i,j}}\left(\sum_j a_j w_{i,j}\right)$$

$$= -\left(y_i - g\left(\sum_j a_j w_{i,j}\right)\right)g'\left(\sum_j a_j w_{i,j}\right)a_j$$

$\Big\}$ 2804

$$g(x) = \frac{1}{1 + e^{-x}}$$

$$\frac{d}{dx}g(x) = -(1 + e^{-x})^{-2}(-e^{-x})$$

$$= \frac{e^{-x}}{(1 + e^{-x})^2} = \frac{1 + e^{-x} - 1}{(1 + e^{-x})^2} = \frac{1}{1 + e^{-x}} - \frac{1}{(1 + e^{-x})^2}$$

$$= \left(\frac{1}{1 + e^{-x}}\right)\left(1 - \frac{1}{1 + e^{-x}}\right)$$

$$= g(x)(1 - g(x))$$

$\Big\}$ 2806

$$\frac{\partial E}{\partial w_{i,j}} = -(y_i - a_i)(a_i(1 - a_i))a_j$$

$$= -a_j\Delta_i$$

$\Big\}$ 2808

$$w'_{i,j} = w_{i,j} + r(a_j\Delta_i) \quad \text{— 2810}$$

FIG. 28A $$\frac{\partial E}{\partial w_{j,k}} = -\sum_i (y_i - a_i) \frac{\partial a_i}{\partial w_{j,k}}$$

$$= -\sum_i (y_i - a_i) \frac{\partial}{\partial w_{j,k}} g\left(\sum_j a_j w_{i,j}\right)$$

$$= -\sum_i (y_i - a_i) g'\left(\sum_j a_j w_{i,j}\right) \frac{\partial}{\partial w_{j,k}}\left(\sum_j a_j w_{i,j}\right)$$

$$= -\sum_i (y_i - a_i) (a_i(1 - a_i)) w_{i,j} \frac{\partial a_j}{\partial w_{j,k}}$$

$$= -\sum_i \Delta_i w_{i,j} \frac{\partial a_j}{\partial w_{j,k}}$$

$$= -\sum_i \Delta_i w_{i,j} \frac{\partial}{\partial w_{j,k}} g\left(\sum_k a_k w_{j,k}\right)$$

$$= -\sum_i \Delta_i w_{i,j} g'\left(\sum_k a_k w_{j,k}\right) \frac{\partial}{\partial w_{j,k}}\left(\sum_k a_k w_{j,k}\right)$$

$$= -\sum_i \Delta_i w_{i,j} g'\left(\sum_k a_k w_{j,k}\right) a_k$$

$$= -\sum_i \Delta_i w_{i,j} \left(a_j(1 - a_j)\right) a_k$$

$$= -\sum_i \Delta_i w_{i,j} \Delta_j a_k$$

$$= -a_k \Delta_{i,j}$$

$$w_{j,k} = w_{j,k} + r(a_k \Delta_{i,j})$$

FIG. 28B

3241 — $Bz_t \rightarrow z_{t-1}$      $B^2 z_t = z_{t-2}$
3242 — $Fz_t \rightarrow z_{t+1}$      $F^2 z_t = z_{t+2}$
3243 — $\nabla z_t \rightarrow z_t - z_{t-1}$      $\nabla^2 z_t = z_t - 2z_{t-1} + z_{t-2}$
3244 — $\nabla z_t \rightarrow (1-B)z_t$ $\left.\begin{array}{l}(1-\phi_1 B - \phi_2 B^2 - \cdots - \phi_p B^p)\tilde{z}_t = a_t \\ \phi(B)\tilde{z}_t = a_t, \text{ where } \phi(B) = (1-\phi_1 B - \phi_2 B^2 - \cdots - \phi_p B^p)\end{array}\right\}$ 3240

3245
3246

$z_t = (1 - \theta_1 B - \theta_2 B^2 - \cdots - \theta_q B^q)a_t$ — 3247
$z_t = \theta(B)a_t$, where $\theta(B) = (1 - \theta_1 B - \theta_2 B^2 - \cdots - \theta_q B^q)$ — 3248

$\left.\begin{array}{l}\tilde{z}_t = \phi_1 \tilde{z}_{t-1} + \cdots + \phi_p \tilde{z}_{t-p} + a_t - \theta_1 a_{t-1} - \cdots - \theta_q a_{t-q} \\ \phi(B)\tilde{z}_t = \theta(B)a_t \\ \text{where } \phi(B)\tilde{z}_t = \phi(B)(1-B)^d z_t\end{array}\right\}$ 3250

3249

3251 — $\phi(B)\nabla^d z_t = \theta(B)a_t$
$z_t = (\phi(B)\nabla^d)^{-1}\theta(B)a_t$ — 3252
$z_t = f(a_t, a_{t-1}, \ldots, z_{t-1}, z_{t-2}, \ldots)$ — 3253
$\hat{z}_{t+1} = f^*(a_t, a_{t-1}, \ldots, z_{t-1}, z_{t-2}, \ldots)$ — 3254

FIG. 32E

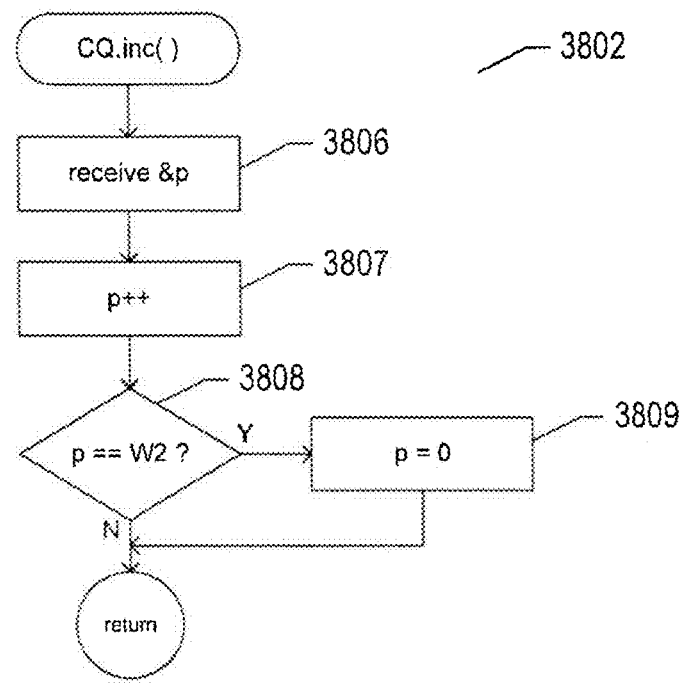
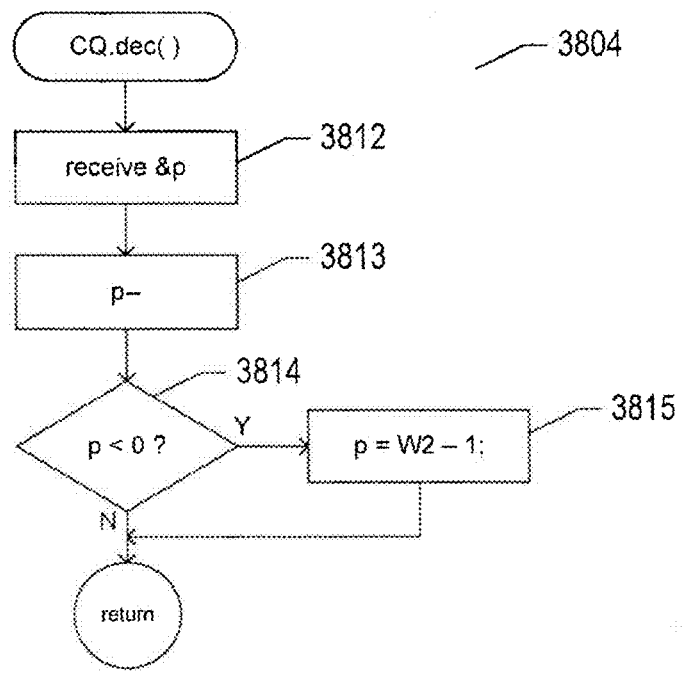
FIG. 38

METHOD AND SUBSYSTEM WITHIN A DISTRIBUTED LOG-ANALYTICS SYSTEM THAT AUTOMATICALLY DETERMINES AND ENFORCES LOG-RETENTION PERIODS FOR RECEIVED LOG-EVENT MESSAGES

TECHNICAL FIELD

The current document is directed to distributed-computer-systems and, in particular, to methods and systems that efficiently process and store log/event messages generated within distributed computer facilities.

BACKGROUND

During the past seven decades, electronic computing has evolved from primitive, vacuum-tube-based computer systems, initially developed during the 1940s, to modern electronic computer systems in which large numbers of multi-processor servers, work stations, and other individual computer systems are networked together with large-capacity data-storage devices and other electronic devices to produce geographically distributed computer systems with hundreds of thousands, millions, or more components that provide enormous computational bandwidths and data-storage capacities. These large, distributed computer systems are made possible by advances in computer networking, distributed operating systems and applications, data-storage appliances, and computer-hardware and computer-software technologies. However, despite all of these advances, the rapid increase in the size and complexity of computer systems has been accompanied by numerous scaling issues and technical challenges, including technical challenges associated with communications overheads encountered in parallelizing computational tasks among multiple processors, component failures, and distributed-computer-system management. As new distributed-computing technologies are developed, and as general hardware and software technologies continue to advance, the current trend towards ever-larger and more complex distributed computer systems appears likely to continue well into the future.

As the complexity of distributed computer systems has increased, the management and administration of distributed computer systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management-and-administration facilities related to distributed computer systems are seeking new approaches to implementing automated management-and-administration facilities and functionalities.

SUMMARY

The current document is directed to methods and systems that efficiently process and store log/event messages generated within distributed computer facilities. Various different types of initial processing steps may be applied to a stream of log/event messages received by a message-collector system or a message-ingestion-and-processing subsystem. The currently disclosed methods and systems employ additional pre-processing steps to identify the types of received log/event messages, monitor event-type-associated log/event-message-usage-delay histories, and employ time-series-analysis-based and/or neural-network-based estimation of event-type-associated log/event-message usage to efficiently store log/event-messages in low-cost and low-latency storage facilities.

BRIEF DESCRIPTION OF THE DRAWINGS

FIG. 11 shows a small, 11-entry portion of a log file from a distributed computer system.

FIG. 19 illustrates processing rules that specify various types of initial log/event-message processing.

FIGS. 23A-C illustrate one approach to extracting fields from a log/event message.

FIG. 26 provides a concise pseudocode illustration of the implementation of a simple feed-forward neural network.

FIGS. 28A-B show the details of the weight-adjustment calculations carried out during back propagation.

FIGS. 32A-F illustrate metric-value prediction based on the autoregressive-integrated-moving-average ("ARIMA") model.

FIG. 38 illustrates two routines used to update the pointers cDay, w1, and w2 associated with the CQ of an ETUH.

DETAILED DESCRIPTION

Figure 1:
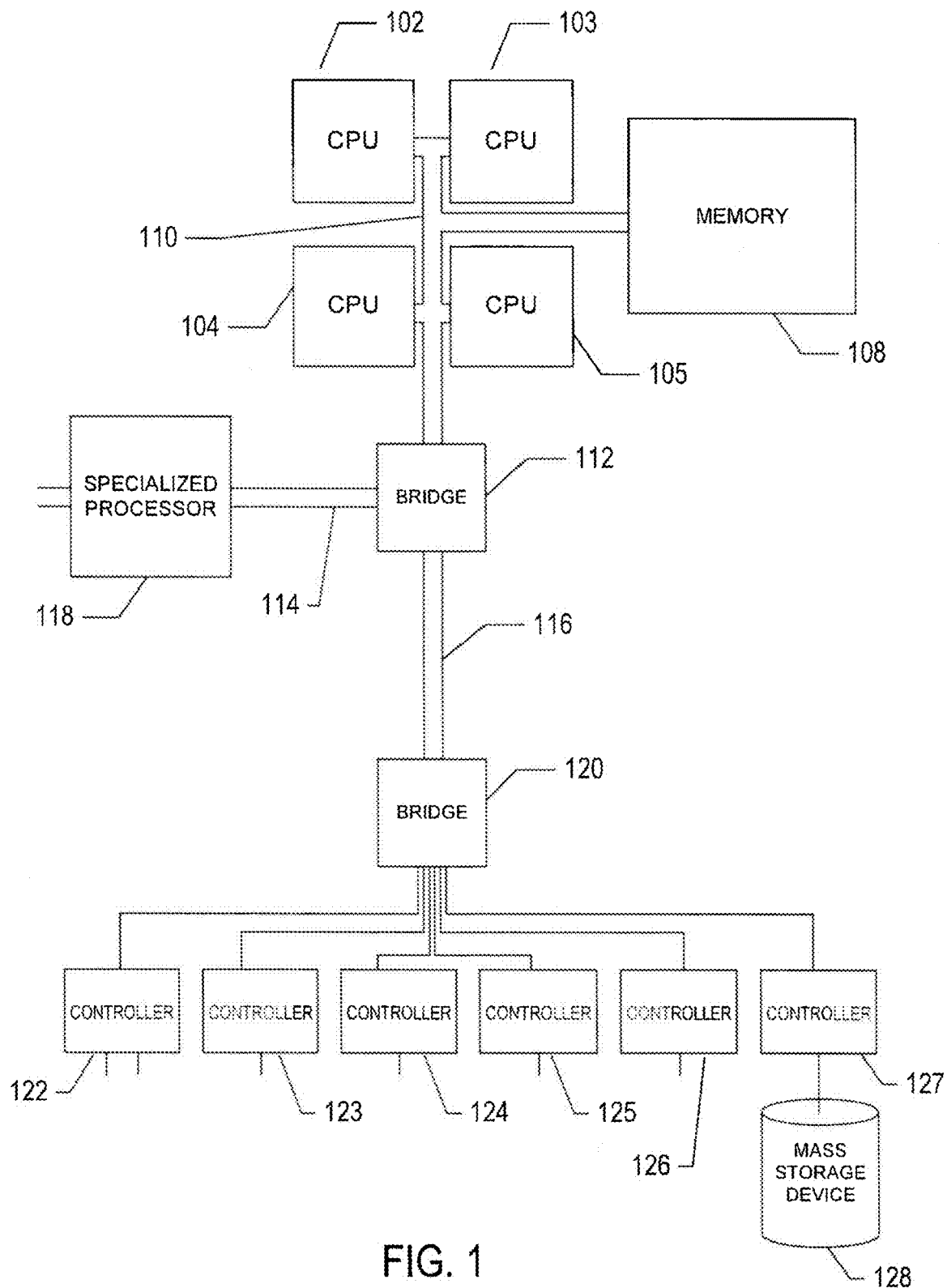
FIG. 1 provides a general architectural diagram for various types of computers.

The current document is directed to methods and systems that that efficiently process log/event messages generated within distributed computer facilities. In a first subsection, below, a detailed description of computer hardware, complex computational systems, and virtualization is provided with reference to FIGS. 1-10. In a second subsection, an overview of distributed log-analytics systems is provided with reference to FIGS. 11-23C. In a third subsection, neural networks are discussed with reference to FIGS. 24-31B. In a fourth subsection, time-series analysis is discussed with reference to FIGS. 32A-32F. In a fifth subsection, the currently disclosed methods and systems are discussed with reference to FIGS. 33A-41F.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction." when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
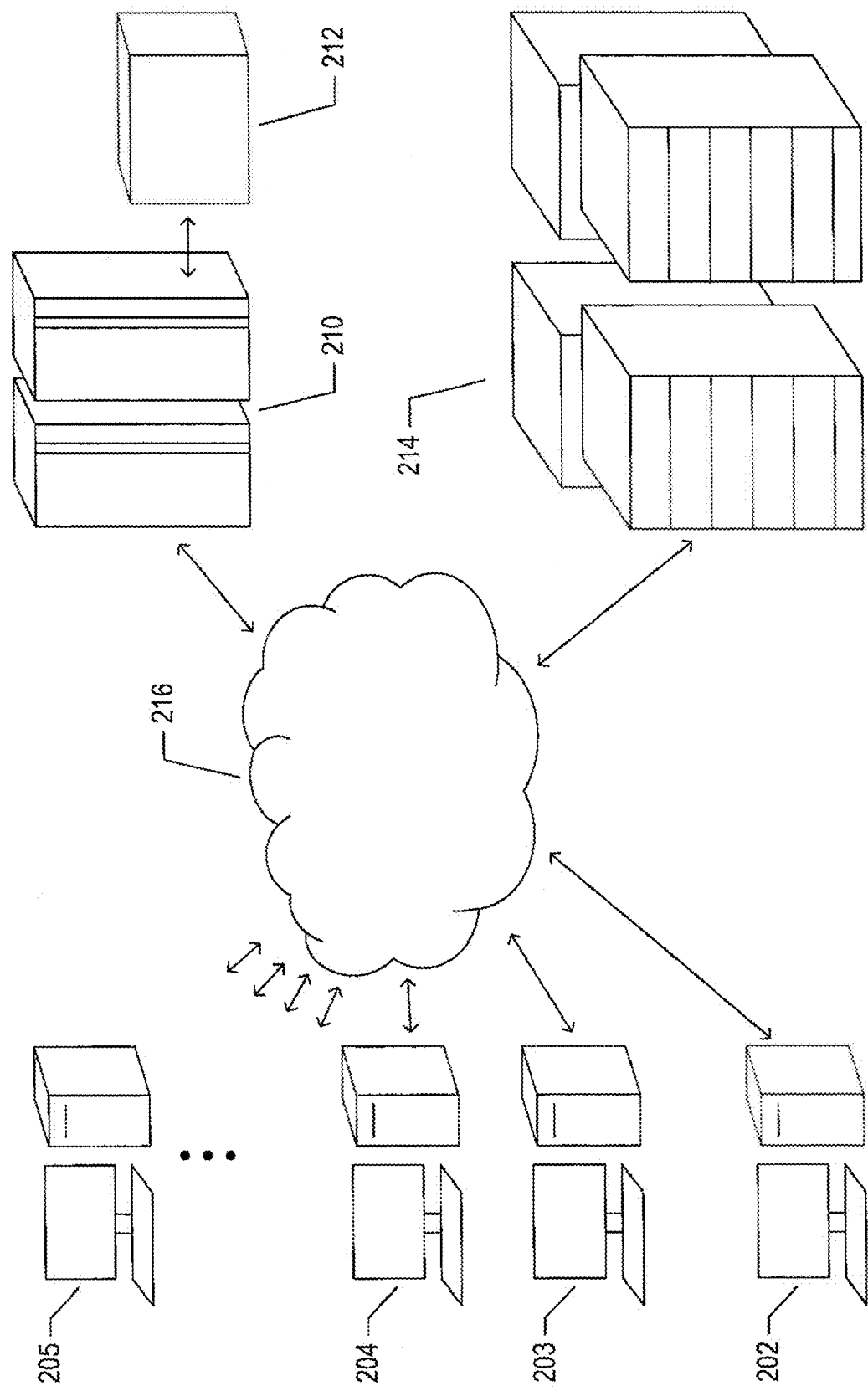
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
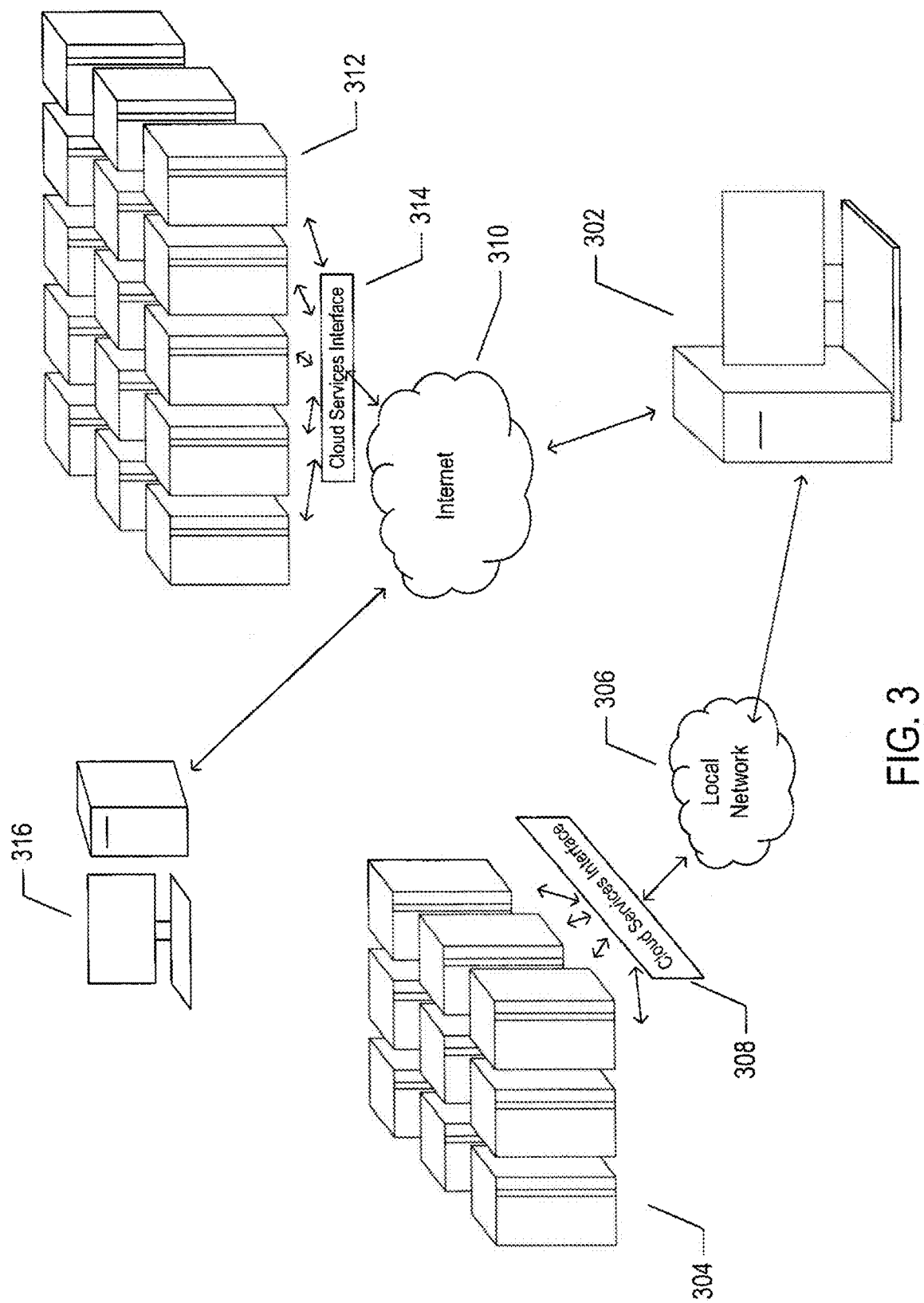
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
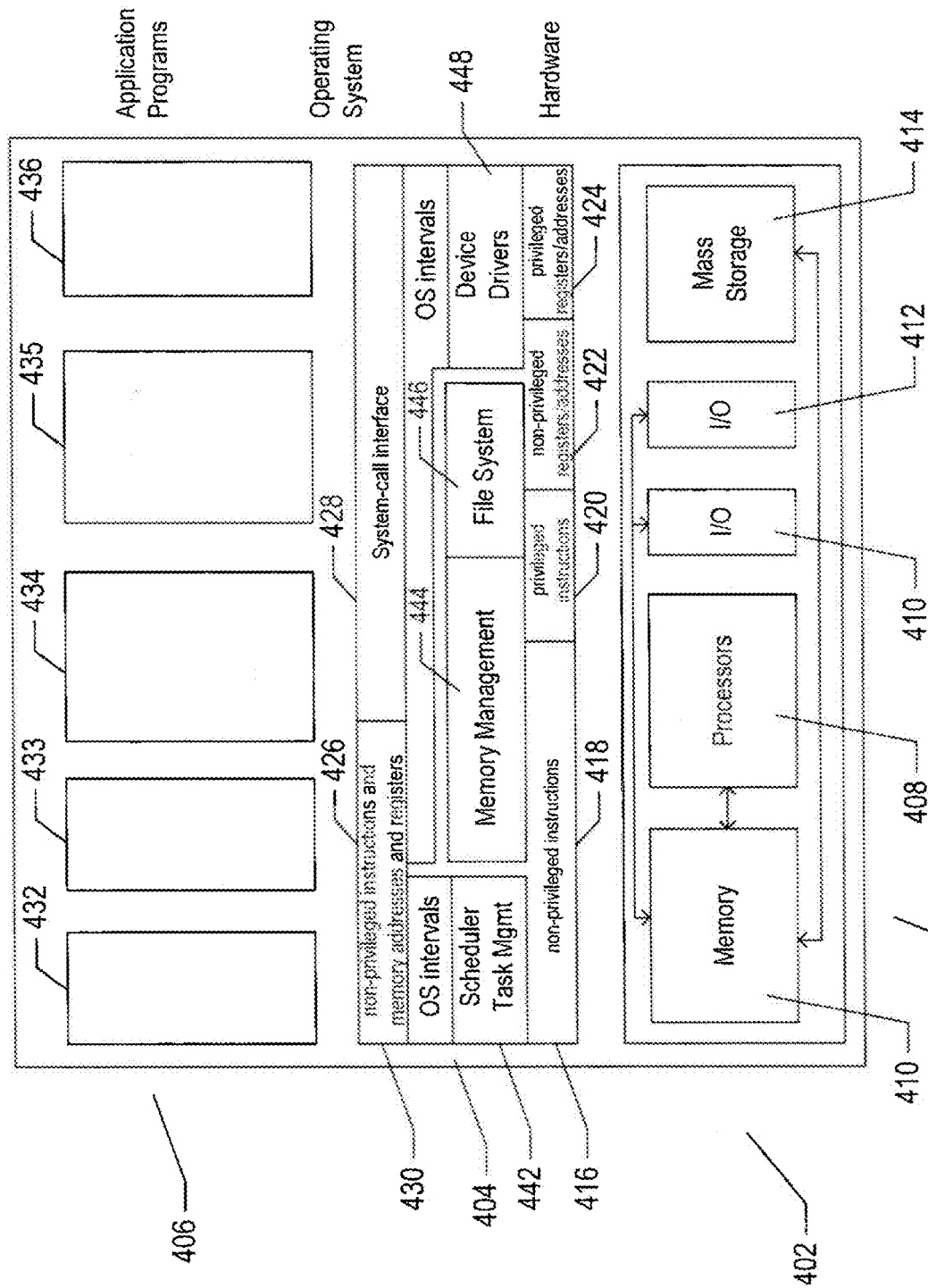
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
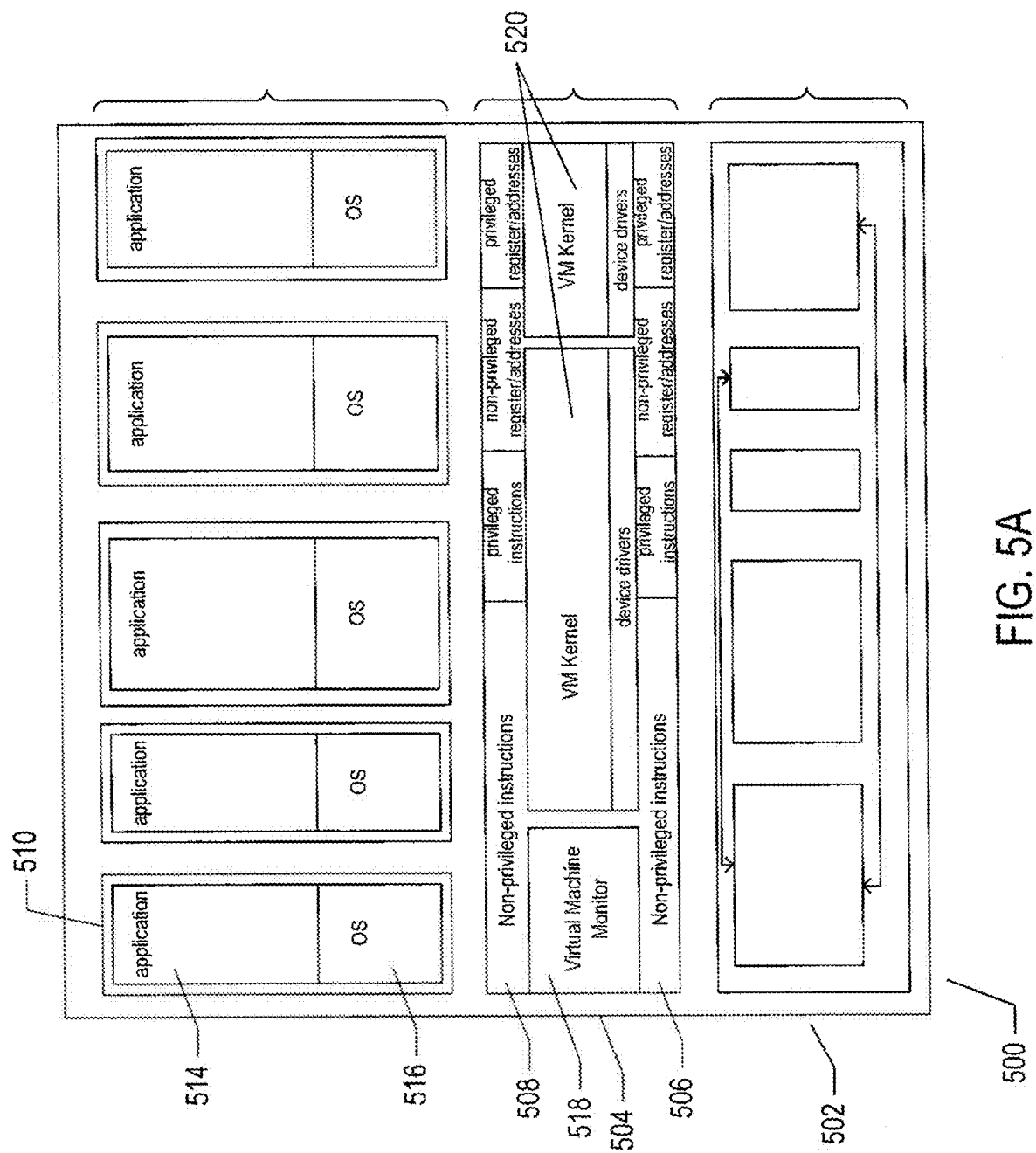
FIGS. 5A-D illustrate two types of virtual machine and virtual-machine execution environments.
Figure 5B:
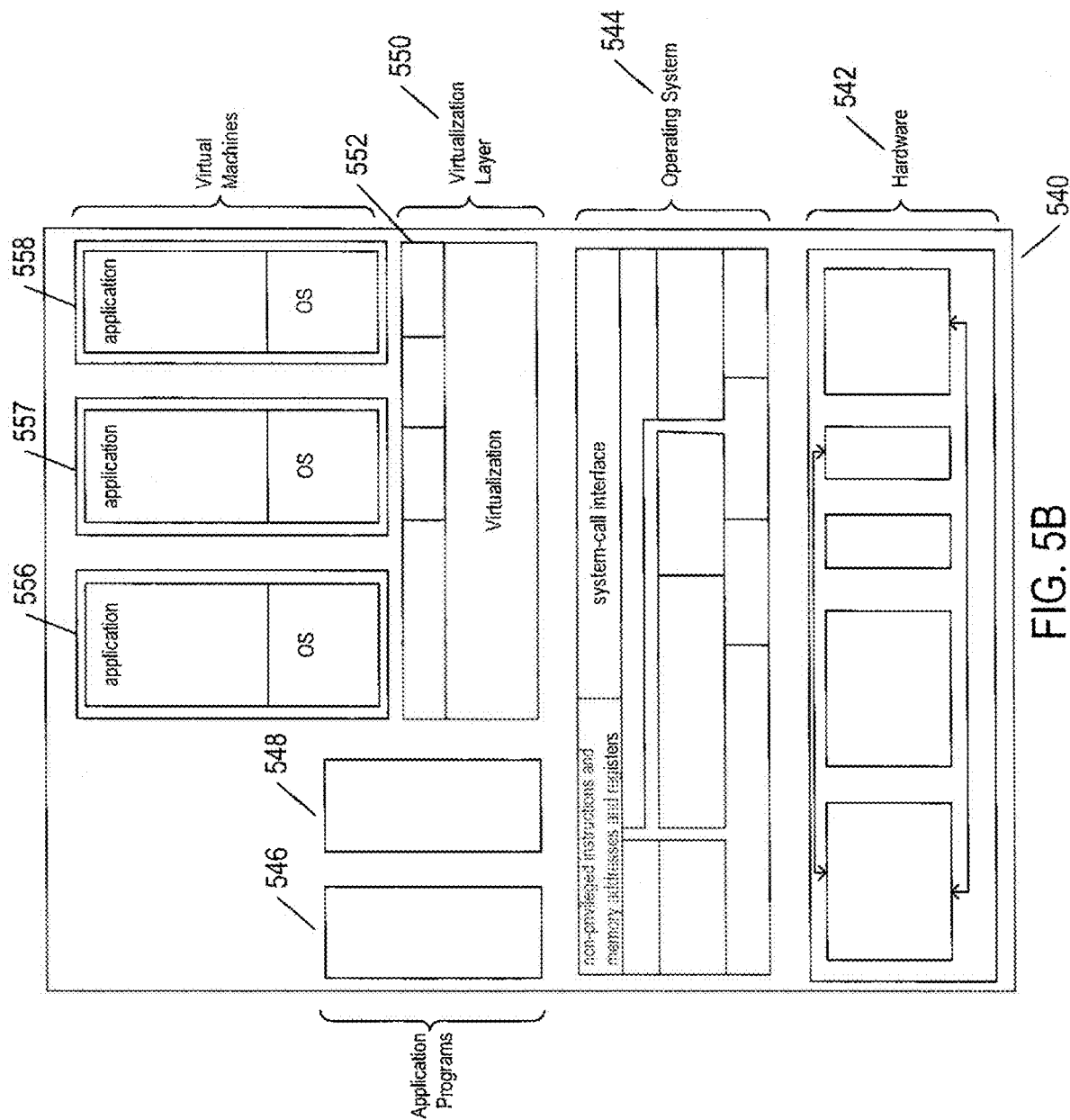

For all of these reasons, a higher level of abstraction, referred to as the "virtual machine," has been developed and evolved to further abstract computer hardware in order to address many difficulties and challenges associated with traditional computer systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
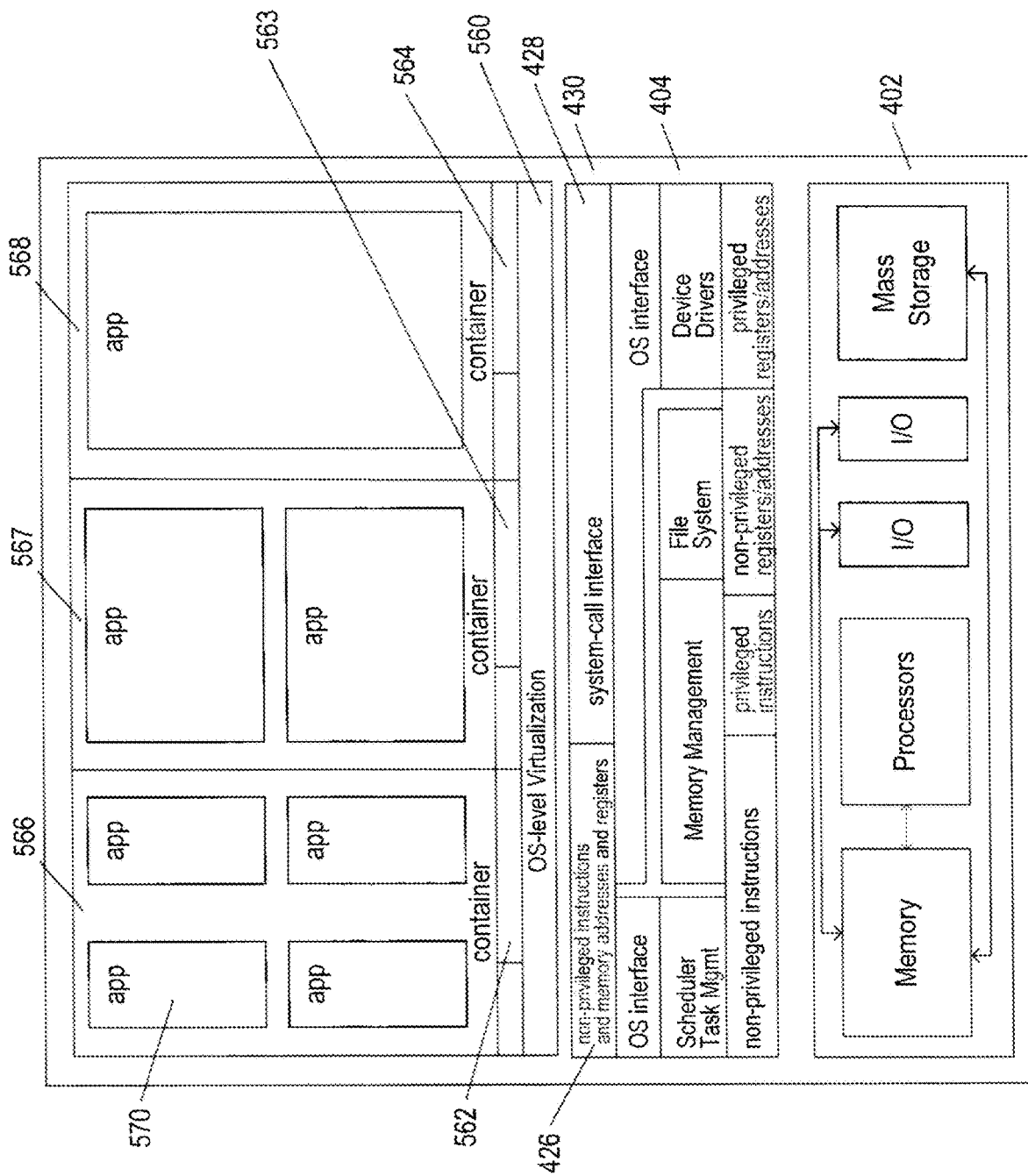

While the traditional virtual-machine-based virtualization layers, described with reference to FIGS. 5A-B, have enjoyed widespread adoption and use in a variety of different environments, from personal computers to enormous, distributed computer systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
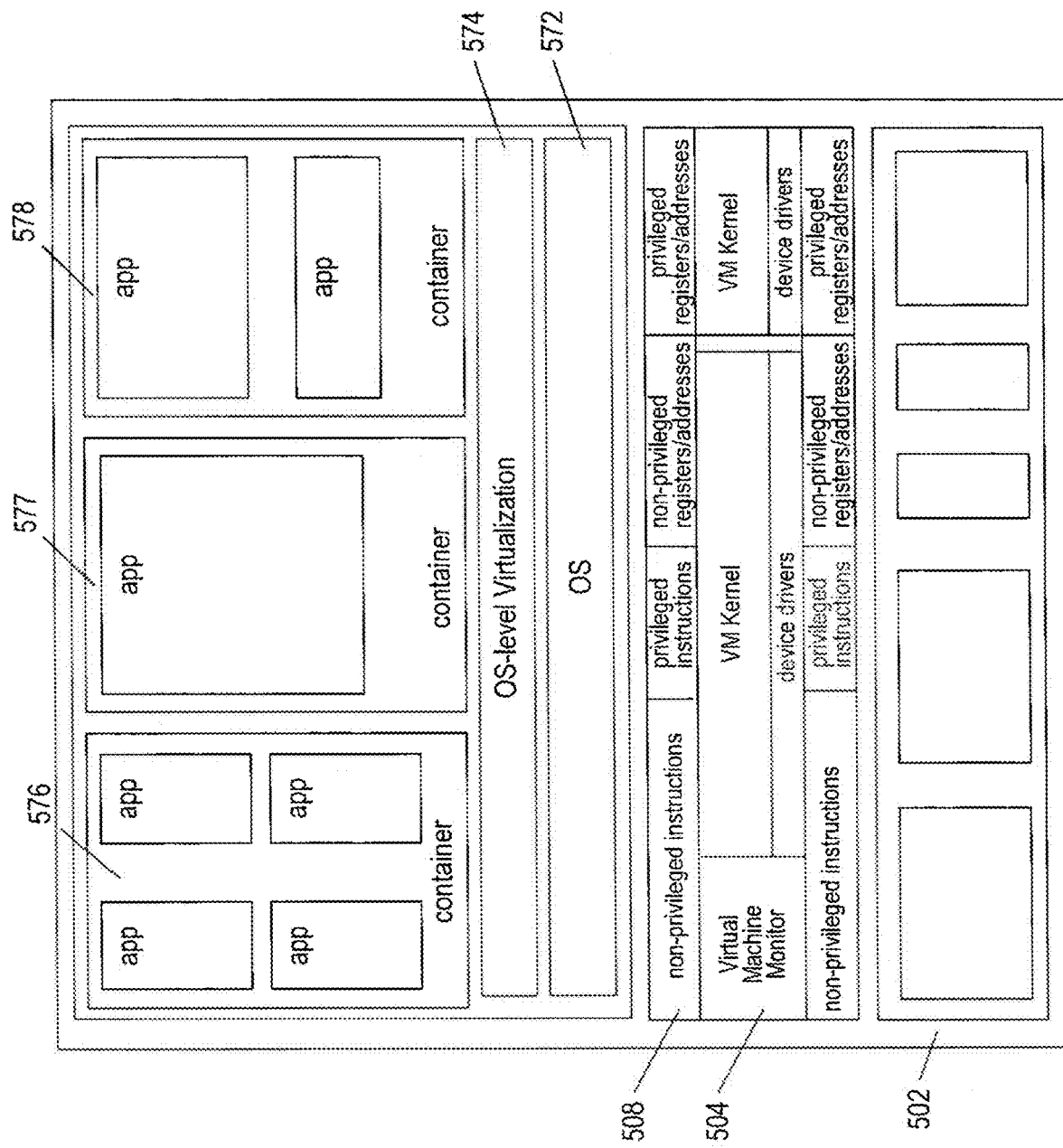

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
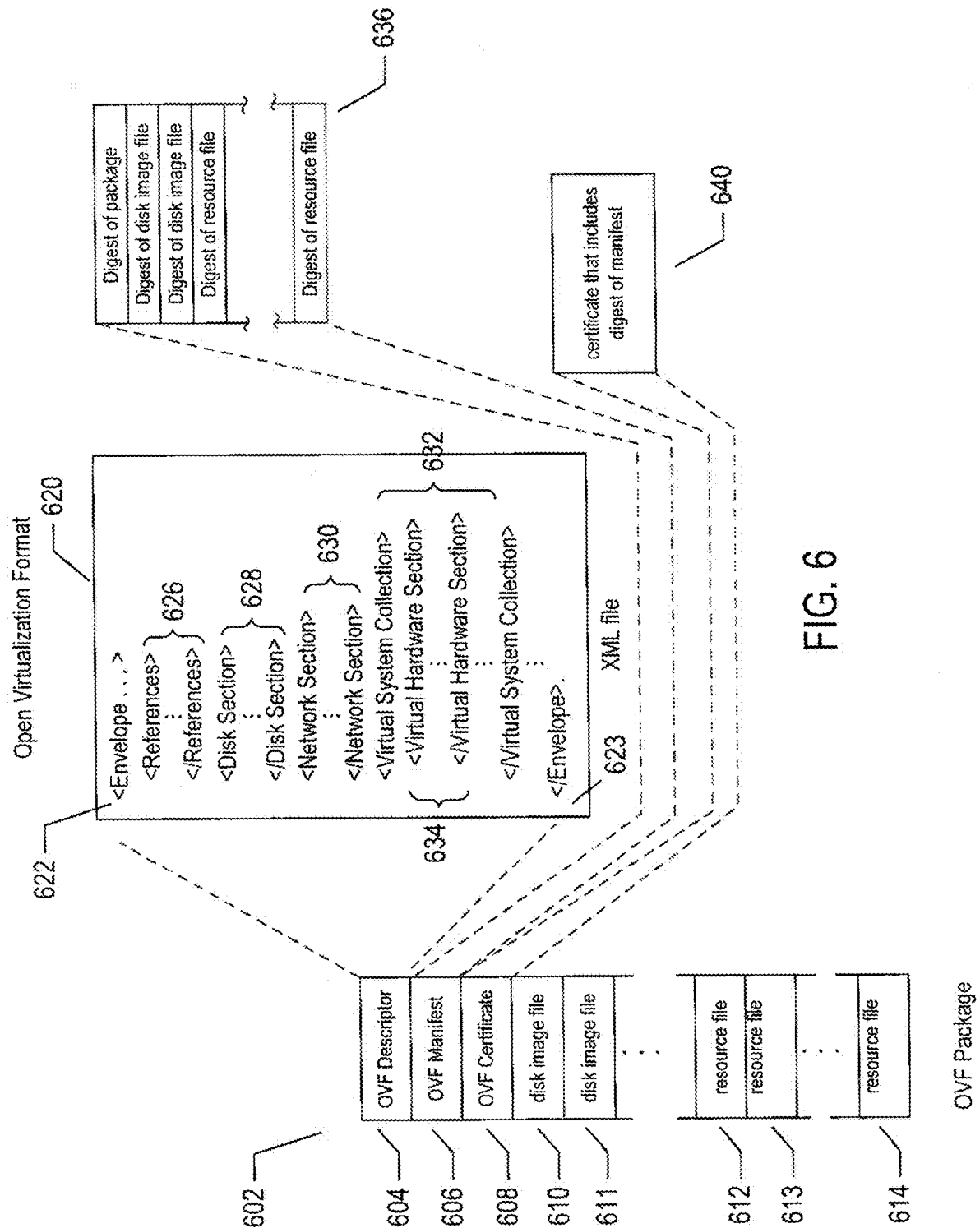
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
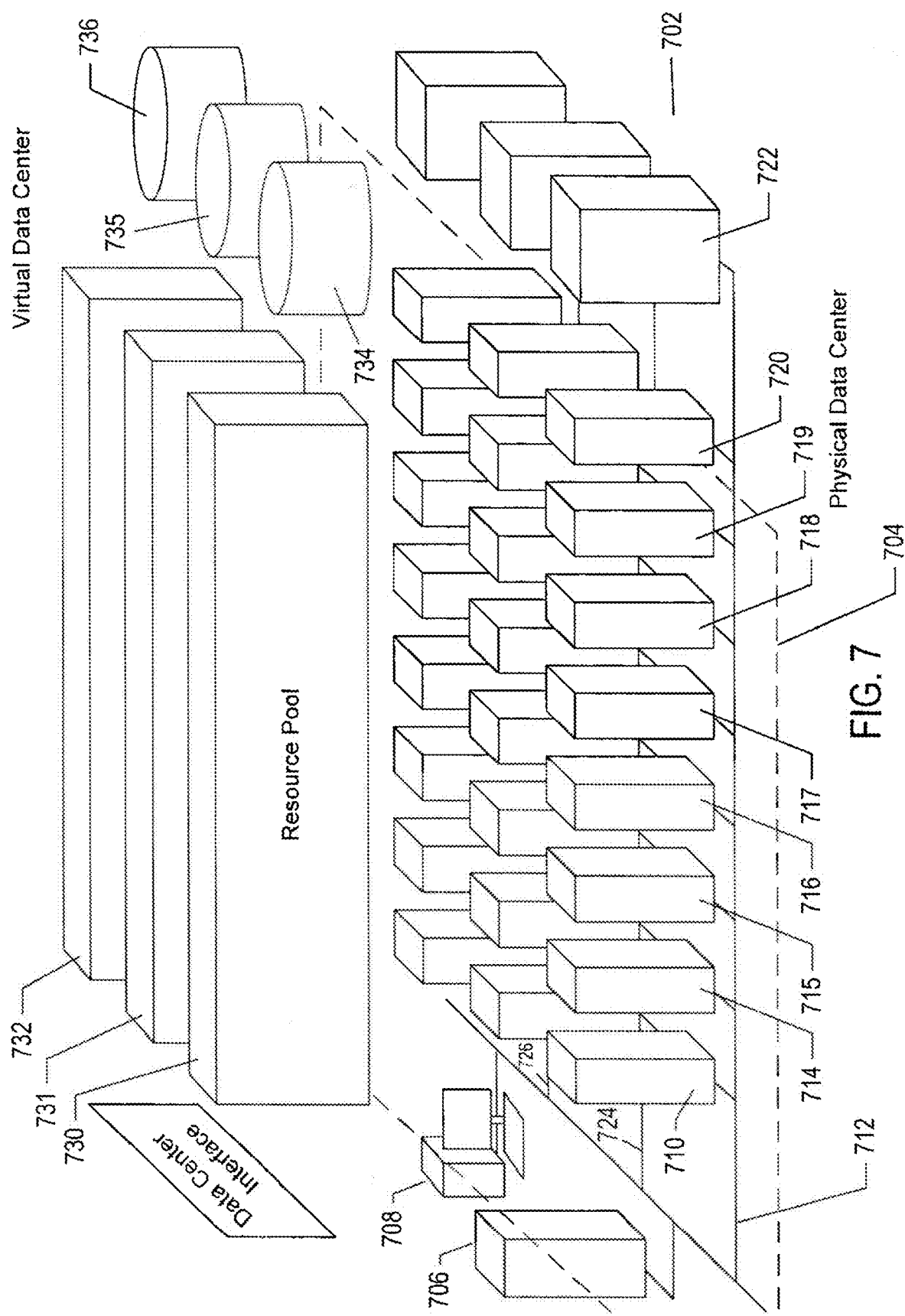
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a datacenter interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
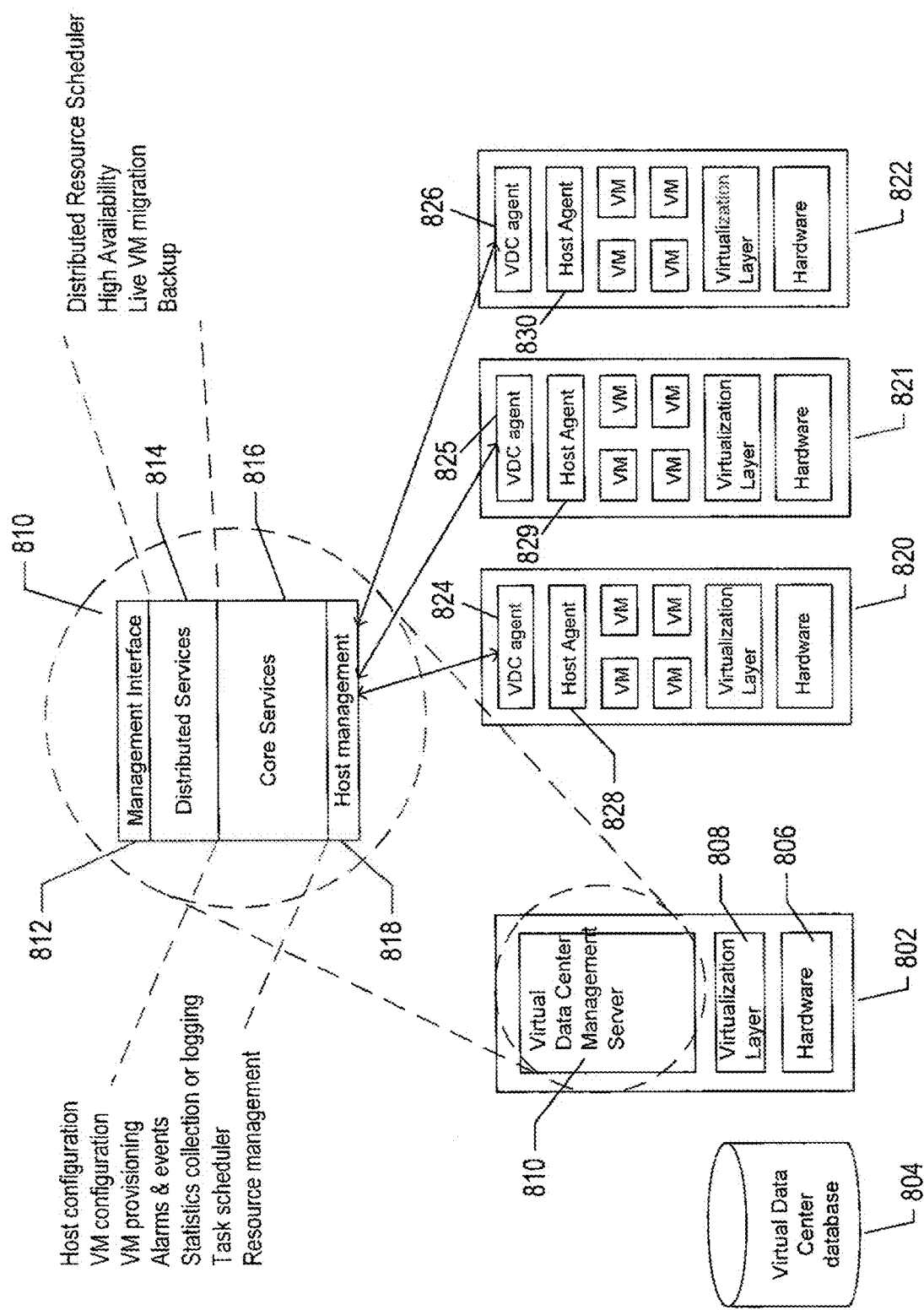
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
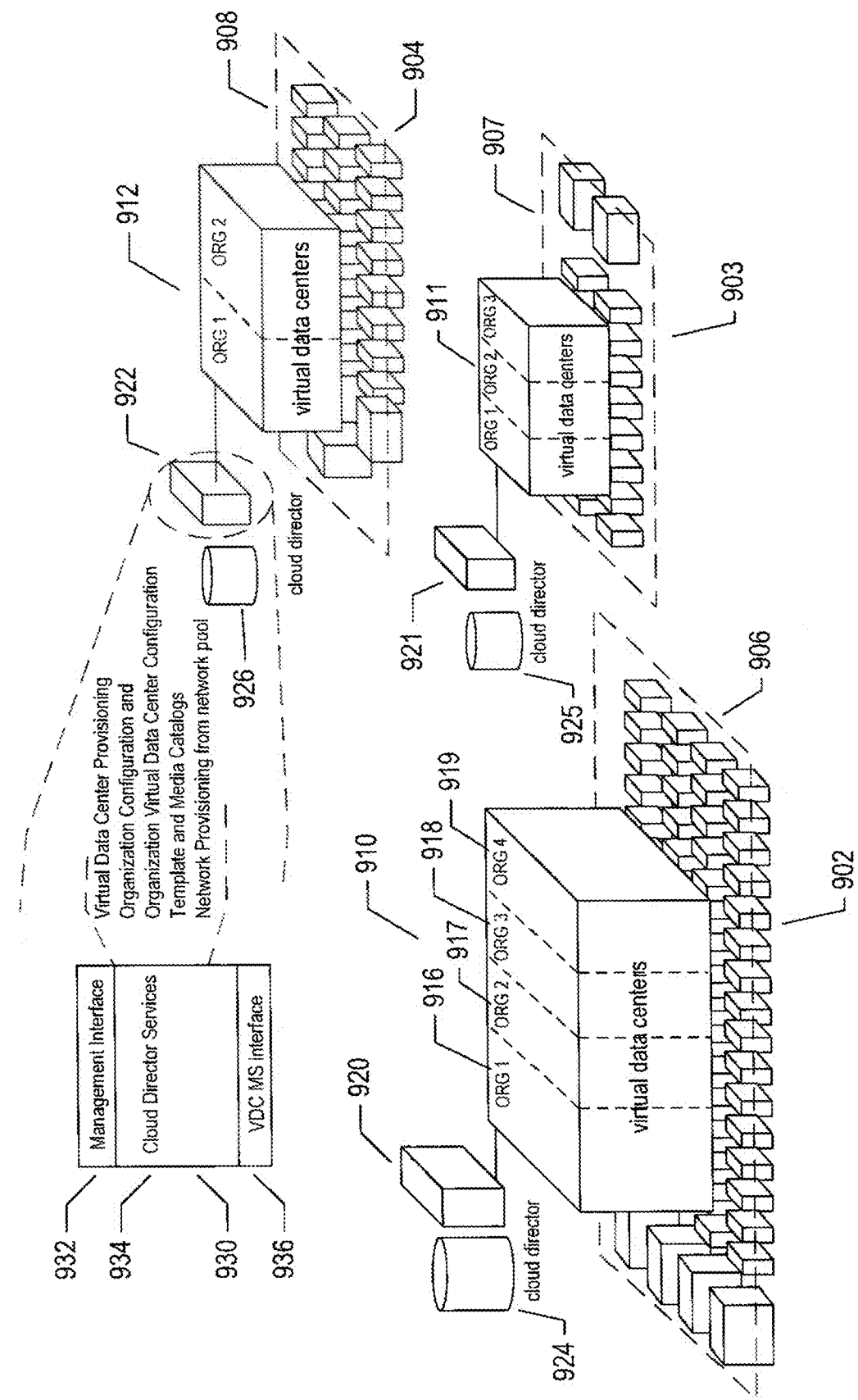
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
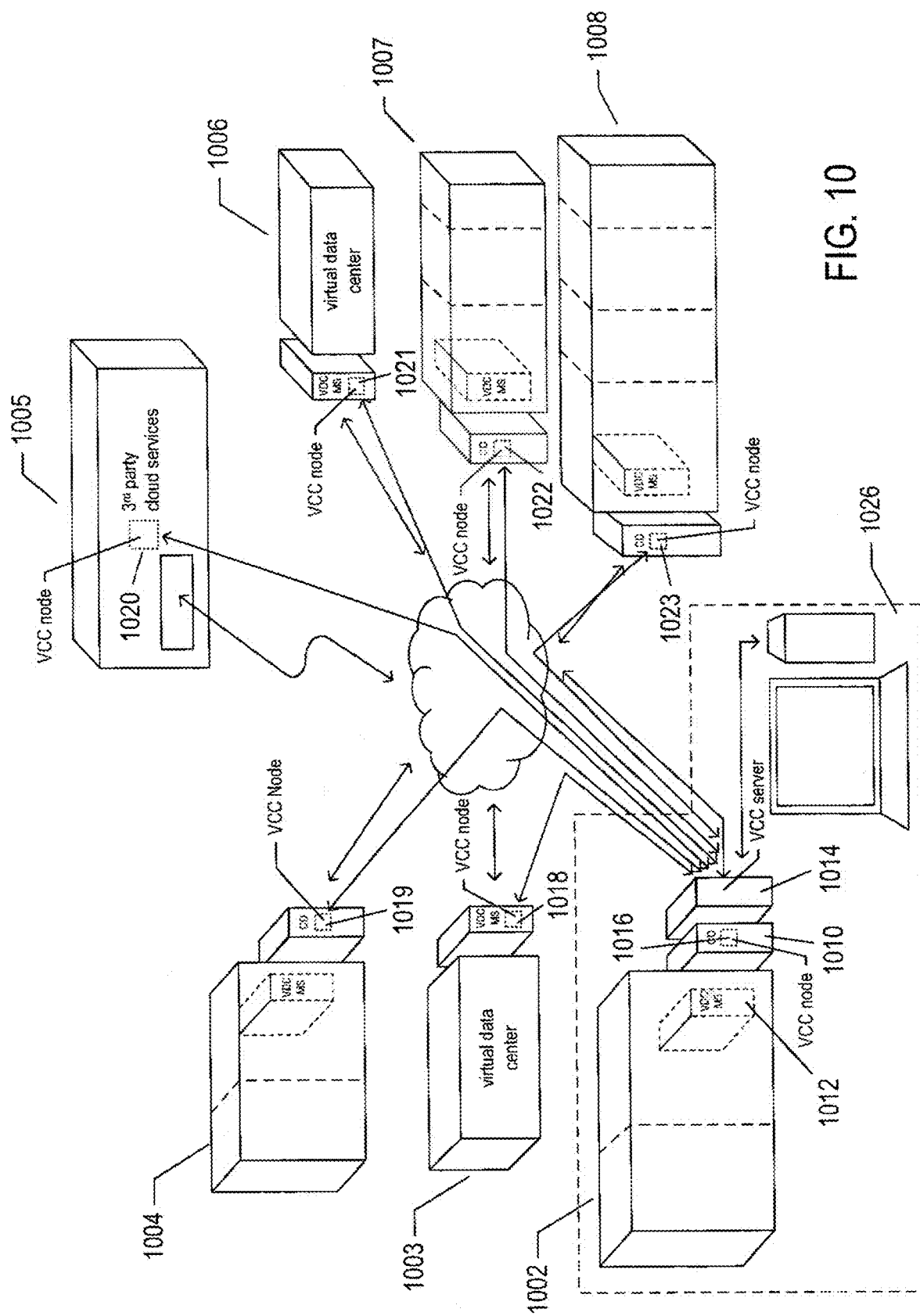
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal. PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

An Overview of Distributed Log-Analytics Systems

Modern distributed computer systems feature a variety of different types of automated and semi-automated administration and management systems that detect anomalous operating behaviors of various components of the distributed computer systems, collect errors reported by distributed-computing-system components, and use the detected anomalies and collected errors to monitor and diagnose the operational states of the distributed computer systems in order to automatically undertake corrective and ameliorative actions and to alert human system administrators of potential, incipient, and already occurring problems. Log/event-message reporting, collecting, storing, and querying systems are fundamental components of administration and management subsystems. The phrase "log/event message" refers to various types of generally short log messages and event messages issued by message-generation-and-reporting functionality incorporated within many hardware components, including network routers and bridges, network-attached storage devices, network-interface controllers, virtualization layers, operating systems, applications running within servers and other types of computer systems, and additional hardware devices incorporated within distributed computer systems. The log/event messages generally include both text and numeric values and represent various types of information, including notification of completed actions, errors, anomalous operating behaviors and conditions, various types of computational events, warnings, and other such information. The log/event messages are transmitted to message collectors, generally running within servers of local data centers, which forward collected log/event messages to message-ingestion-and-processing subsystems that collect and store log/event messages in message databases. Log/event-message query-processing systems provide, to administrators and managers of distributed computer systems, query-based access to log/event messages in message databases. The message-ingestion-and-processing subsystems may additionally provide a variety of different types of services, including automated generation of alerts, filtering, and other message-processing services.

Large modern distributed computer systems may generate enormous volumes of log/event messages, from tens of gigabytes ("GB") to terabytes ("TB") of log/event messages per day. Generation, transmission, and storage of such large volumes of data represent significant networking-bandwidth, processor-bandwidth, and data-storage overheads for distributed computer systems, significantly decreasing the available networking bandwidth, processor bandwidth, and data-storage capacity for supporting client applications and services. In addition, the enormous volumes of log/event messages generated, transmitted, and stored on a daily basis result in significant transmission and processing latencies, as a result of which greater than desired latencies in alert generation and processing of inquiries directed to stored log/event messages are often experienced by automated and semi-automated administration tools and services as well as by human administrators and managers.

FIG. 11 shows a small, 11-entry portion of a log file from a distributed computer system. A log file may store log event messages for archival purposes, in preparation for transmission and forwarding to processing systems, or for batch entry into a log/event-message database. In FIG. 11, each rectangular cell, such as rectangular cell 1102, of the portion of the log file 1104 represents a single stored log/event message. In general, log/event messages are relatively cryptic, including only one or two natural-language sentences or phrases as well as various types of file names, path names, network addresses, component identifiers, and, other alphanumeric parameters. For example, log entry 1102 includes a short natural-language phrase 1106, date 1108 and time 1110 parameters, as well as a numeric parameter 1112 which appears to identify a particular host computer.

Figure 12:
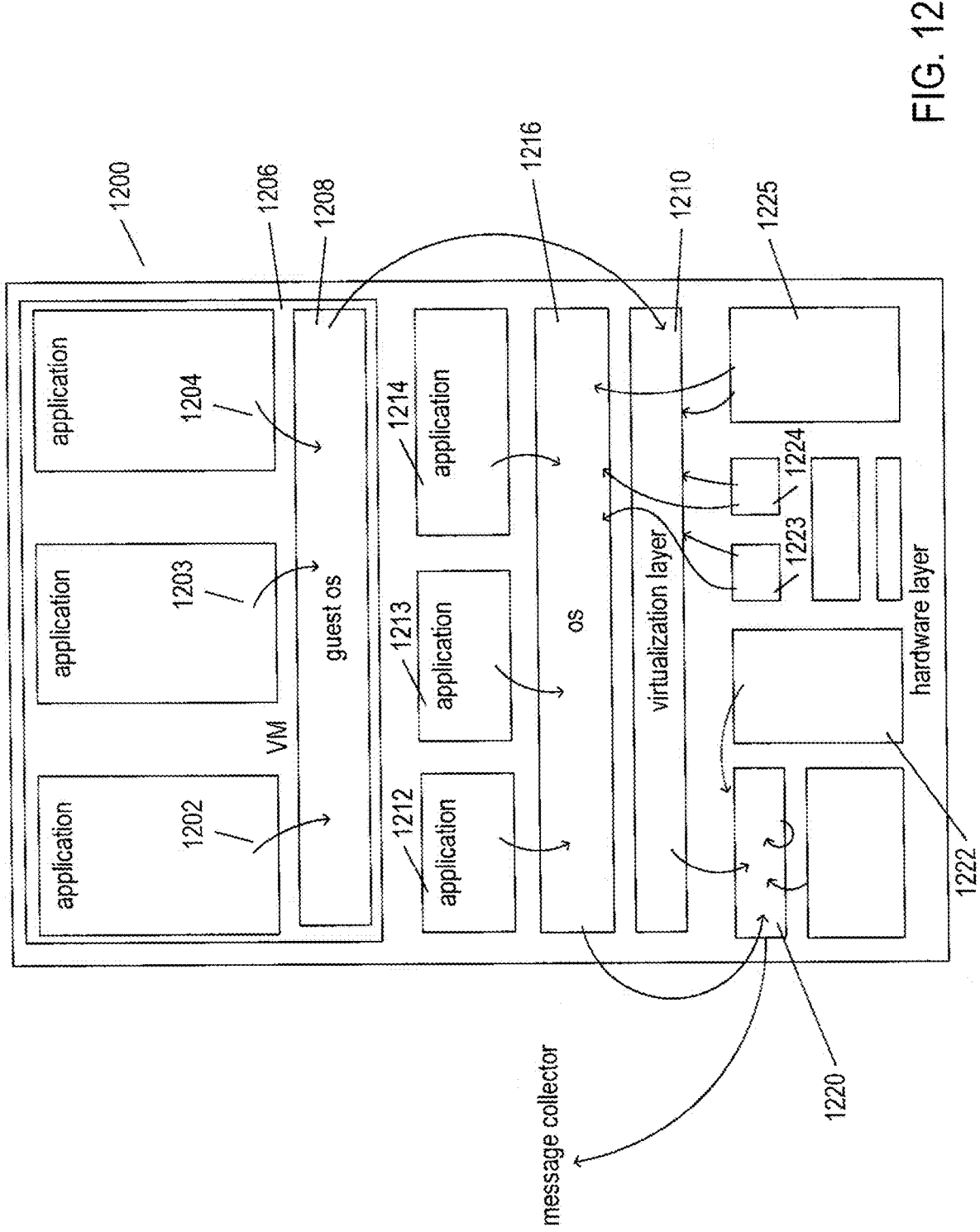
FIG. 12 illustrates generation of log/event messages within a server.

FIG. 12 illustrates generation of log/event messages within a server. A block diagram of a server 1200 is shown in FIG. 12. Log/event messages can be generated within application programs, as indicated by arrows 1202-1204. In this example, the log/event messages generated by applications running within an execution environment provided by a virtual machine 1206 are reported to a guest operating system 1208 running within the virtual machine. The application-generated log/event messages and log/event messages generated by the guest operating system are, in this example, reported to a virtualization layer 1210. Log/event messages may also be generated by applications 1212-1214 running in an execution environment provided by an operating system 1216 executing independently of a virtualization layer. Both the operating system 1216 and the virtualization layer 1210 may generate additional log/event messages and transmit those log/event messages along with log/event messages received from applications and the guest operating system through a network interface controller 1222 to a message collector. In addition, various hardware components and devices within the server 1222-1225 may generate and send log/event messages either to the operating system 1216 and/or virtualization layer 1210, or directly to the network interface controller 122 for transmission to the message collector. Thus, many different types of log/event messages may be generated and sent to a message collector from many different components of many different component levels within a server computer or other distributed-computer-system components, such as network-attached storage devices, networking devices, and other distributed-computer-system components.

Figure 13A:
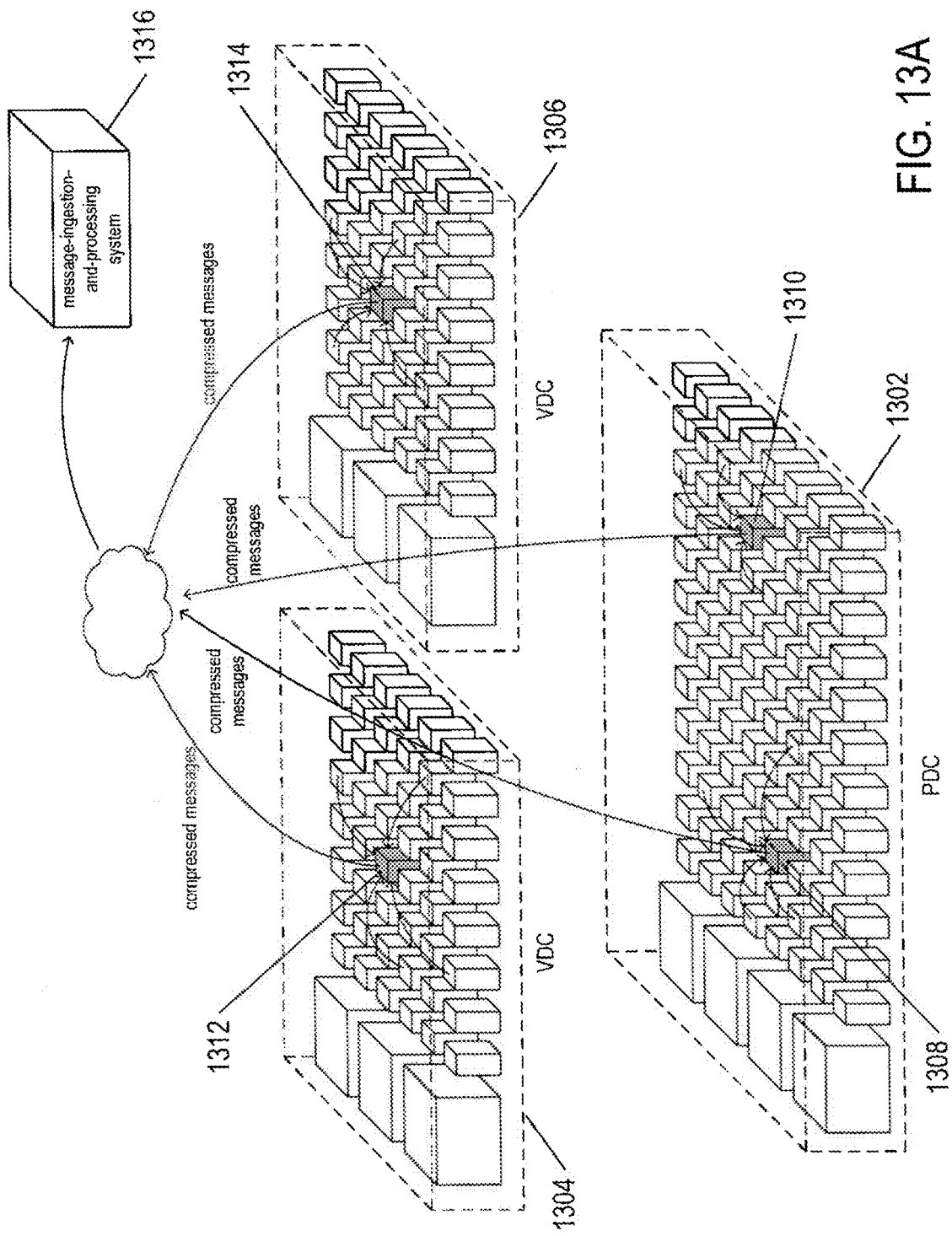
FIGS. 13A-B illustrate two different types of log/event-message collection and forwarding within distributed computer systems.
Figure 13B:
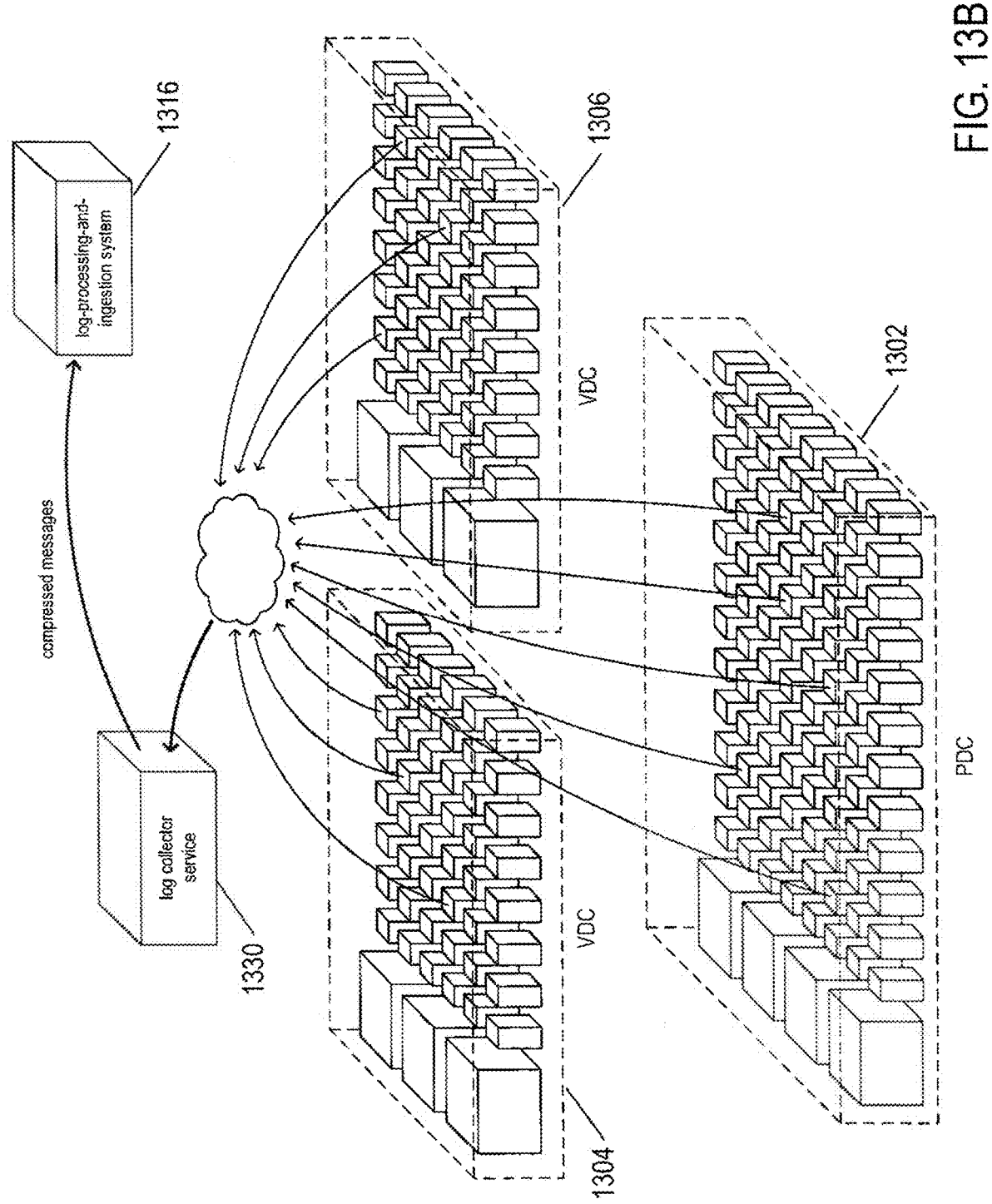

FIGS. 13A-B illustrate two different types of log/event-message collection and forwarding within distributed computer systems. FIG. 13A shows a distributed computer system comprising a physical data center 1302 above which two different virtual data centers 1304 and 1306 are implemented. The physical data center includes two message collectors running within two physical servers 1308 and 1310. Each virtual data center includes a message collector running within a virtual server 1312 and 1314. The message collectors compress batches of the collected messages and forward the compressed messages to a message-processing-and-ingestion system 1316. In certain cases, each distributed computing facility owned and/or managed by a particular organization may include one or more message-processing-and-ingestion systems dedicated to collection and storage of log/event messages for the organization. In other cases, they message-processing-and-ingestion system may provide log/event-message collection and storage for multiple distributed computing facilities owned and managed by multiple different organizations. In this example, log/event messages may be produced and reported both from the physical data center as well as from the higher-level virtual data centers implemented above the physical data center. In alternative schemes, message collectors within a distributed computer system may collect log/event messages generated both at the physical and virtual levels.

FIG. 13B shows the same distributed computer system 1302, 1304, and 1306 shown in FIG. 13A. However, in the log/event-message reporting scheme illustrated in FIG. 13B, log/event messages are collected by a remote message-collector service 1330 which then forwards the collected log/event messages to the message-processing-and-ingestion system 1316.

Figure 14:
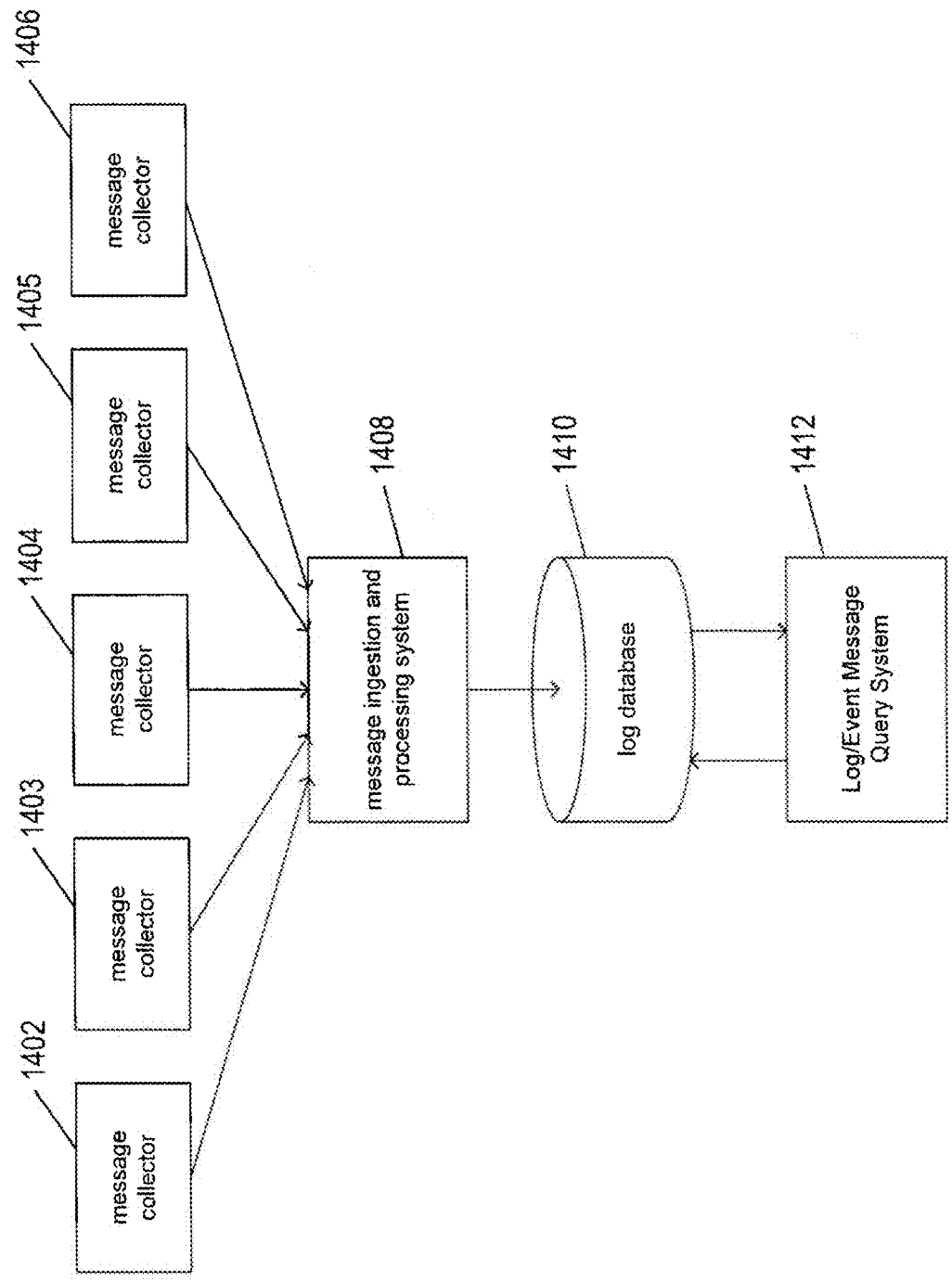
FIG. 14 provides a block diagram of a generalized log/event-message system incorporated within one or more distributed computer systems.

FIG. 14 provides a block diagram of a generalized log/event-message system incorporated within one or more distributed computer systems. The message collectors 1402-1406 receive log/event messages from log/event-message sources, including hardware devices, operating systems, virtualization layers, guest operating systems, and applications, among other types of log/event-message sources. The message collectors generally accumulate a number of log/event messages, compress them using any of commonly available data-compression methods, and send the compressed batches of log/event messages to a message-processing-and-ingestion system 1408. The message-processing-and-ingestion system decompresses received batches of messages, carry out any of various types of message processing, such as generating alerts for particular types of messages, filtering the messages, and normalizing the messages, prior to storing some or all of the messages in a message database 1410. A log/event-message query-processing system 1412 receives queries from distributed-computer-system administrators and managers, as well as from automated administration-and-management systems, and accesses the message database 1410 to retrieve stored log/event messages and/or information extracted from log/event messages specified by the received queries for return to the distributed-computer-system administrators and managers and automated administration-and-management systems.

As discussed above, enormous volumes of log/event messages are generated within modern distributed computer systems. As a result, message collectors are generally processor-bandwidth bound and network-bandwidth bound. The volume of log/event-message traffic can use a significant portion of the intra-system and inter-system networking bandwidth, decreasing the network bandwidth available to support client applications and data transfer between local applications as well as between local applications and remote computational entities. Loaded networks generally suffer significant message-transfer latencies, which can lead to significant latencies in processing log/event messages and generating alerts based on processed log/event messages and to delayed detection and diagnosis of potential and incipient operational anomalies within the distributed computer systems. Message collectors may use all or significant portion of the network bandwidth and computational bandwidth of one or more servers within a distributed computer system, lowering the available computational bandwidth for executing client applications and services. Message-ingestion-and-processing systems are associated with similar network-bandwidth and processor-bandwidth overheads, but also use large amounts of data-storage capacities within the computer systems in which they reside. Because of the volume of log/event-message data stored within the message database, many of the more complex types of queries executed by the log/event-message query subsystem against the stored log/event-message data may be associated with significant latencies and very high computational overheads. As the number of components within distributed computer systems increases, the network, processor-bandwidth, and storage-capacity overheads can end up representing significant portions of the total network bandwidth, computational bandwidth, and storage capacity of the distributed computer systems that generate log/event messages.

Figure 15:
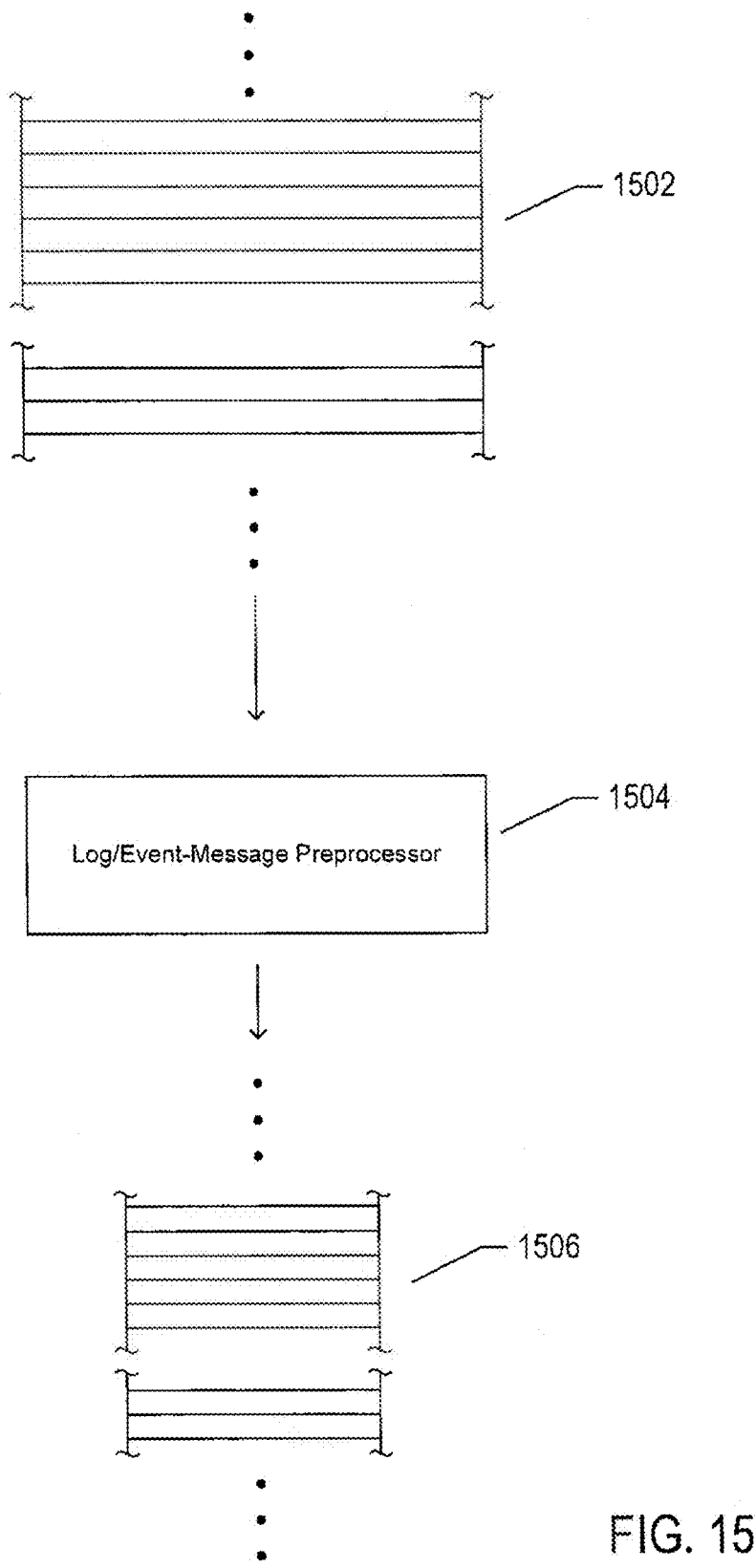
FIG. 15 illustrates log/event-message preprocessing.

One approach to addressing the above-discussed problems is to attempt to preprocess log/event messages in ways that decrease the volume of data in a log/event-message stream. FIG. 15 illustrates log/event-message preprocessing. As shown in FIG. 15, an input stream of log/event messages 1502 is preprocessed by a log/event-message preprocessor 1504 to generate an output stream 1506 of pre-processed log/event messages that represents a significantly smaller volume of data. Preprocessing may include filtering received log/event messages, compressing received log/event messages, and applying other such operations to received log/event messages that result in a decrease in the data volume represented by the stream of log/event messages output from the preprocessing steps.

Figure 16:
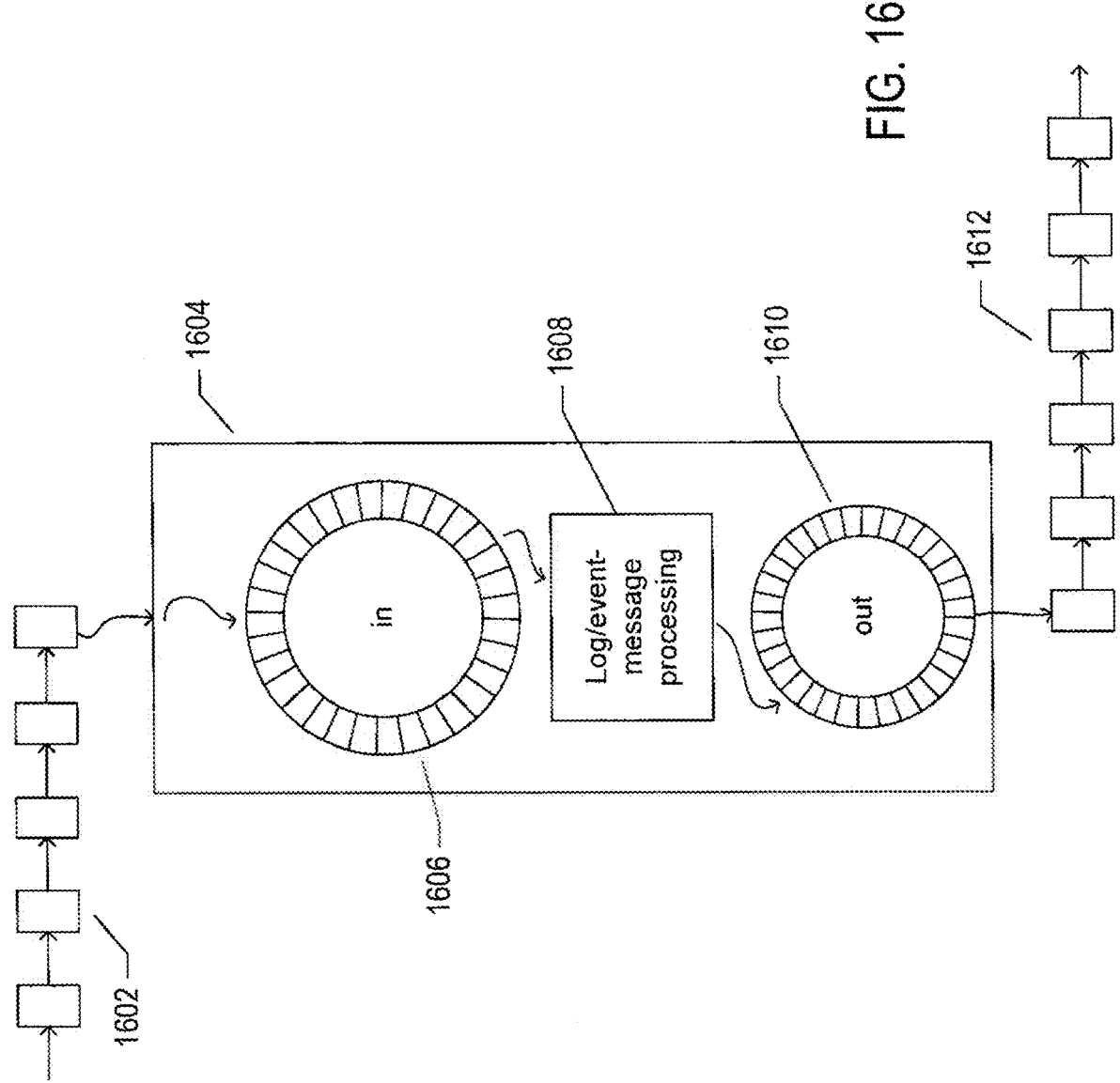
FIG. 16 illustrates processing of log/event messages by a message-collector system or a message-ingestion-and-processing subsystem.

FIG. 16 illustrates processing of log/event messages by a message-collector system or a message-ingestion-and-processing subsystem. An input stream of event/log messages 1602 is received by data-transmission components of the system 1604 and placed in an in queue 1606. Log/event-message processing functionality 1608 processes log/event messages removed from the in queue and places resulting processed log/event messages for transmission to downstream processing components in an out queue 1610. Data-transmission components of the system remove processed log/event messages from the out queue and transmit them via electronic communications to downstream processing components as an output log/event-message stream 1612. Downstream components for message-collector systems primarily include message-ingestion-and-processing subsystems, but may include additional targets, or destinations, to which log/event-messages are forwarded or to which alerts and notifications are forwarded. Downstream components for message-ingestion-and-processing subsystems primarily include log/event-message query subsystems, which store log/event messages for subsequent retrieval by analytics systems and other log/event-message-consuming systems within a distributed computer system, but may also include additional targets, or destinations, to which log/event-messages are forwarded or to which alerts and notifications are forwarded as well as long-term archival systems.

Figure 17A:
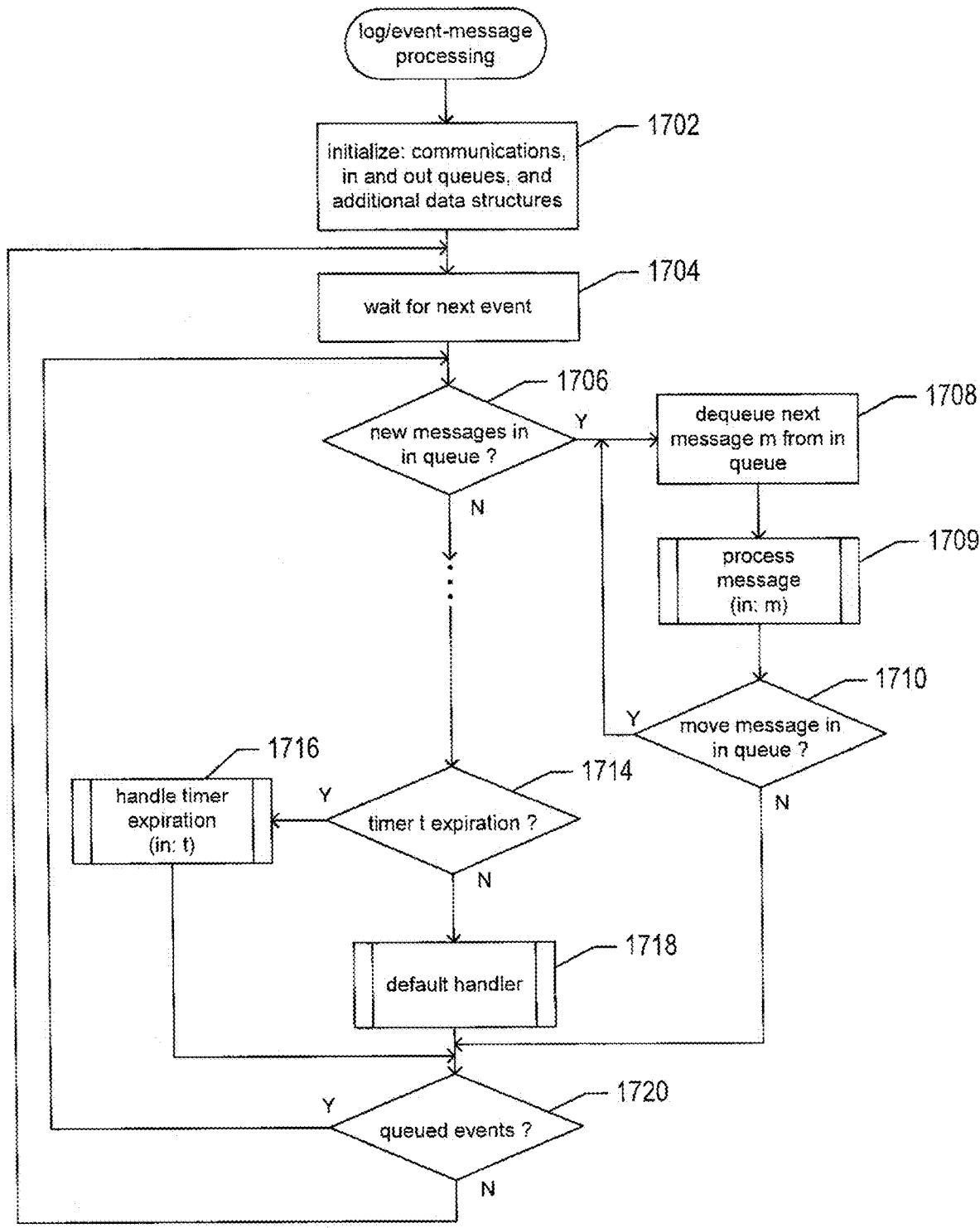
FIGS. 17A-C provide control-flow diagrams that illustrate log/event-message processing within currently available message-collector systems and message-ingestion-and-processing subsystems.
Figure 17B:
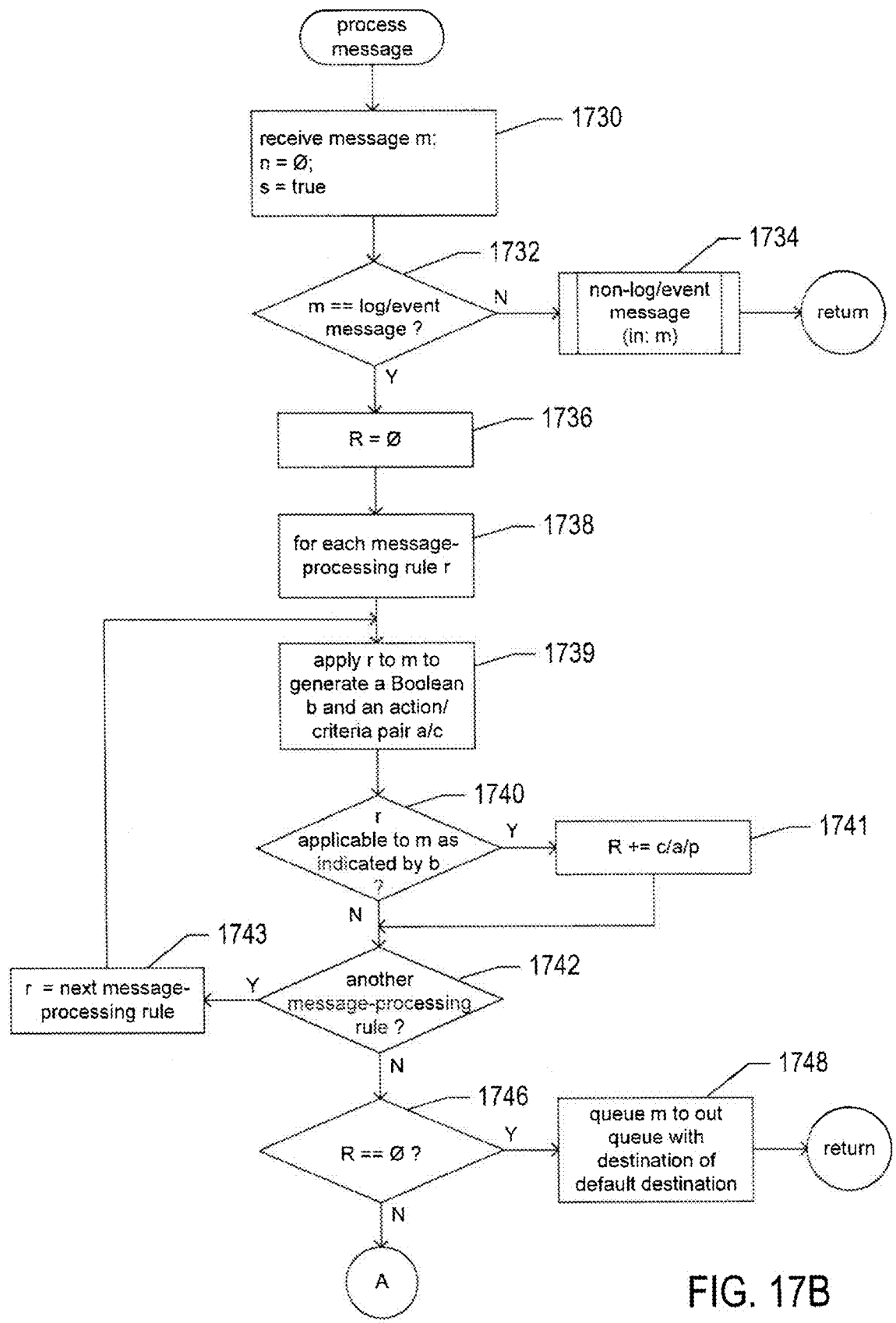
Figure 17C:
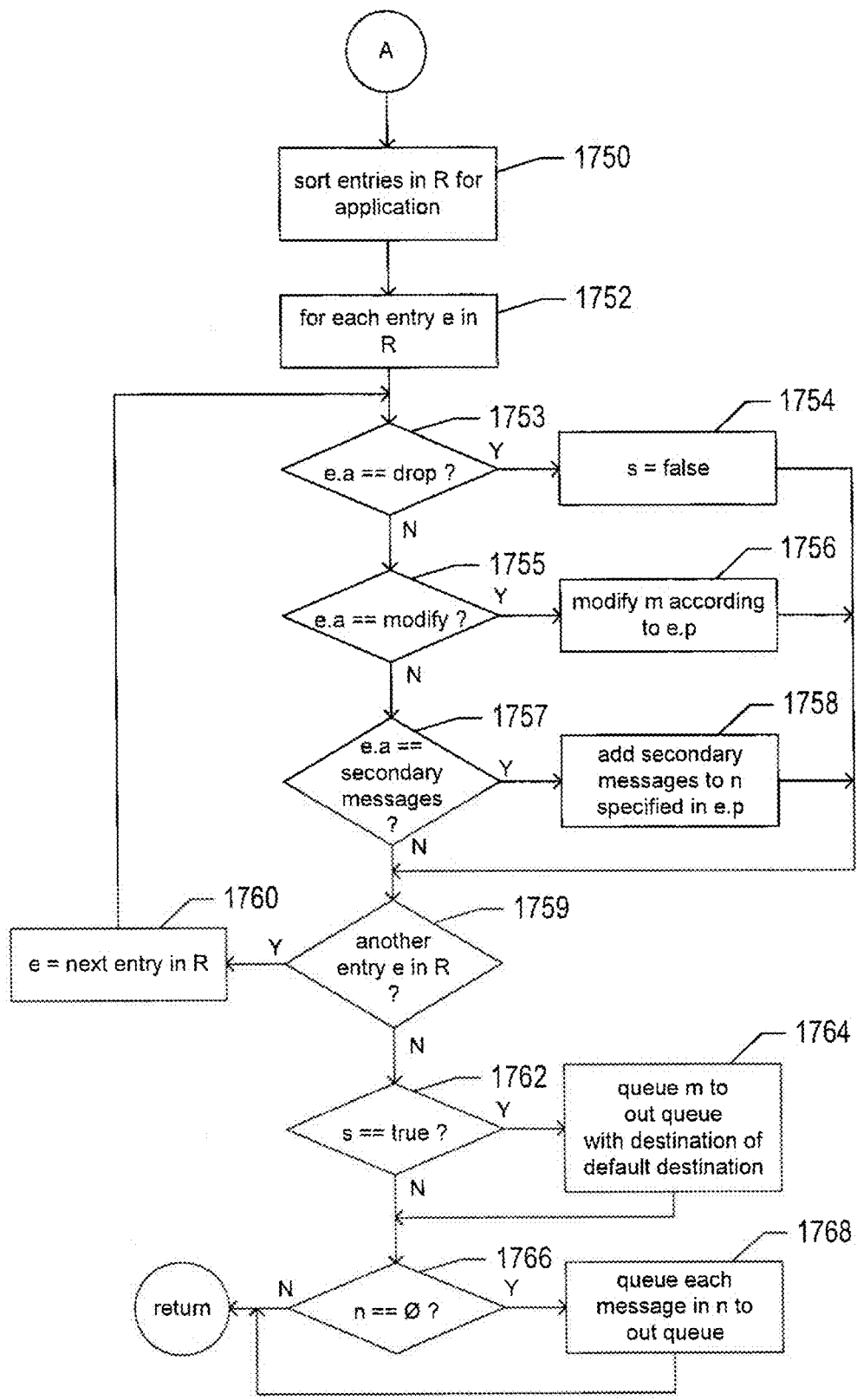

FIGS. 17A-C provide control-flow diagrams that illustrate log/event-message processing within currently available message-collector systems and message-ingestion-and-processing subsystems. FIG. 17A shows a highest-level control-flow diagram in which the log/event-message processing logic is represented as an event loop. In step 1702, log/event-message processing is initialized by initializing communications connections, through which log/event messages are received and to which processed log/event messages are output for transmission to downstream components, by initializing the in and out queues, and by initializing additional data structures. In step 1704, the log/event-message processing logic waits for a next event to occur. When a next event occurs, and when the next-occurring event is reception of one or more new messages, as determined in step 1706, messages are dequeued from the in queue and processed in the loop of steps 1708-1710. For each dequeued message, the routine "process message" is called, in step 1709. Ellipsis 1712 indicates that there may be many additional types of events that are handled by the event loop shown in FIG. 17A. When the next-occurring event is a timer expiration, as determined in step 1714, a timer-expiration handler is called in step 1716. A default handler 1718 handles any rare or unexpected events. When there are more events queued for processing, as determined in step 1720, control returns to step 1706. Otherwise, control returns to step 1704, where the log/event-message-processing logic waits for the occurrence of a next event.

FIGS. 17B-C provide a control-flow diagram for the routine "process message." called in step 1709 of FIG. 17A. In step 1730, the routine "process message" receives a message m, sets a set variable n to null, and sets a Boolean variable s to TRUE. When the received message is not a log/event message, as determined in step 1732, a routine is called to process the non-log/event message, in step 1734, and the routine "process message" terminates. Processing of non-log/event messages is not further described. When the received message is a log/event message, as determined in step 1732, a set variable R is set to null, in step 1736. In the for-loop of steps 1738-1743, the routine "process message" attempts to apply each rule r of a set of processing rules to the received message to determine whether or not the rule r applies to the message. When the currently considered processing rule r is applicable to the message, as determined in steps 1739 and 1740, the rule is added to the set of rules contained in the set variable R, in step 1741. As discussed below, a processing rule consists of a Boolean expression representing the criteria for applicability of the rule, c, an action a to be taken when the rule applies to a message, and any of various parameters p used for rule application. Thus, in step 1741, the rule added to the set of rules contained in set variable R is shown as the criteria/action/parameters triple c/a/p. When, following execution of the for-loop of steps 1738-1743, the set variable R contains no applicable rules, as determined in step 1746, the received message m is added to the out queue, in step 1748, for transmission to downstream processing components. Otherwise, the applicable rules are applied to the received message m, as shown in FIG. 17C. First, the rules stored in set variable R are sorted into an appropriate rule sequence for application to the message, in step 1750. Sorting of the rules provides for message-processing efficiency and correctness. For example, if one of the applicable rules specifies that the message to be dropped, but another of the applicable rules specifies that a copy of the message needs to be forwarded to a specified target or destination, the rule that specifies forwarding of the copy of the message should be processed prior to processing the rule that specifies that the message is to be dropped, unless the latter rule is meant to exclude prior message forwarding. In the for-loop of steps 1752-1760, each rule of the sorted set of rules in the set variable R is applied to the received message m. When the currently considered rule indicates that the message should be dropped, as determined in step 1753, the local variable s is set to FALSE, in step 1754. When the currently considered rule indicates that the received message m needs to be modified, as determined in step 1755, the modification is carried out in step 1756. When the currently considered rule indicates that secondary messages, such as forwarded copies, notifications, or alerts should be transmitted to target destinations, as determined in step 1757, the secondary messages are generated and placed in the set variable n, in step 1758. Following completion of the for-loop of steps 1752-1760, when the local variables has the value TRUE, as determined in step 1762, the received message m is queued to the out queue, and step 1764, for transmission to the default destination for messages for the system, such as a message-ingestion-and-processing subsystem, in the case of a message collector system, or a log/event-message query subsystem, in the case of a message-ingestion-and-processing subsystem. When the local set variable n is not empty, as determined in step 1766, each secondary message contained in local set variable n is queued to the out queue for transmission, in step 1768.

Figure 18:
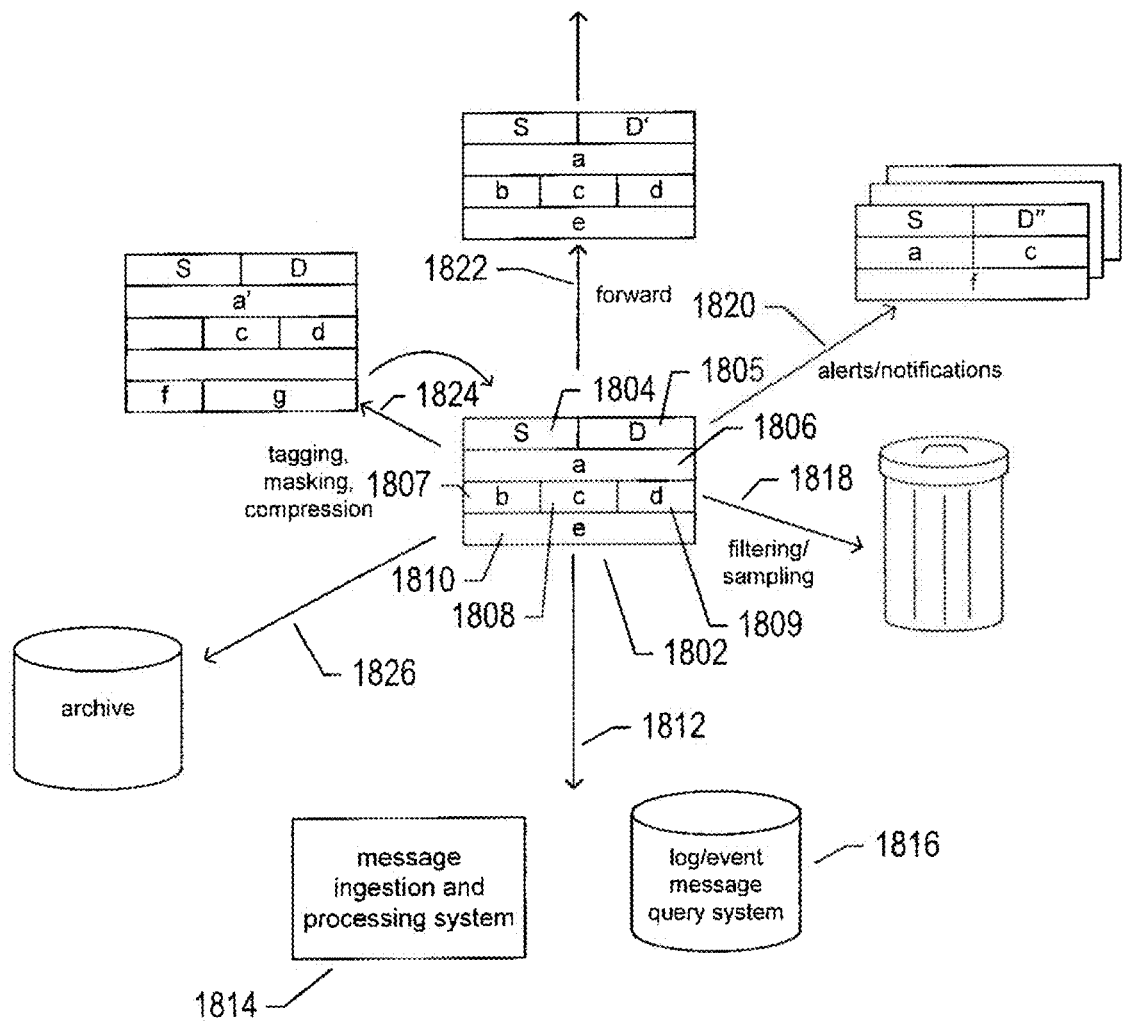
FIG. 18 illustrates various common types of initial log/event-message processing carried out by message-collector systems and/or message-ingestion-and-processing subsystems.

FIG. 18 illustrates various common types of initial log/event-message processing carried out by message-collector systems and/or message-ingestion-and-processing subsystems. A received log/event message 1802 is shown in the center of FIG. 18. In this example, the message contains source and destination addresses 1804-1805 in a message header as well as five variable fields 1806-1810 with field values indicated by the symbols "a," "b." "c," "d," and "e." respectively. The message is generally transmitted to a downstream processing component, as represented by arrow 1812, where downstream processing components include a message-processing-and-ingestion system 1814 and a log/event-message query subsystem 1860. Transmission of the message to a downstream processing component occurs unless a processing rule specifies that the transmission should not occur. Alternatively, the message may be dropped, as indicated by arrow 1818, due to a filtering or sampling action contained in a processing rule. Sampling involves processing only a specified percentage p of log/event messages of a particular type or class and dropping the remaining 1−p percentage of the log/event messages of the particular type or class. Filtering involves dropping, or discarding, those log/event messages that meet a specified criteria. Rules may specify that various types of alerts and notifications are to be generated, as a result of reception of a message to which the rule applies, for transmission to target destinations specified by the parameters of the rule, as indicated by arrow 1820. As indicated by arrow 1822, a received log/event message may be forwarded to a different or to additional target destinations when indicated by the criteria associated with a processing rule. As indicated by arrow 1824, processing rules may specify that received log/event messages that meet specified criteria should be modified before subsequent processing steps. The modification may involve tagging, in which information is added to the message, masking, which involves altering field values within the message to prevent access to the original values during subsequent message processing, and compression, which may involve deleting or abbreviating fields within the received log/event message. Arrow 1826 indicates that a rule may specify that a received message is to be forwarded to a long-term archival system. These are but examples of various types of initial log/event-message processing steps that that may be carried out by message collectors and/or message-ingestion-and-processing subsystems when specified by applicable rules.

FIG. 19 illustrates processing rules that specify various types of initial log/event-message processing. The processing rules are contained in a table 1902 shown in FIG. 19. As discussed above, each rule comprises a Boolean expression that includes the criteria for rule applicability, an action, and parameters used for carrying out the actions. In the table 1902 shown in FIG. 19, each row of the table corresponds to a rule. A first, rule 1 (1904 in FIG. 19), is applied to a log/event message when application of the Boolean expression 1906 to the log/event message returns a value TRUE. This expression indicates that rule 1 is applicable to a log/event message msg when the message includes a first phrase phrase_1, does not include a first term term_1, and includes, as the value of a first field, a second phrase phrase_2 or when the message includes the first phrase phrase_1 as well as a second term term_2. When the criteria are met by a log/event message, the log/event message is specified, by the rule, to be forwarded to four destinations with addresses add1, add2, add3, and add4. The placeholders phrase_1, phrase_2, term_1, term_2, add1, add2, add3, and add4 in the expression stand for various particular character strings and/or alphanumeric strings. The rules shown in FIG. 19, of course, are only hypothetical examples of the types of log/event-message processing rules that might be employed by initial-log/event-message-processing logic within message collectors and message-ingestion-and-processing subsystems.

Figure 20A:
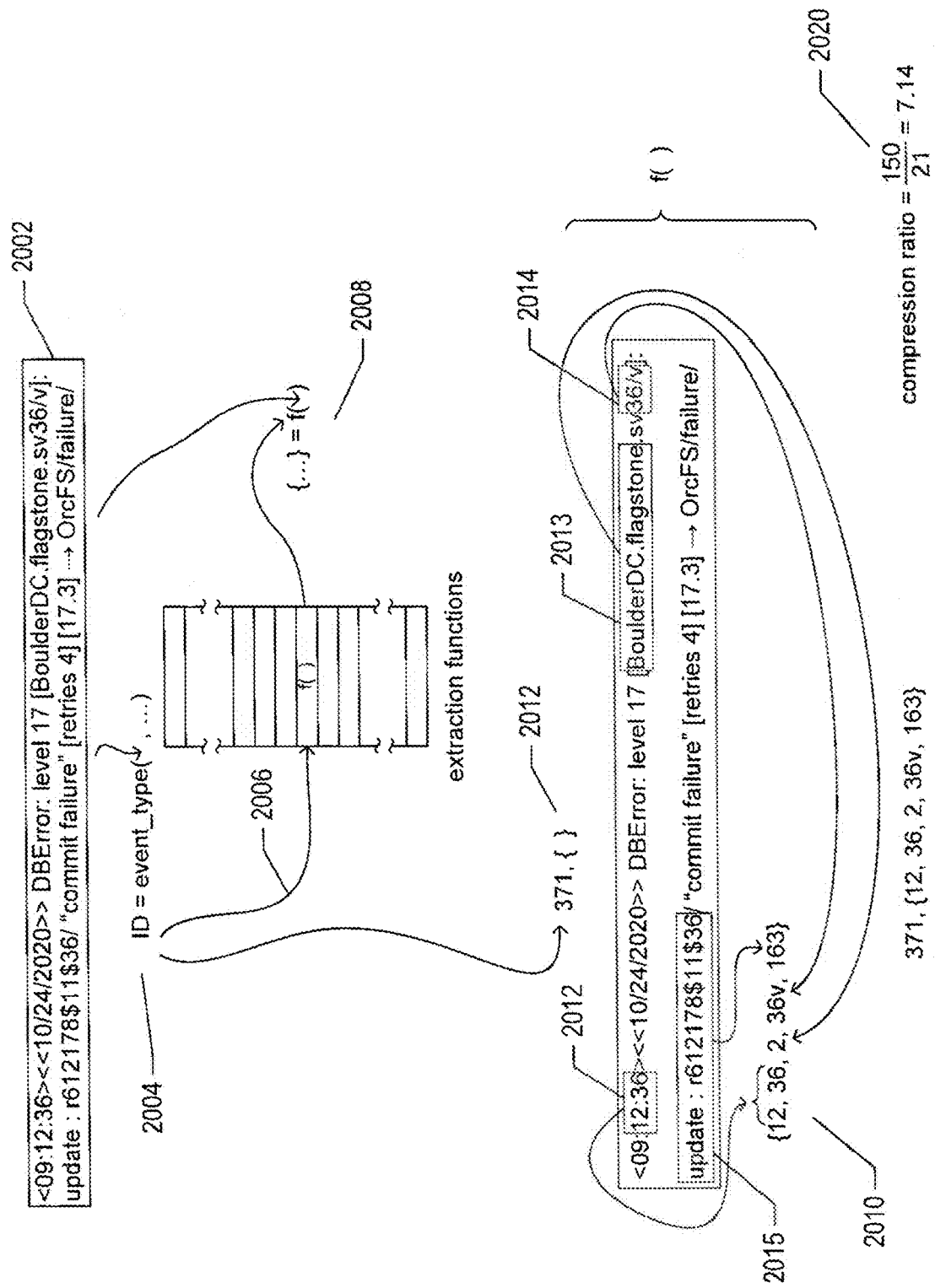
FIGS. 20A-B illustrate a log/event-message-type generation method.
Figure 20B:
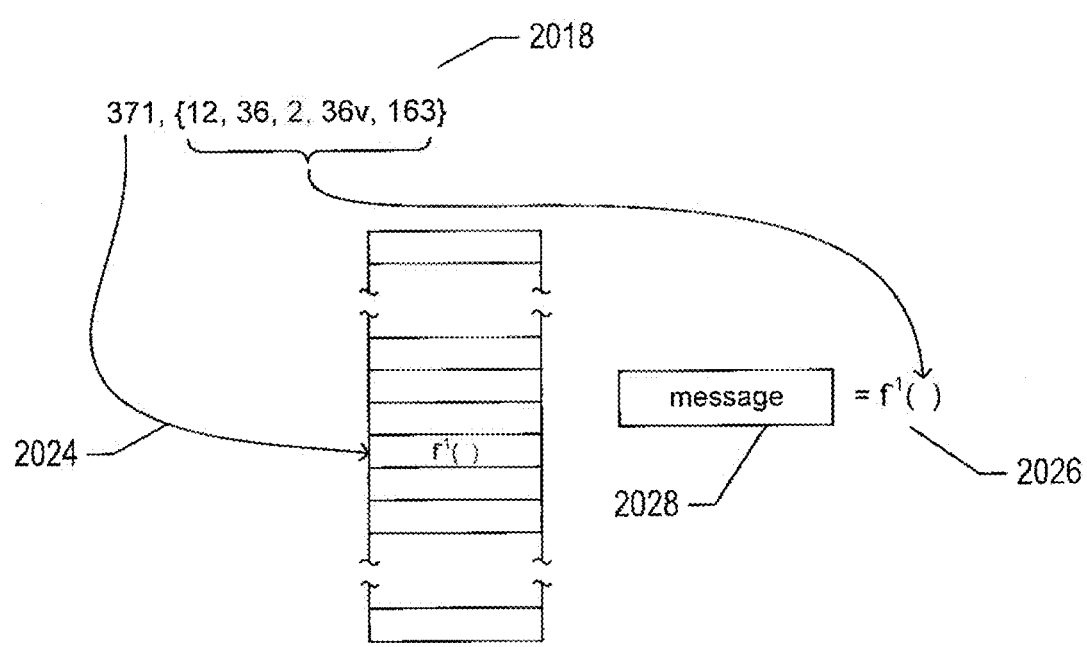

FIGS. 20A-B illustrate a log/event-message-type generation method. A hypothetical log/event message 2002 is shown at the top of FIG. 20A. As is typical for log/event messages, log/event message 2002 includes numerous formatted fields and phrases with significant meanings that cannot be discerned from the contents of the log/event message, alone. Either by automated, semi-automated, or manual means, a log/event message can be processed to determine a message type, referred to below as an "event_type," corresponding to the message and to determine a list of numeric values and/or character strings that correspond to variables within a log/event message. In other words, log/event messages are associated with types and log/event messages contain static and relatively static portions with low information content and variable portions with high information content. As shown in FIG. 20 A, log/event message 2002 can be automatically processed 2004 to generate an event_type, referred to as "ID" in FIGS. 20A-B. This processing is encapsulated in the function event_type( ). Implementation of the function event_type( ) can vary, depending on the distributed computer systems that generate the log/error messages. In certain cases, relatively simple pattern-matching techniques can be used, along with regular expressions, to determine the event_type for a given log/error message. In other implementations, a rule-based system or a machine-learning system, such as a neural network, can be used to generate an event_type for each log/error message and/or parse the log/error message. In certain cases, the event_type may be extracted from an event-type field of event messages as a numerical or character-string value. The event_type can then be used, as indicated by curved arrow 2006 in FIG. 20A, to select a parsing function $f(\ )$ for the event_type that can be used to extract the high-information-content, variable values from the log/event message 2008. The extracted variable values are represented, in FIG. 20A and subsequent figures, by the notation "{ . . . }," or by a list of specific values within curly brackets, such as the list of specific values "{12, 36, 2, 36 v, 163}" 2010 shown in FIG. 20A. As a result, each log/event message can be alternatively represented as a numerical event_type, or identifier, and a list of 0, 1, or more extracted numerical and/or character-string values 2012. In the lower, portion of FIG. 20A, parsing of log/event message 2002 by a selected parsing or extraction function $f(\ )$ is shown. The high-information variable portions of the log/event message are shown within rectangles 2012-2015. These portions of the log/event message are then extracted and transformed into the list of specific values "{12, 36, 2, 36 v, 163}" 2010. Thus, the final form of log/event message 2002 is an ID and a compact list of numeric and character-string values 2018, referred to as an "event tuple." As shown in FIG. 20B, there exists an inverse process for generating the original log/error message from the expression 2018 obtained by the compression process discussed above with reference to FIG. 20A. The event_type, or ID, is used to select, as indicated by curved arrow 2024, a message-restoration function $f^1(\ )$ which can be applied 2026 to the expression 2018 obtained by the event-tuple-generation process to generate the original message 2028. In certain implementations, the decompressed, or restored, message may not exactly correspond to the original log/event message, but may contain sufficient information for all administration/management needs. In other implementations, message restoration restores the exact same log/event message that was compressed by the process illustrated in FIG. 20A.

There are a variety of possible techniques for, and approaches to, generating or implementing the above-discussed event_type( ) function and extraction and message-restoration functions $f(\ )$ and $f^1(\ )$. In certain cases, these functions can be prepared manually from a list of well-understood message types and message formats. Alternatively, these functions can be generated by automated techniques, including clustering techniques, or implemented by machine-learning techniques.

Figure 21A:
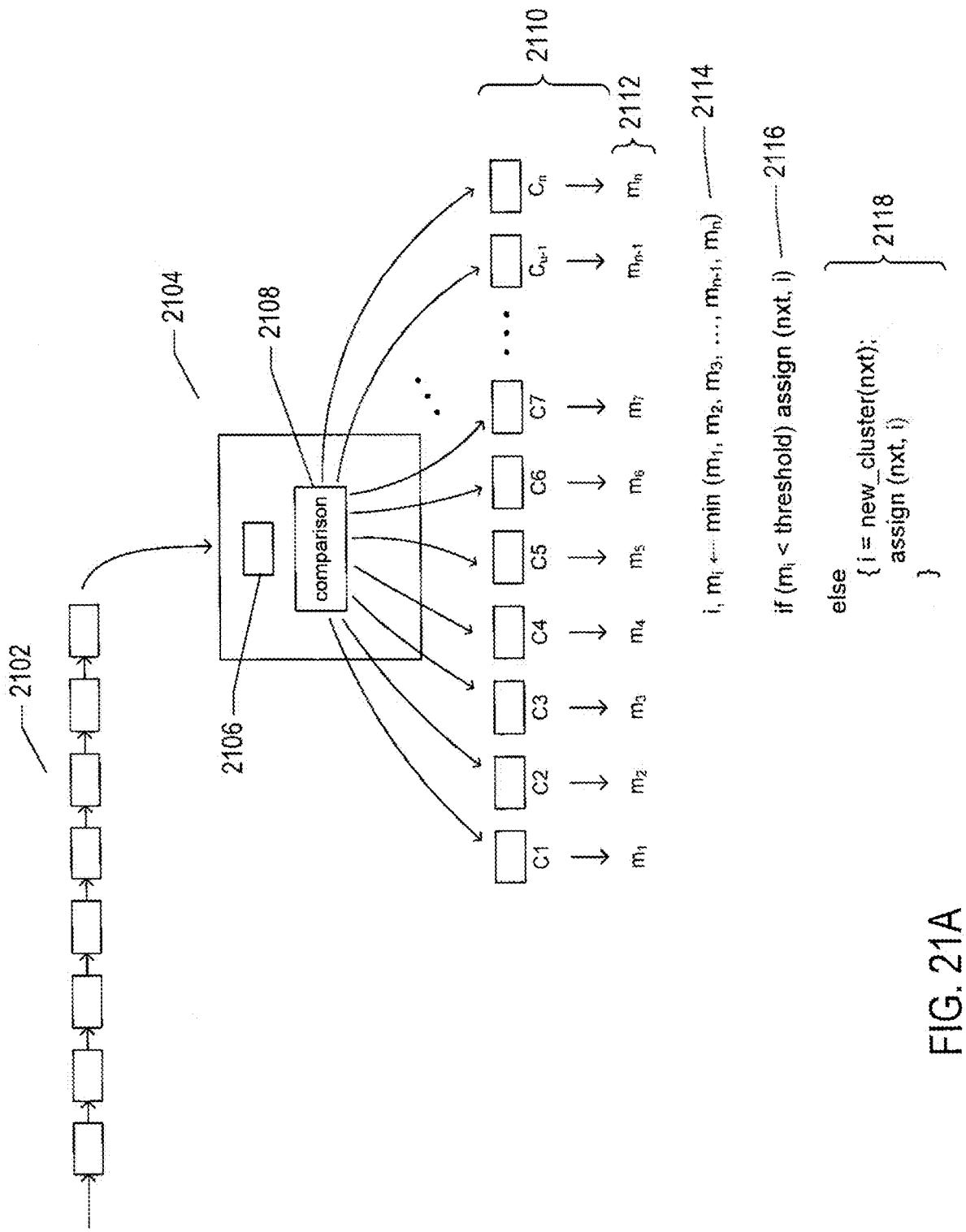
FIGS. 21A-C illustrate a clustering technique for generating an event_type( ) function and extraction and message-restoration functions $f(\ )$ and $f^1(\ )$.
Figure 21B:
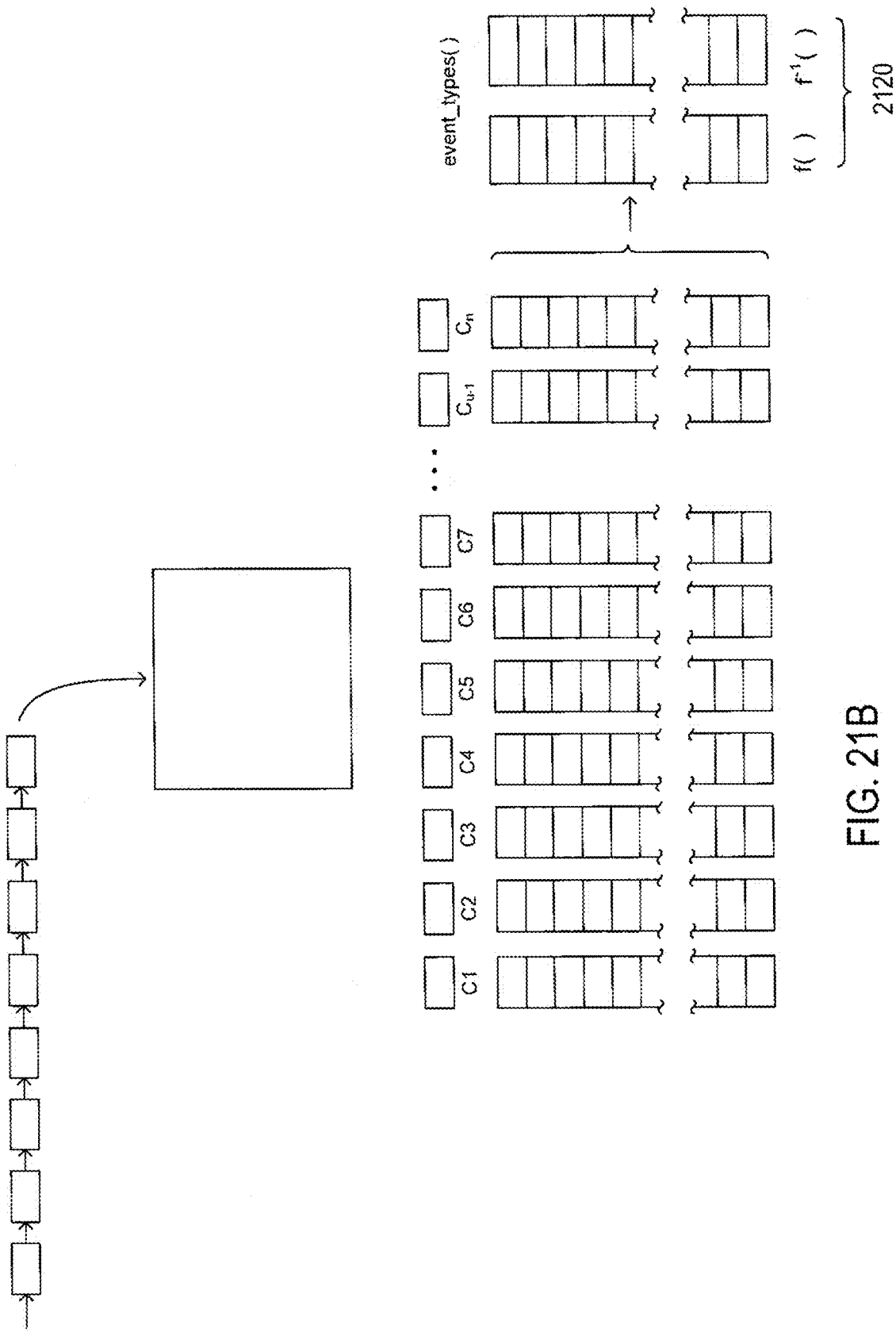
Figure 21C:
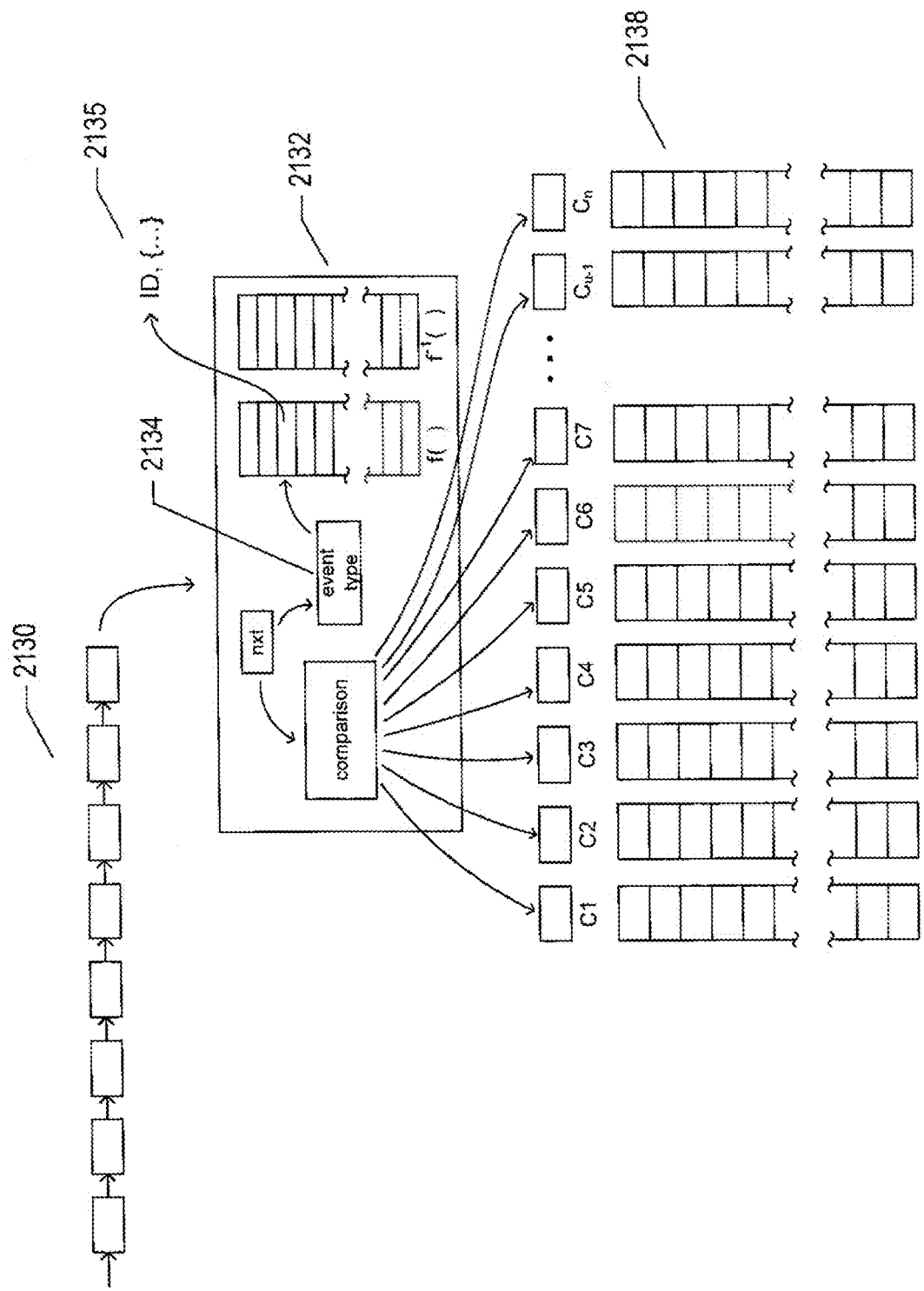

FIGS. 21A-C illustrate a clustering technique for generating an event_type( ) function and extraction and message-restoration functions $f(\ )$ and $f^1(\ )$.

As shown in FIG. 21A, incoming log/event messages 2102 are input sequentially to a clustering system 2104. Each message 2106 is compared, by a comparison function 2108, to prototype messages representative of all of the currently determined clusters 2110. Of course, initially, the very first log/event message becomes the prototype message for a first cluster. A best comparison metric and the associated cluster are selected from the comparison metrics 2112 generated by the comparison function 2114. An example shown in FIG. 21A, the best comparison metric is the metric with the lowest numerical value. In this case, when the best comparison metric is a value less than a threshold value, the log/event message 2106 is assigned to the cluster associated with the best comparison metric 2116. Otherwise, the log/event message is associated with the new cluster 2118. As shown in FIG. 21B, this process continues until there are sufficient number of log/event messages associated with each of the different determined clusters, and often until the rate of new-cluster identification falls below a threshold value, at which point the clustered log/event messages are used to generate sets of extraction and message-restoration functions $f(\ )$ and $f^1(\ )$ 2120. Thereafter, as shown in FIG.

21C, as new log/event messages 2130 are received, the fully functional clustering system 2132 generates the event-type/variable-portion-list expressions for the newly received log/event messages 2134-2135 using the current event_type( ) function and sets of extraction and message-restoration functions $f( )$ and $f^1( )$, but also continues to cluster a sampling of newly received log/event messages 2138 in order to dynamically maintain and evolve the set of clusters, the event_type( ) function, and the sets of extraction and message-restoration functions $f( )$ and $f^1( )$.

Figure 22A:
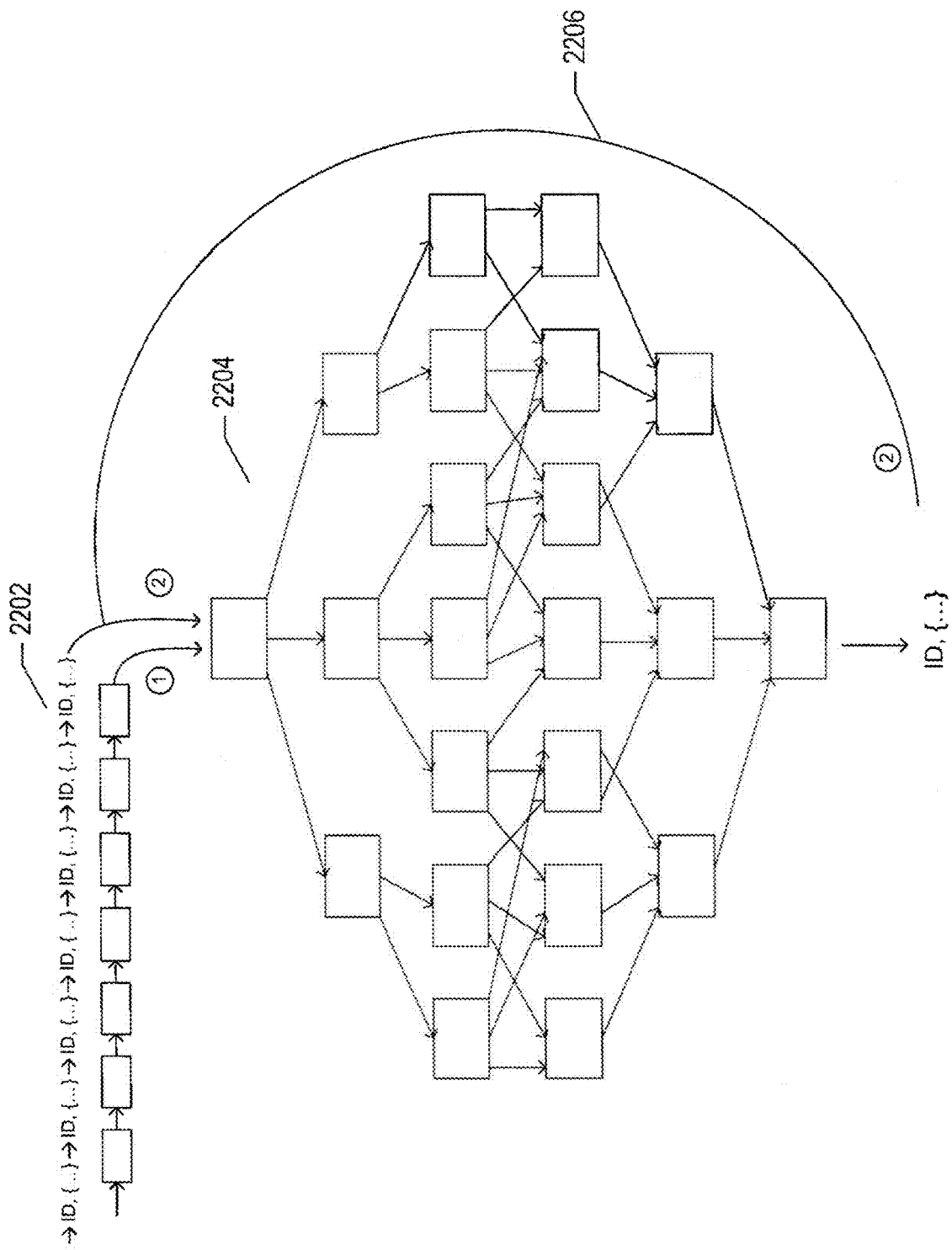
FIGS. 22A-B illustrate a machine-learning technique for generating an event_type( ) function and extraction and message-restoration functions $f(\ )$ and $f^1(\ )$.
Figure 22B:
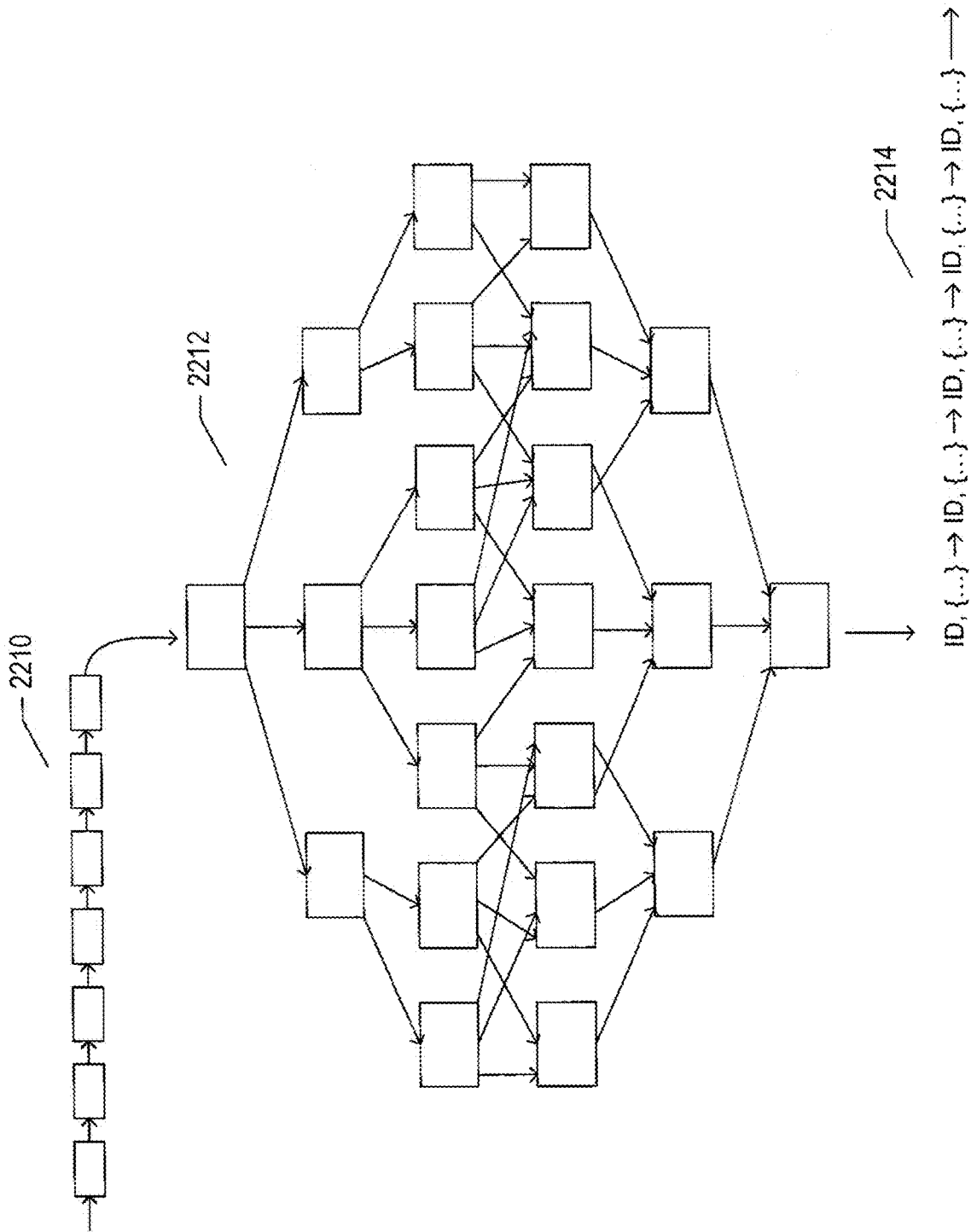

FIGS. 22A-B illustrate a machine-learning technique for generating an event_type( ) function and extraction and message-restoration functions $f( )$ and $f^1( )$. As shown in FIG. 22A, a training data set of log/event messages and corresponding compressed expressions 2202 is fed into a neural network 2204, which is modified by feedback from the output produced by the neural network 2206. The feedback-induced modifications include changing weights associated with neural-network nodes and can include the addition or removal of neural-network nodes and neural-network-node levels. As shown in FIG. 22B, once the neural network is trained, received log/event messages 2210 are fed into the trained neural network 2212 to produce corresponding compressed-message expressions 2214. As with the above-discuss clustering method, the neural network can be continuously improved through feedback-induced neural-network-node-weight adjustments as well as, in some cases, topological adjustments.

Figure 23C:
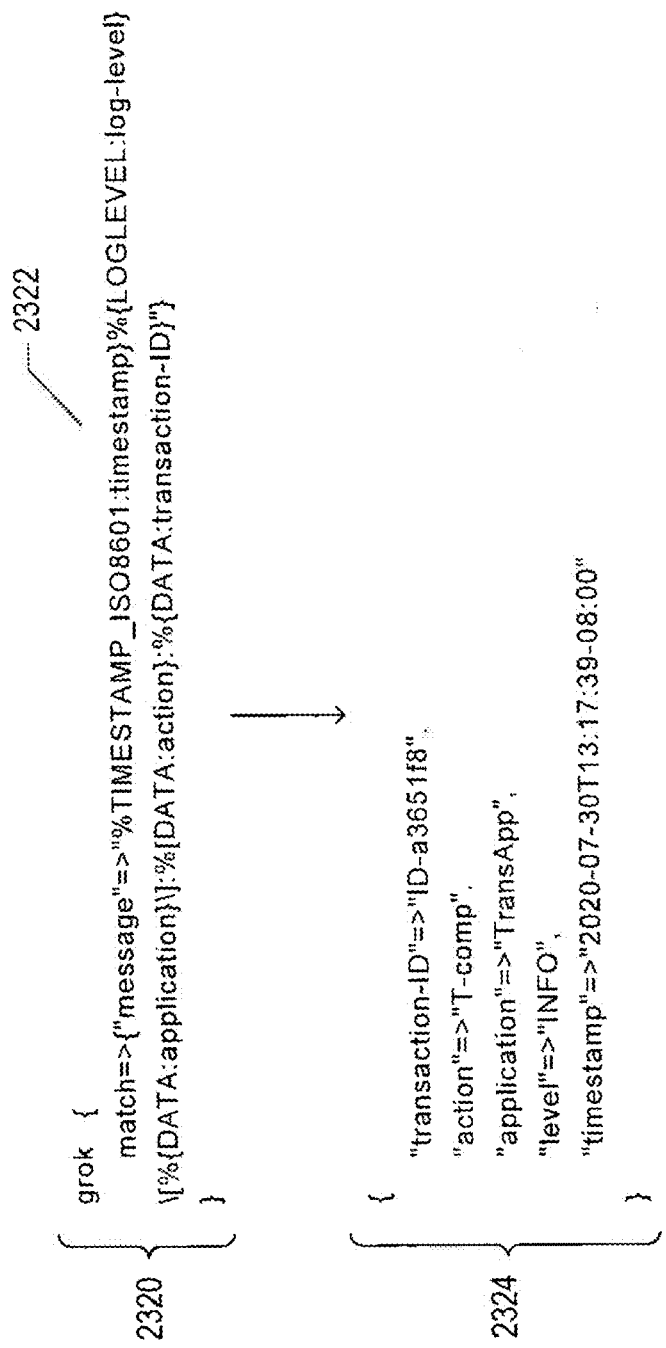

FIGS. 23A-C illustrate one approach to extracting fields from a log/event message. Log/event messages may be understood as containing discrete fields, but, in practice, they are generally alphanumeric character strings. An example log/event message 2302 is shown at the top of FIG. 23A. The five different fields within the log/event message are indicated by labels, such as the label "timestamp" 2304, shown below the log/event message. FIG. 23B includes a variety of labeled regular expressions that are used, as discussed below with reference to FIG. 23C, to extract the values of the discrete fields in log/event message 2302. For example, regular expression 2306 follows the label YEAR 2308. When this regular expression is applied to a character string, it matches either a four-digit indication of a year, such as "2020," or a two-digit indication of the year, such as "20." The string "\d\d" matches two consecutive digits. The "(?>"and")" characters surrounding the string "\d\d" indicates an atomic group that prevents unwanted matches to pairs of digits within strings of digits of length greater than two. The string "{1, 2}" indicates that the regular expression matches either one or two occurrences of a pair of digits. A labeled regular expression can be included in a different regular expression using a preceding string "%{" and a following symbol "}," as used to include the labeled regular expression MINUTE (2310 in FIG. 23B) in the labeled regular expression TIMESTAMP_ISO8601 (2312 in FIG. 23B). There is extensive documentation available for the various elements of regular expressions.

Grok parsing uses regular expressions to extract fields from log/event messages. The popular Logstash software tool uses grok parsing to extract fields from log/event messages and encode the fields according to various different desired formats. For example, as shown in FIG. 23C, the call to the grok parser 2320 is used to apply the quoted regular-expression pattern 2322 to a log/event message with a format of the log/event message 2302 shown in FIG. 23A, producing a formatted indication of the contents of the fields 2324. Regular-expression patterns for the various different types of log/event messages can be developed to identify and extract fields from the log/event messages input to message collectors. When the grok parser unsuccessfully attempts to apply a regular-expression pattern to a log/event message, an error indication is returned. The Logstash tool also provides functionalities for transforming input log/event messages into event tuples. The regular-expression patterns, as mentioned above, can be specified by log/event-message-system users, such as administrative personnel, can be generated by user interfaces manipulated by log/event-message-system users, or may be automatically generated by machine-learning-based systems that automatically develop efficient compression methods based on analysis of log/event-message streams.

Neural Networks

Figure 24:
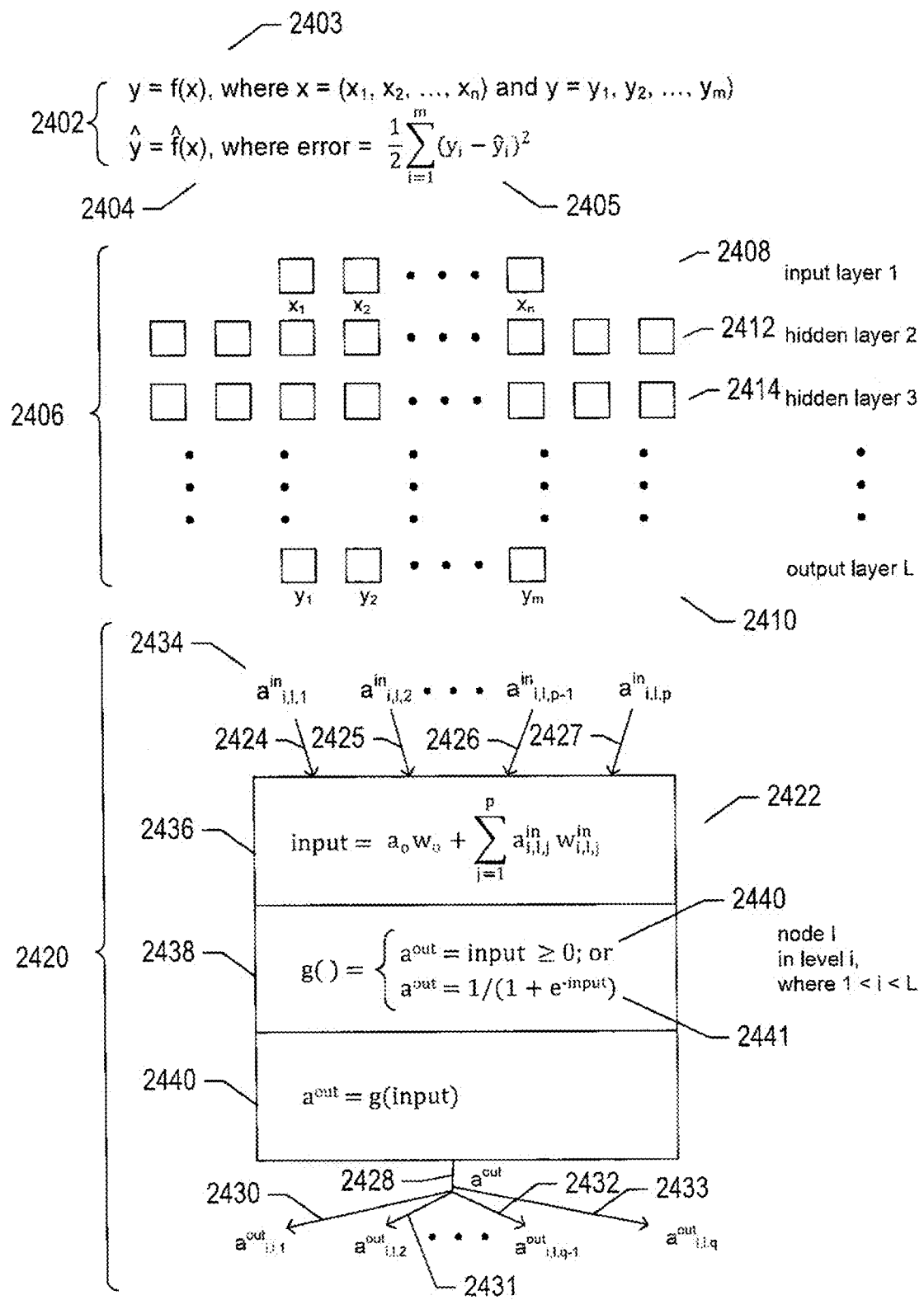
FIG. 24 illustrates the fundamental components of a feed-forward neural network.

FIG. 24 illustrates the fundamental components of a feed-forward neural network. Equations 2402 mathematically represents ideal operation of a neural network as a function $f(x)$. The function receives an input vector x and outputs a corresponding output vector y 2403. For example, an input vector may be a digital image represented by a two-dimensional array of pixel values in an electronic document or may be an ordered set of numeric or alphanumeric values. Similarly, the output vector may be, for example, an altered digital image, an ordered set of one or more numeric or alphanumeric values, an electronic document, or one or more numeric values. The initial expression 2403 represents the ideal operation of the neural network. In other words, the output vectors y represent the ideal, or desired, output for corresponding input vector x. However, in actual operation, a physically implemented neural network $\hat{f}(x)$, as represented by expressions 2404, returns a physically generated output vector $\hat{y}$ that may differ from the ideal or desired output vector y. As shown in the second expression 2405 within expressions 2404, an output vector produced by the physically implemented neural network is associated with an error or loss value. A common error or loss value is the square of the distance between the two points represented by the ideal output vector and the output vector produced by the neural network. To simplify back-propagation computations, discussed below, the square of the distance is often divided by 2. As further discussed below, the distance between the two points represented by the ideal output vector and the output vector produced by the neural network, with optional scaling, may also be used as the error or loss. A neural network is trained using a training dataset comprising input-vector/ideal-output-vector pairs, generally obtained by human or human-assisted assignment of ideal-output vectors to selected input vectors. The ideal-output vectors in the training dataset are often referred to as "labels." During training, the error associated with each output vector, produced by the neural network in response to input to the neural network of a training-dataset input vector, is used to adjust internal weights within the neural network in order to minimize the error or loss. Thus, the accuracy and reliability of a trained neural network is highly dependent on the accuracy and completeness of the training dataset.

As shown in the middle portion 2406 of FIG. 24, a feed-forward neural network generally consists of layers of nodes, including an input layer 2408, and output layer 2410, and one or more hidden layers 2412 and 2414. These layers can be numerically labeled 1, 2, 3, . . . L, as shown in FIG. 24. In general, the input layer contains a node for each element of the input vector and the output layer contains one node for each element of the output vector. The input layer and/or output layer may have one or more nodes. In the following discussion, the nodes of a first level with a numeric label lower in value than that of a second layer are referred to as being higher-level nodes with respect to the nodes of the second layer. The input-layer nodes are thus the highest-level nodes. The nodes are interconnected to form a graph.

The lower portion of FIG. 24 (2420 in FIG. 24) illustrates a feed-forward neural-network node. The neural-network node 2422 receives inputs 2424-2427 from one or more next-higher-level nodes and generates an output 2428 that is distributed to one or more next-lower-level nodes 2430-2433. The inputs and outputs are referred to as "activations," represented by superscripted-and-subscripted symbols "a" in FIG. 24, such as the activation symbol 2434. An input component 2436 within a node collects the input activations and generates a weighted sum of these input activations to which a weighted internal activation $a_0$ is added. An activation component 2438 within the node is represented by a function g( ), referred to as an "activation function." that is used in an output component 2440 of the node to generate the output activation of the node based on the input collected by the input component 2436. The neural-network node 2422 represents a generic hidden-layer node. Input-layer nodes lack the input component 2436 and each receive a single input value representing an element of an input vector. Output-component nodes output a single value representing an element of the output vector. The values of the weights used to generate the cumulative input by the input component 2436 are determined by training, as previously mentioned. In general, the input, outputs, and activation function are predetermined and constant, although, in certain types of neural networks, these may also be at least partly adjustable parameters. In FIG. 24, two different possible activation functions are indicated by expressions 2440 and 2441. The latter expression represents a sigmoidal relationship between input and output that is commonly used in neural networks and other types of machine-learning systems.

Figure 25:
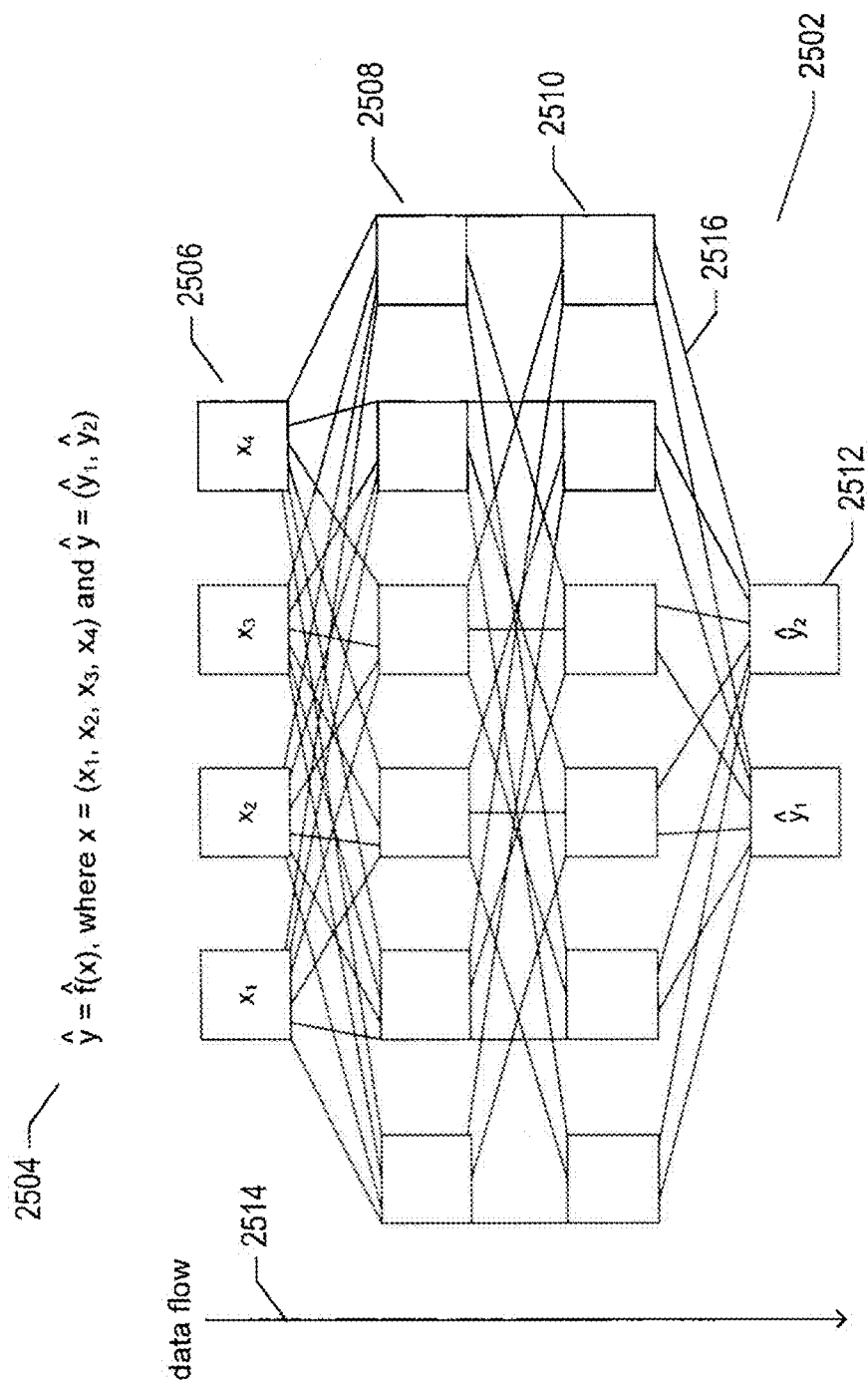
FIG. 25 illustrates a small, example feed-forward neural network.

FIG. 25 illustrates a small, example feed-forward neural network. The example neural network 2502 is mathematically represented by expression 2504. It includes an input layer of four nodes 2506, a first hidden layer 2508 of six nodes, a second hidden layer 2510 of six nodes, and an output layer 2512 of two nodes. As indicated by directed arrow 2514, data input to the input-layer nodes 2506 flows downward through the neural network to produce the final values output by the output nodes in the output layer 2512. The line segments, such as line segment 2516, interconnecting the nodes in the neural network 2502 indicate communications paths along which activations are transmitted from higher-level nodes to lower-level nodes. In the example feed-forward neural network, the nodes of the input layer 2506 are fully connected to the nodes of the first hidden layer 2508, but the nodes of the first hidden layer 2508 are only sparsely connected with the nodes of the second hidden layer 2510. Various different types of neural networks may use different numbers of layers, different numbers of nodes in each of the layers, and different patterns of connections between the nodes of each layer to the nodes in preceding and succeeding layers.

FIG. 26 provides a concise pseudocode illustration of the implementation of a simple feed-forward neural network. Three initial type definitions 2602 provide types for layers of nodes, pointers to activation functions, and pointers to nodes. The class node 2604 represents a neural-network node. Each node includes the following data members: (1) output 2606, the output activation value for the node; (2) g 2607, a pointer to the activation function for the node: (3) weights 2608, the weights associated with the inputs; and (4) inputs 2609, pointers to the higher-level nodes from which the node receives activations. Each node provides an activate member function 2610 that generates the activation for the node, which is stored in the data member output, and a pair of member functions 2612 for setting and getting the value stored in the data member output. The class neuralNet 2614 represents an entire neural network. The neural network includes data members that store the number of layers 2616 and a vector of node-vector layers 2618, each node-vector layer representing a layer of nodes within the neural network. The single member function $f$ 2620 of the class neuralNet generates an output vector y for an input vector x. An implementation of the member function activate for the node class is next provided 2622. This corresponds to the expression shown for the input component 2436 in FIG. 24. Finally, an implementation for the member function $f$ 2624 of the neuralNet class is provided. In a first for-loop 2626, an element of the input vector is input to each of the input-layer nodes. In a pair of nested for-loops 2627, the activate function for each hidden-layer and output-layer node in the neural network is called, starting from the highest hidden layer and proceeding layer-by-layer to the output layer. In a final for-loop 2628, the activation values of the output-layer nodes are collected into the output vector y.

Figure 27:
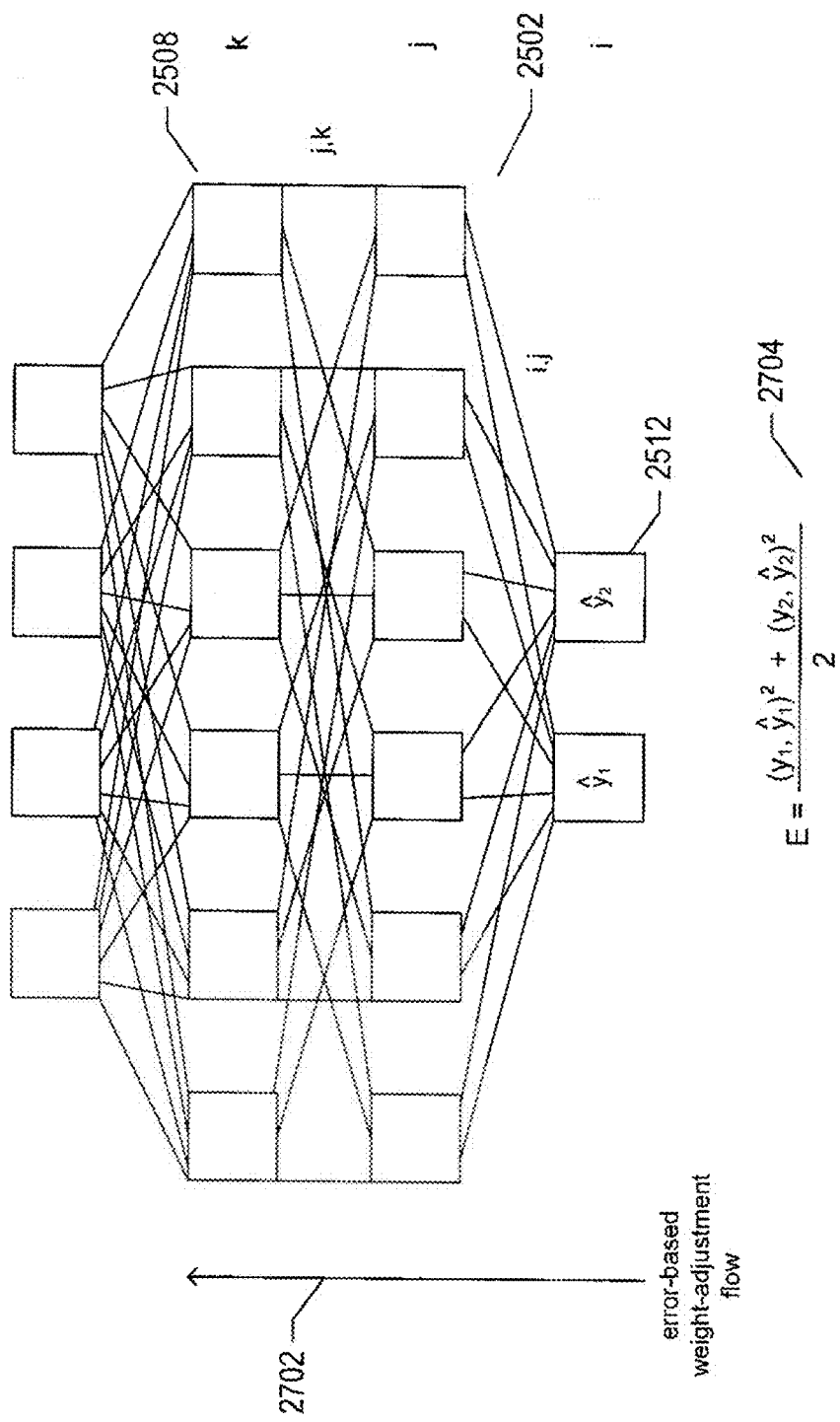
FIG. 27 illustrates back propagation of errors through the neural network during training.

FIG. 27, using the same illustration conventions as used in FIG. 25, illustrates back propagation of errors through the neural network during training. As indicated by directed arrow 2702, the error-based weight adjustment flows upward from the output-layer nodes 2512 to the highest-level hidden-layer nodes 2508. For the example neural network 2502, the error, or loss, is computed according to expression 2704. This loss is propagated upward through the connections between nodes in a process that proceeds in an opposite direction from the direction of activation transmission during generation of the output vector from the input vector. The back-propagation process determines, for each activation passed from one node to another, the value of the partial differential of the error, or loss, with respect to the weight associated with the activation. This value is then used to adjust the weight in order to minimize the error, or loss.

FIGS. 28A-B show the details of the weight-adjustment calculations carried out during back propagation. An expression for the total error, or loss, E with respect to an input-vector/label pair within a training dataset is obtained in a first set of expressions 2802, which is one half the squared distance between the points in a multidimensional space represented by the ideal output and the output vector generated by the neural network. The partial differential of the total error E with respect to a particular weight $w_{i,j}$ for the $j^{th}$ input of an output node i is obtained by the set of expressions 2804. In these expressions, the partial differential operator is propagated rightward through the expression for the total error E. An expression for the derivative of the activation function with respect to the input x produced by the input component of a node is obtained by the set of expressions 2806. This allows for generation of a simplified expression for the partial derivative of the total energy E with respect to the weight associated with the $j^{th}$ input of the $i^{th}$ output node 2808. The weight adjustment based on the total error E is provided by expression 2810, in which r has a real value in the range [0-1] that represents a learning rate, $a_j$ is the activation received through input j by node i, and $\Delta_i$ is the product of parenthesized terms, which include $a_i$ and $y_i$, in the first expression in expressions 2808 that multiplies $a_j$. FIG. 28B provides a derivation of the weight adjustment for the hidden-layer nodes above the output layer. It should be noted that the computational overhead for calculating the weights for each next highest layer of nodes increases geometrically, as indicated by the increasing number of subscripts for the Δ multipliers in the weight-adjustment expressions.

Figure 29A:
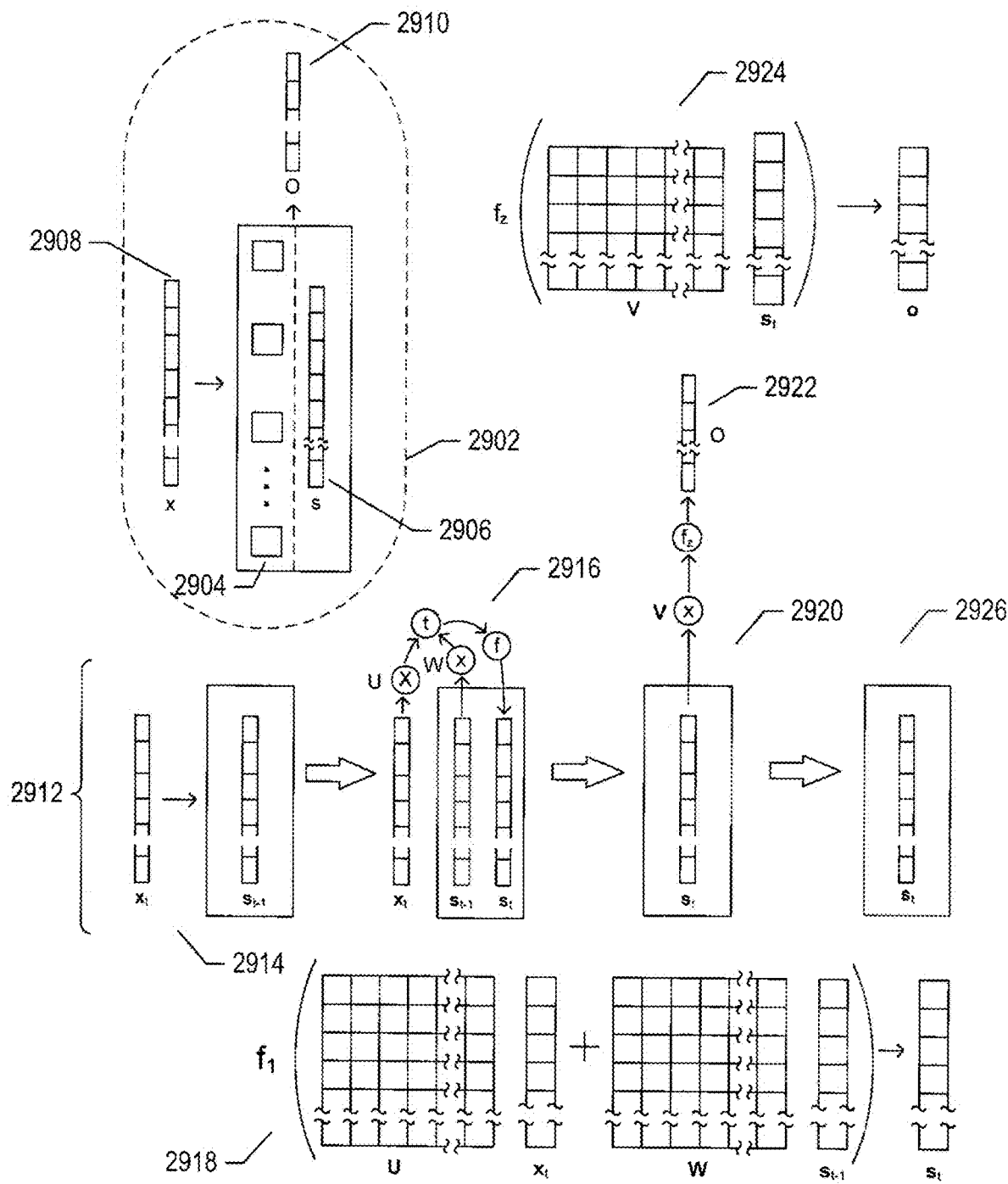
FIGS. 29A-C illustrate various aspects of recurrent neural networks.
Figure 29B:
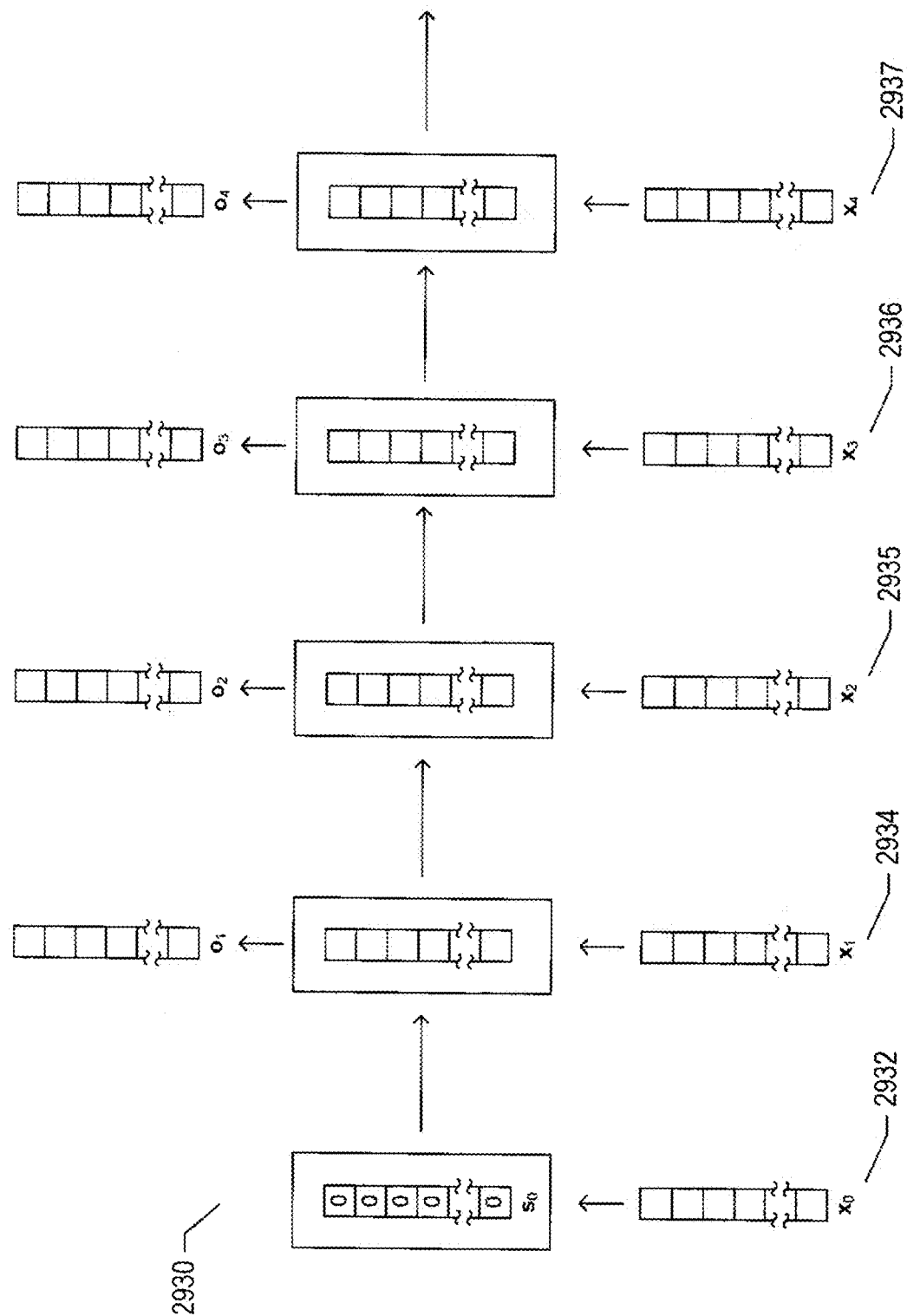

A second type of neural network, referred to as a "recurrent neural network," is employed to generate sequences of output vectors from sequences of input vectors. These types of neural networks are often used for natural-language applications in which a sequence of words forming a sentence are sequentially processed to produce a translation of the sentence, as one example. FIGS. 29A-B illustrate various aspects of recurrent neural networks. Inset 2902 in FIG. 29A shows a representation of a set of nodes within a recurrent neural network. The set of nodes includes nodes that are implemented similarly to those discussed above with respect to the feed-forward neural network 2904, but additionally include an internal state 2906. In other words, the nodes of a recurrent neural network include a memory component. The set of recurrent-neural-network nodes, at a particular time point in a sequence of time points, receives an input vector x 2908 and produces an output vector 2910. The process of receiving an input vector and producing an output vector is shown in the horizontal set of recurrent-neural-network-nodes diagrams interleaved with large arrows 2912 in FIG. 29A. In a first step 2914, the input vector x at time t is input to the set of recurrent-neural-network nodes which include an internal state generated at time t−1. In a second step 2916, the input vector is multiplied by a set of weights U and the current state vector is multiplied by a set of weights W to produce two vector products which are added together to generate the state vector for time t. This operation is illustrated as a vector function $f_1$ 2918 in the lower portion of FIG. 29A. In a next step 2920, the current state vector is multiplied by a set of weights V to produce the output vector for time t 2922, a process illustrated as a vector function $f_2$ 2924 in FIG. 29A. Finally, the recurrent-neural-network nodes are ready for input of a next input vector at time t+1, in step 2926.

FIG. 29B illustrates processing by the set of recurrent-neural-network nodes of a series of input vectors to produce a series of output vectors. At a first time $t_0$ 2930, a first input vector $x_0$ 2932 is input to the set of recurrent-neural-network nodes. At each successive time point 2934-2937, a next input vector is input to the set of recurrent-neural-network nodes and an output vector is generated by the set of recurrent-neural-network nodes. In many cases, only a subset of the output vectors are used. Back propagation of the error or loss during training of a recurrent neural network is similar to back propagation for a feed-forward neural network, except that the total error or loss needs to be back-propagated through time in addition to through the nodes of the recurrent neural network. This can be accomplished by unrolling the recurrent neural network to generate a sequence of component neural networks and by then back-propagating the error or loss through this sequence of component neural networks from the most recent time to the most distant time period.

Figure 29C:
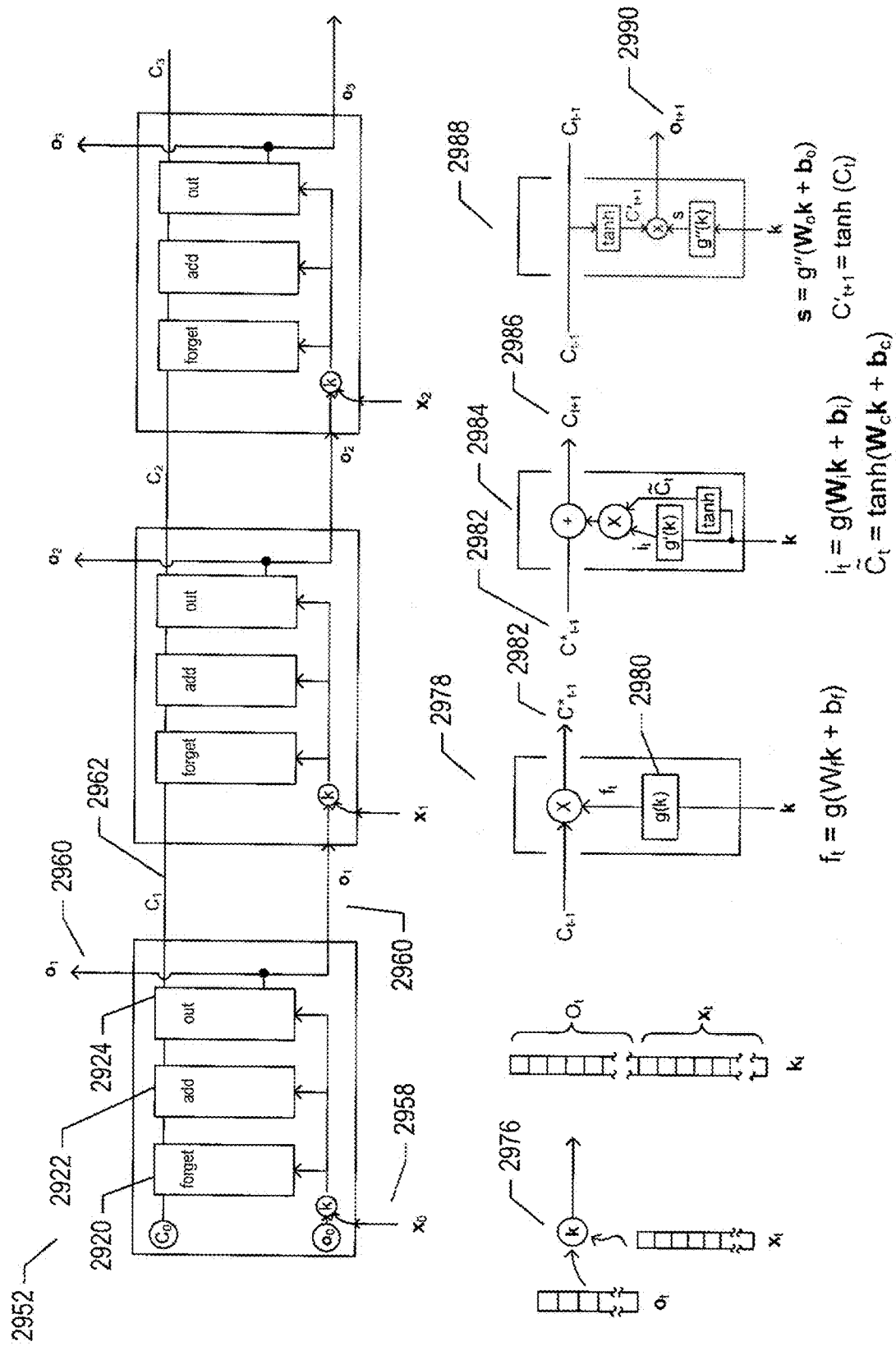

Finally, for completeness, FIG. 29C illustrates a type of recurrent-neural-network node referred to as a long-short-term-memory ("LSTM") node. In FIG. 29C, a LSTM node 2952 is shown at three successive points in time 2954-2956. State vectors and output vectors appear to be passed between different nodes, but these horizontal connections instead illustrate the fact that the output vector and state vector are stored within the LSTM node at one point in time for use at the next point in time. At each time point, the LSTM node receives an input vector 2958 and outputs an output vector 2960. In addition, the LSTM node outputs a current state 2962 forward in time. The LSTM node includes a forget module 2970, an add module 2972, and an out module 2974. Operations of these modules are shown in the lower portion of FIG. 29C. First, the output vector produced at the previous time point and the input vector received at a current time point are concatenated to produce a vector k 2976. The forget module 2978 computes a set of multipliers 2980 that are used to element-by-element multiply the state from time t−1 in order to produce an altered state 2982. This allows the forget module to delete or diminish certain elements of the state vector. The add module 2134 employs an activation function to generate a new state 2986 from the altered state 2982. Finally, the out module 2988 applies an activation function to generate an output vector 2140 based on the new state and the vector k. An LSTM node, unlike the recurrent-neural-network node illustrated in FIG. 29A, can selectively alter the internal state to reinforce certain components of the state and deemphasize or forget other components of the state in a manner reminiscent of human short-term memory. As one example, when processing a paragraph of text, the LSTM node may reinforce certain components of the state vector in response to receiving new input related to previous input but may diminish components of the state vector when the new input is unrelated to the previous input, which allows the LSTM to adjust its context to emphasize inputs close in time and to slowly diminish the effects of inputs that are not reinforced by subsequent inputs. Here again, back propagation of a total error or loss is employed to adjust the various weights used by the LSTM, but the back propagation is significantly more complicated than that for the simpler recurrent neural-network nodes discussed with reference to FIG. 29A.

Figure 30A:
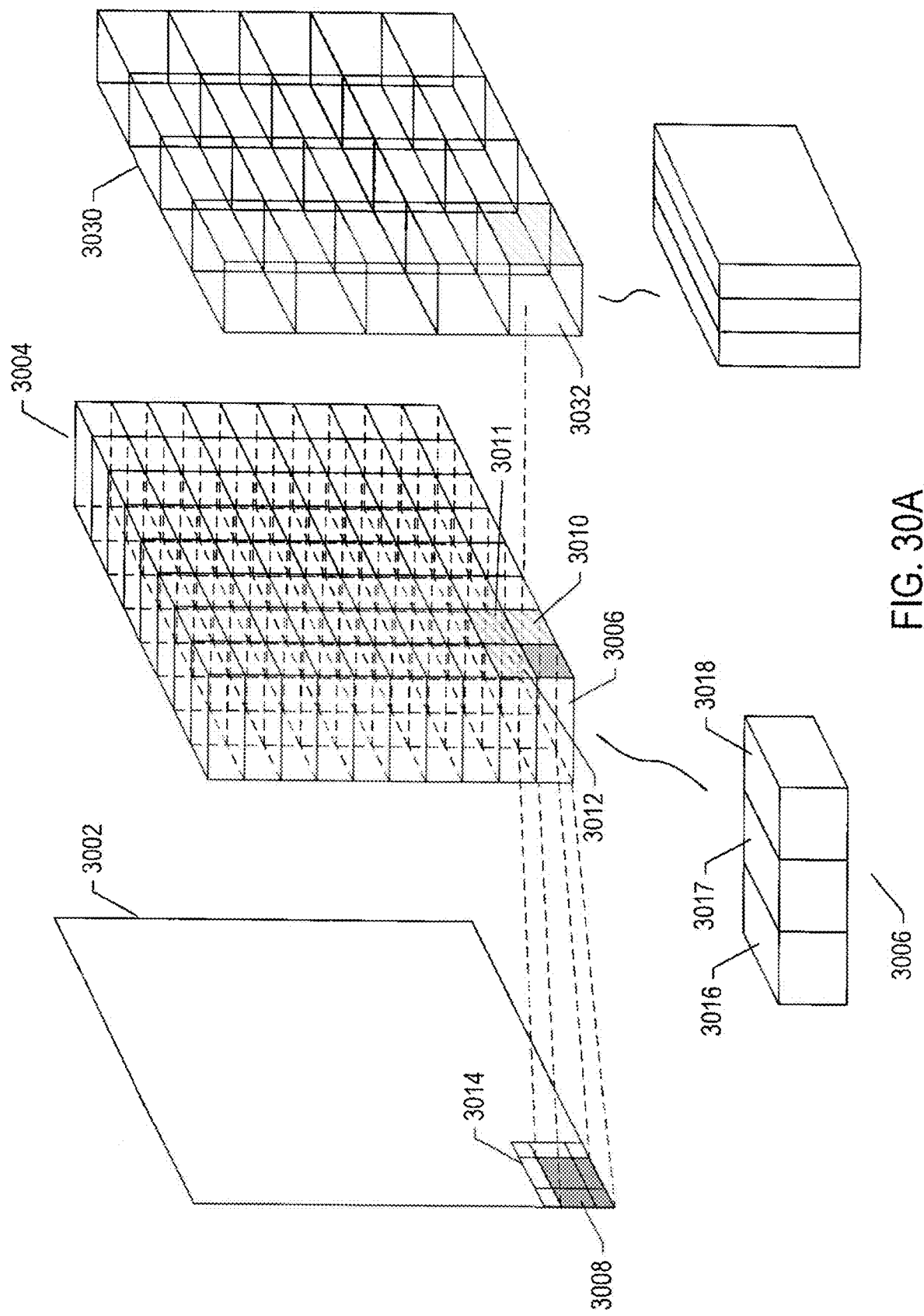
FIGS. 30A-C illustrate a convolutional neural network.
Figure 30B:
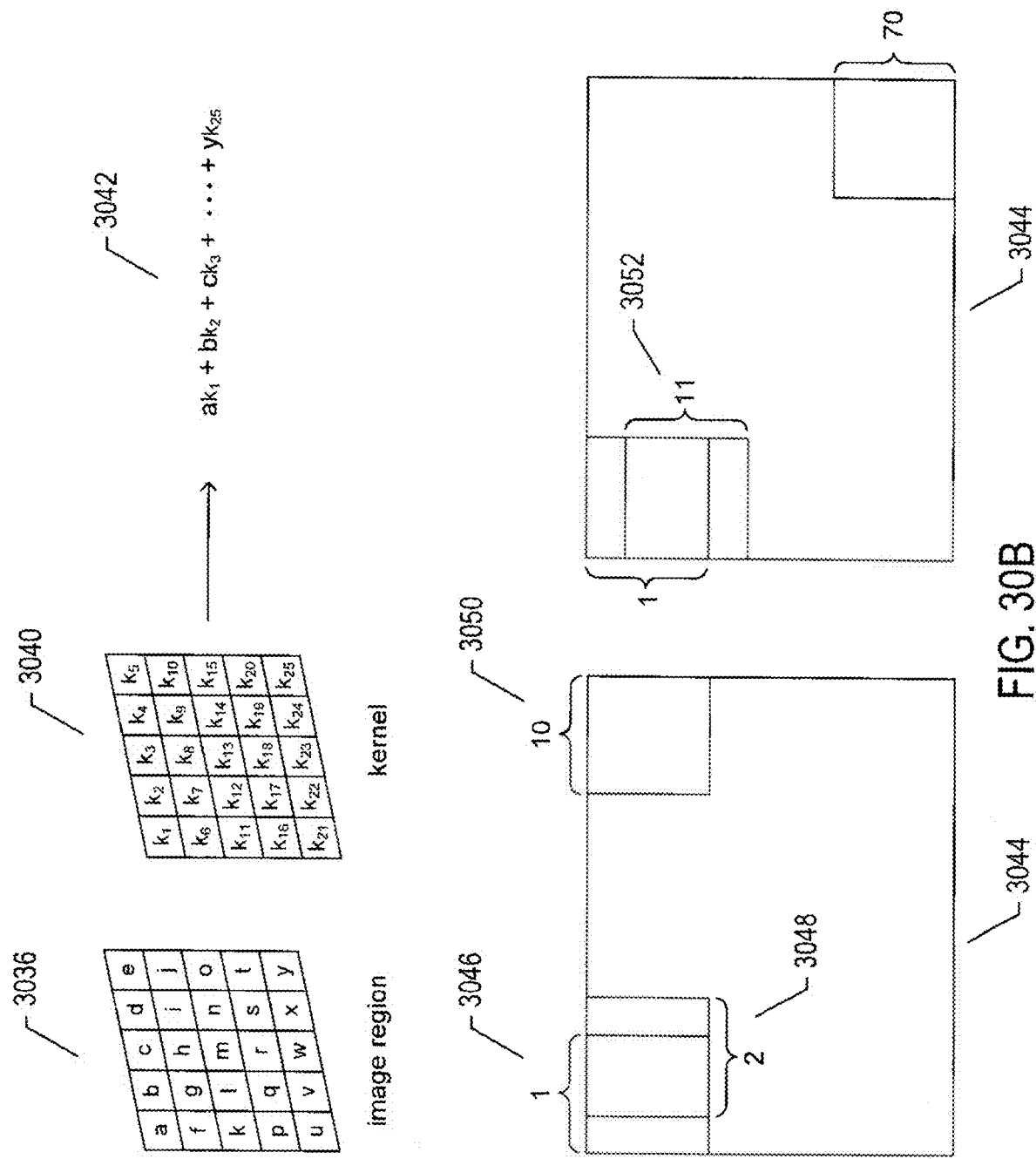
Figure 30C:
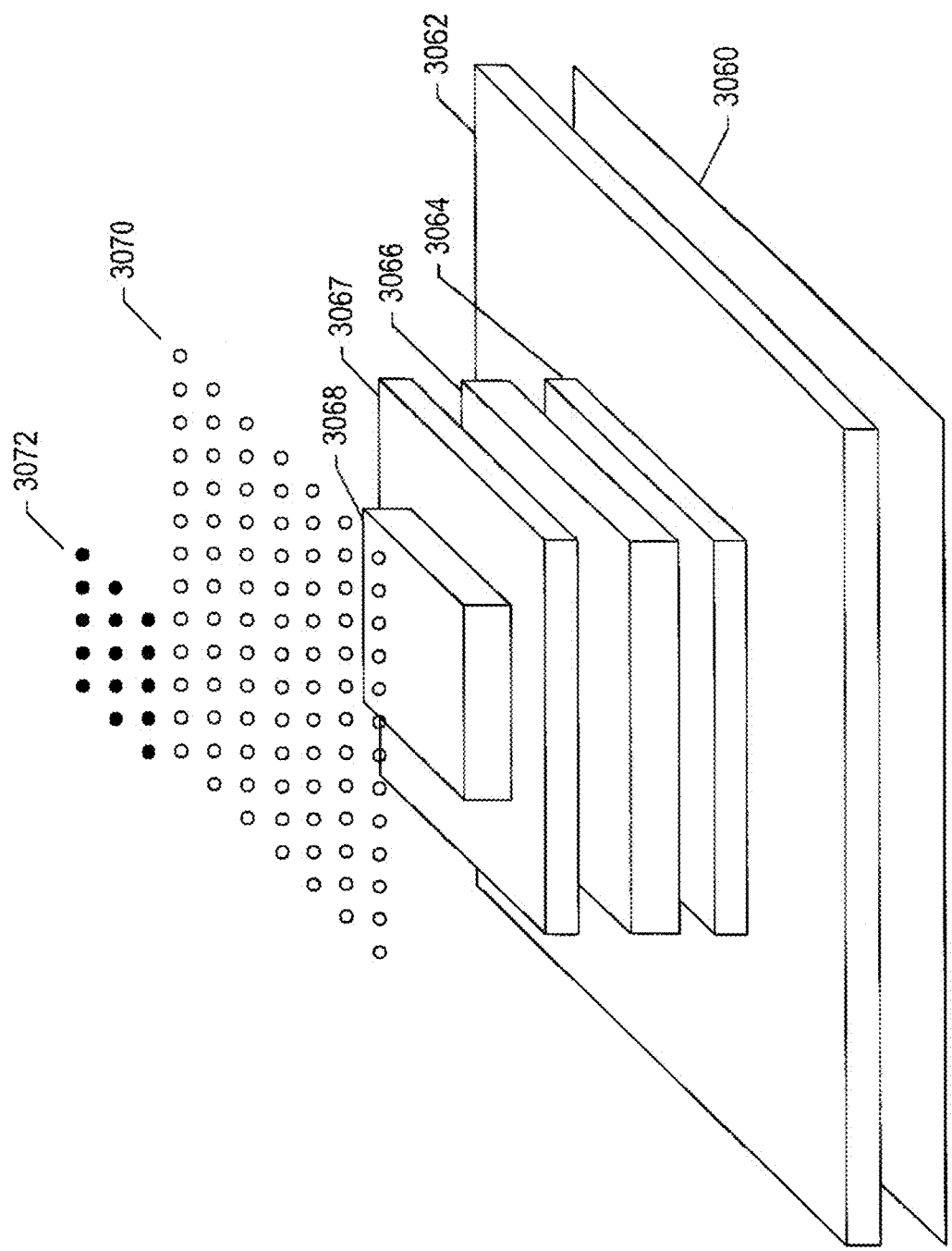

FIGS. 30A-C illustrate a convolutional neural network. Convolutional neural networks are currently used for image processing, voice recognition, and many other types of machine-learning tasks for which traditional neural networks are impractical. In FIG. 30A, a digitally encoded screen-capture image 3002 represents the input data for a convolutional neural network. A first level of convolutional-neural-network nodes 3004 each process a small subregion of the image. The subregions processed by adjacent nodes overlap. For example, the corner node 3006 processes the shaded subregion 3008 of the input image. The set of four nodes 3006 and 3010-3012 together process a larger subregion 3014 of the input image. Each node may include multiple subnodes. For example, as shown in FIG. 30A, node 3006 includes 3 subnodes 3016-3018. The subnodes within a node all process the same region of the input image, but each subnode may differently process that region to produce different output values. Each type of subnode in each node in the initial layer of nodes 3004 uses a common kernel or filter for subregion processing, as discussed further below. The values in the kernel or filter are the parameters, or weights, that are adjusted during training. However, since all the nodes in the initial layer use the same three subnode kernels or filters, the initial node layer is associated with only a comparatively small number of adjustable parameters. Furthermore, the processing associated with each kernel or filter is more or less translationally invariant, so that a particular feature recognized by a particular type of subnode kernel is recognized anywhere within the input image that the feature occurs. This type of organization mimics the organization of biological image-processing systems. A second layer of nodes 3030 may operate as aggregators, each producing an output value that represents the output of some function of the corresponding output values of multiple nodes in the first node layer 3004. For example, second-a layer node 3032 receives, as input, the output from four first-layer nodes 3006 and 3010-3012 and produces an aggregate output. As with the first-level nodes, the second-level nodes also contain subnodes, with each second-level subnode producing an aggregate output value from outputs of multiple corresponding first-level subnodes.

FIG. 30B illustrates the kernel-based or filter-based processing carried out by a convolutional neural network node. A small subregion of the input image 3036 is shown aligned with a kernel or filter 3040 of a subnode of a first-layer node that processes the image subregion. Each pixel or cell in the image subregion 3036 is associated with a pixel value. Each corresponding cell in the kernel is associated with a kernel value, or weight. The processing operation essentially amounts to computation of a dot product 3042 of the image subregion and the kernel, when both are viewed as vectors. As discussed with reference to FIG. 30A, the nodes of the first level process different, overlapping subregions of the input image, with these overlapping subregions essentially tiling the input image. For example, given an input image represented by rectangles 3044, a first node processes a first subregion 3046, a second node may process the overlapping, right-shifted subregion 3048, and successive nodes may process successively right-shifted subregions in the image up through a tenth subregion 3050. Then, a next down-shifted set of subregions, beginning with an eleventh subregion 3052, may be processed by a next row of nodes.

FIG. 30C illustrates the many possible layers within the convolutional neural network. The convolutional neural network may include an initial set of input nodes 3060, a first convolutional node layer 3062, such as the first layer of nodes 3004 shown in FIG. 30A, and aggregation layer 3064, in which each node processes the outputs for multiple nodes in the convolutional node layer 3062, and additional types of layers 3066-3068 that include additional convolutional, aggregation, and other types of layers. Eventually, the subnodes in a final intermediate layer 3068 are expanded into a node layer 3070 that forms the basis of a traditional, fully connected neural-network portion with multiple node levels of decreasing size that terminate with an output-node level 3072.

Figure 31A:
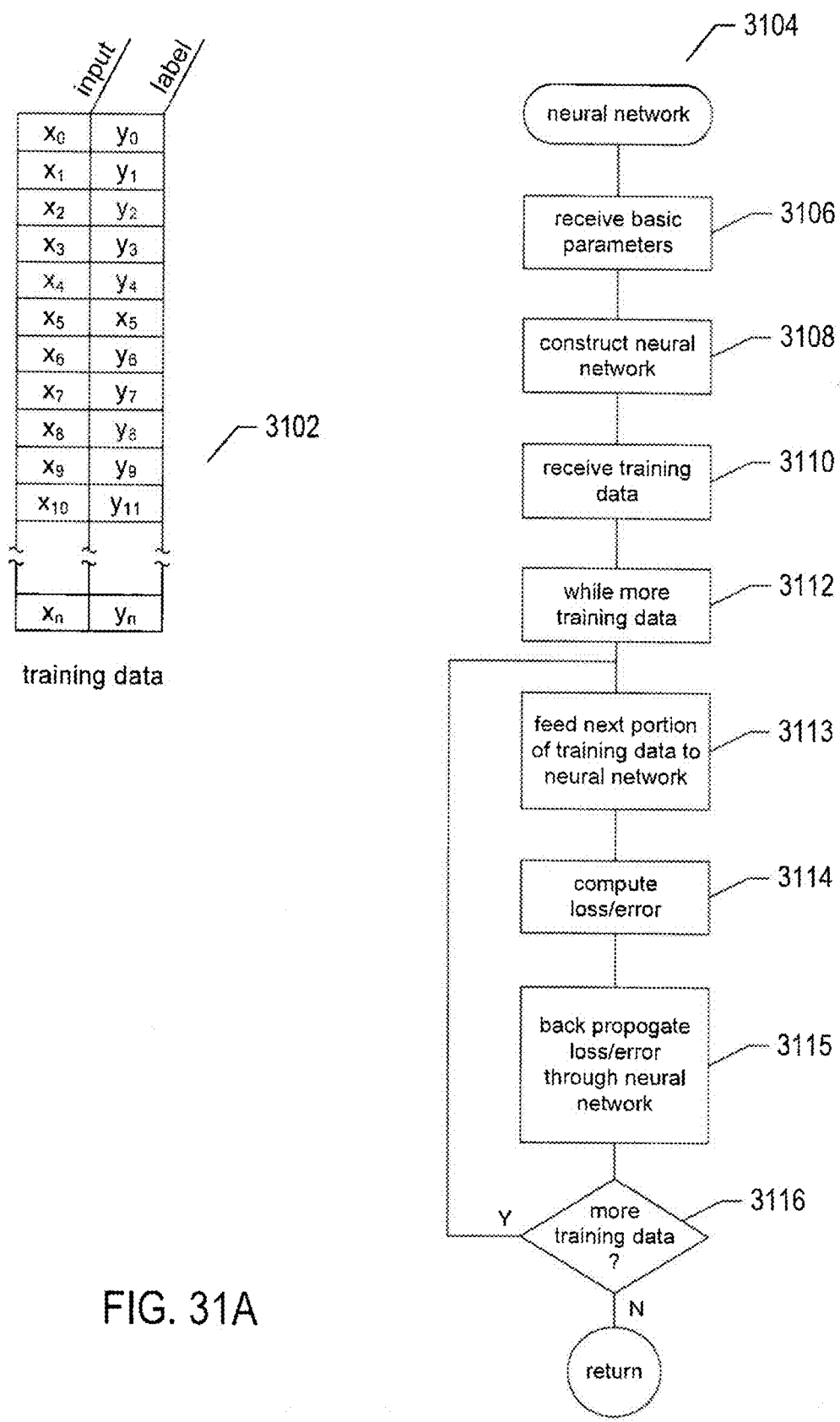
FIGS. 31A-B illustrate neural-network training as an example of machine-learning-based-subsystem training.
Figure 31B:
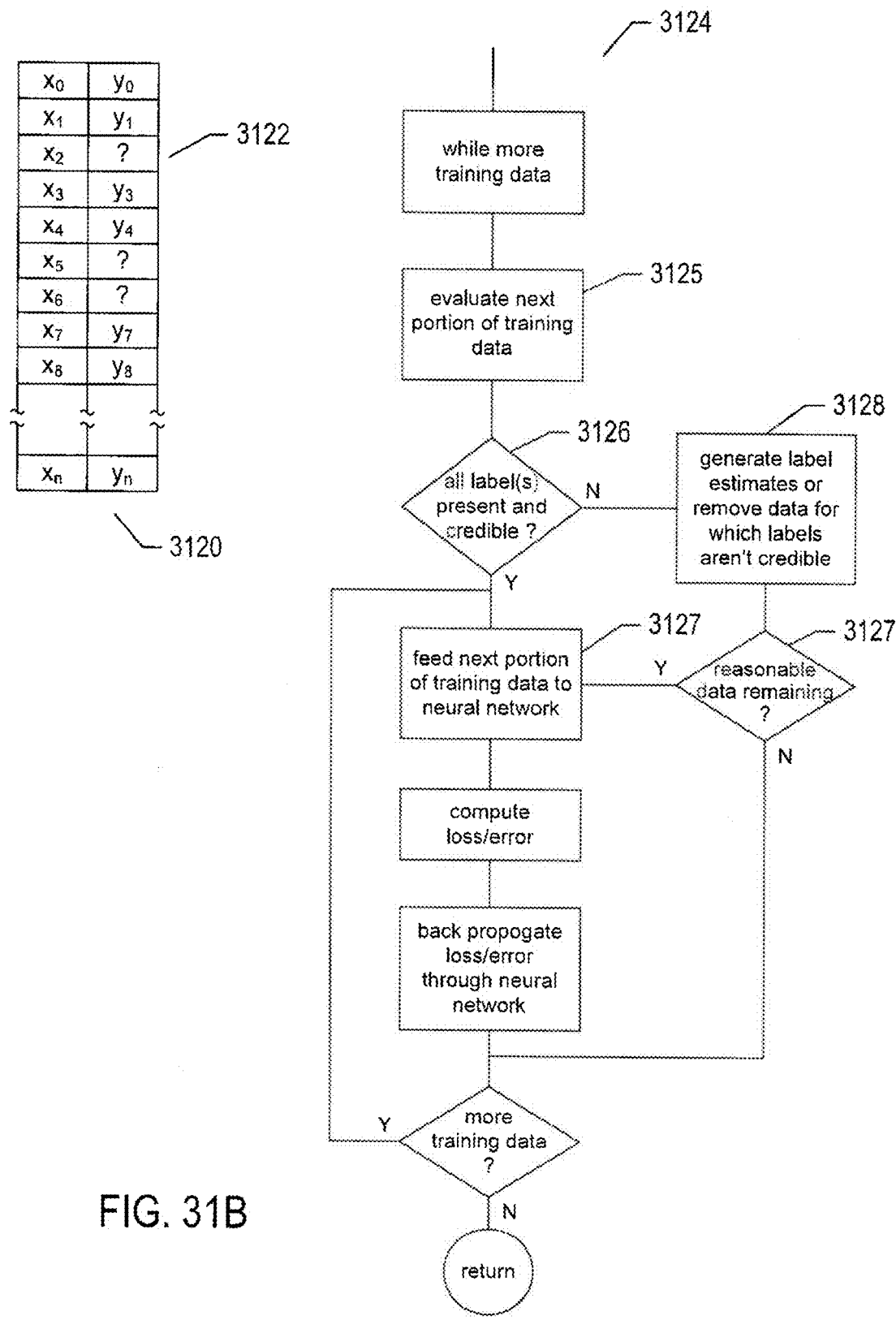

FIGS. 31A-B illustrate neural-network training as an example of machine-learning-based-subsystem training. FIG. 31A illustrates the construction and training of a neural network using a complete and accurate training dataset. The training dataset is shown as a table of input-vector/label pairs 3102, in which each row represents an input-vector/label pair. The control-flow diagram 3104 illustrates construction and training of a neural network using the training dataset. In step 3106, basic parameters for the neural network are received, such as the number of layers, number of nodes in each layer, node interconnections, and activation functions. In step 3108, the specified neural network is constructed. This involves building representations of the nodes, node connections, activation functions, and other components of the neural network in one or more electronic memories and may involve, in certain cases, various types of code generation, resource allocation and scheduling, and other operations to produce a fully configured neural network that can receive input data and generate corresponding outputs. In many cases, for example, the neural network may be distributed among multiple computer systems and may employ dedicated communications and shared memory for propagation of activations and total error or loss between nodes. It should again be emphasized that a neural network is a physical system comprising one or more computer systems, communications subsystems, and often multiple instances of computer-instruction-implemented control components.

In step 3110, training data represented by table 3102 is received. Then, in the while-loop of steps 3112-3116, portions of the training data are iteratively input to the neural network, in step 3113, the loss or error is computed, in step 3114, and the computed loss or error is back-propagated through the neural network step 3115 to adjust the weights. The control-flow diagram refers to portions of the training data rather than individual input-vector/label pairs because, in certain cases, groups of input-vector/label pairs are processed together to generate a cumulative error that is back-propagated through the neural network. A portion may, of course, include only a single input-vector/label pair.

FIG. 31B illustrates one method of training a neural network using an incomplete training dataset. Table 3120 represents the incomplete training dataset. For certain of the input-vector/label pairs, the label is represented by a "?" symbol, such as in the input-vector/label pair 3122. The "?" symbol indicates that the correct value for the label is unavailable. This type of incomplete data set may arise from a variety of different factors, including inaccurate labeling by human annotators, various types of data loss incurred during collection, storage, and processing of training datasets, and other such factors. The control-flow diagram 3124 illustrates alterations in the while-loop of steps 3112-3116 in FIG. 31A that might be employed to train the neural network using the incomplete training dataset. In step 3125, a next portion of the training dataset is evaluated to determine the status of the labels in the next portion of the training data. When all of the labels are present and credible, as determined in step 3126, the next portion of the training dataset is input to the neural network, in step 3127, as in FIG. 31A. However, when certain labels are missing or lack credibility, as determined in step 3126, the input-vector/label pairs that include those labels are removed or altered to include better estimates of the label values, in step 3128. When there is reasonable training data remaining in the training-data portion following step 3128, as determined in step 3129, the remaining reasonable data is input to the neural network in step 3127. The remaining steps in the while-loop are equivalent to those in the control-flow diagram shown in FIG. 31A. Thus, in this approach, either suspect data is removed, or better labels are estimated, based on various criteria, for substitution for the suspect labels.

Neural networks can be used for a variety of different computational tasks. They can be used for classification input data, as for example, for determining the event types of input messages. They can be used for prediction of future data points of metric data, such as predicting future metric data points, or forecasting future metric data points, by a recurrent neural network. Neural networks can be trained to recognize words in spoken language or to provide translations of terms and phrases in one language to equivalent terms and phrase in another language.

ARIMA Prediction

FIGS. 32A-F illustrate metric-value prediction based on the autoregressive-integrated-moving-average ("ARIMA") model. A metric, in the context of the current discussion, is a series of numeric values produced by a component, device, executable, or subsystem within a distributed computer system. Generally, a metric can be thought of as a discrete function $x_i = f(t)$ that produces, for a given time point selected from a set of discrete time points, a value $x_i$ corresponding to a characteristic of a component, device, executable, or subsystem of a distributed computer system or of the distributed computer system in its entirety. In many cases, the discrete time points occur at a fixed interval from one another. When analytical methods require that the discrete time points occur at a fixed interval, but the intervals between data points in a metric data set are irregular, various estimation methods can be used to estimate metric the values of data points at fixed intervals from the metric data set. Examples of metrics include the amount of remaining storage capacity in a data-storage appliance, the number of instructions executed by a processor per unit time, the number of bytes transferred through a network per unit time, and the number of cache faults generated by a particular processor over a recent time window. The time-ordered values corresponding to a sequence of data points in a metric data set are generally numeric values, such as integers and floating-point values, but may also be other types of values that can be mapped to integers, real numbers, vectors, and other numeric quantities.

Figure 32A:
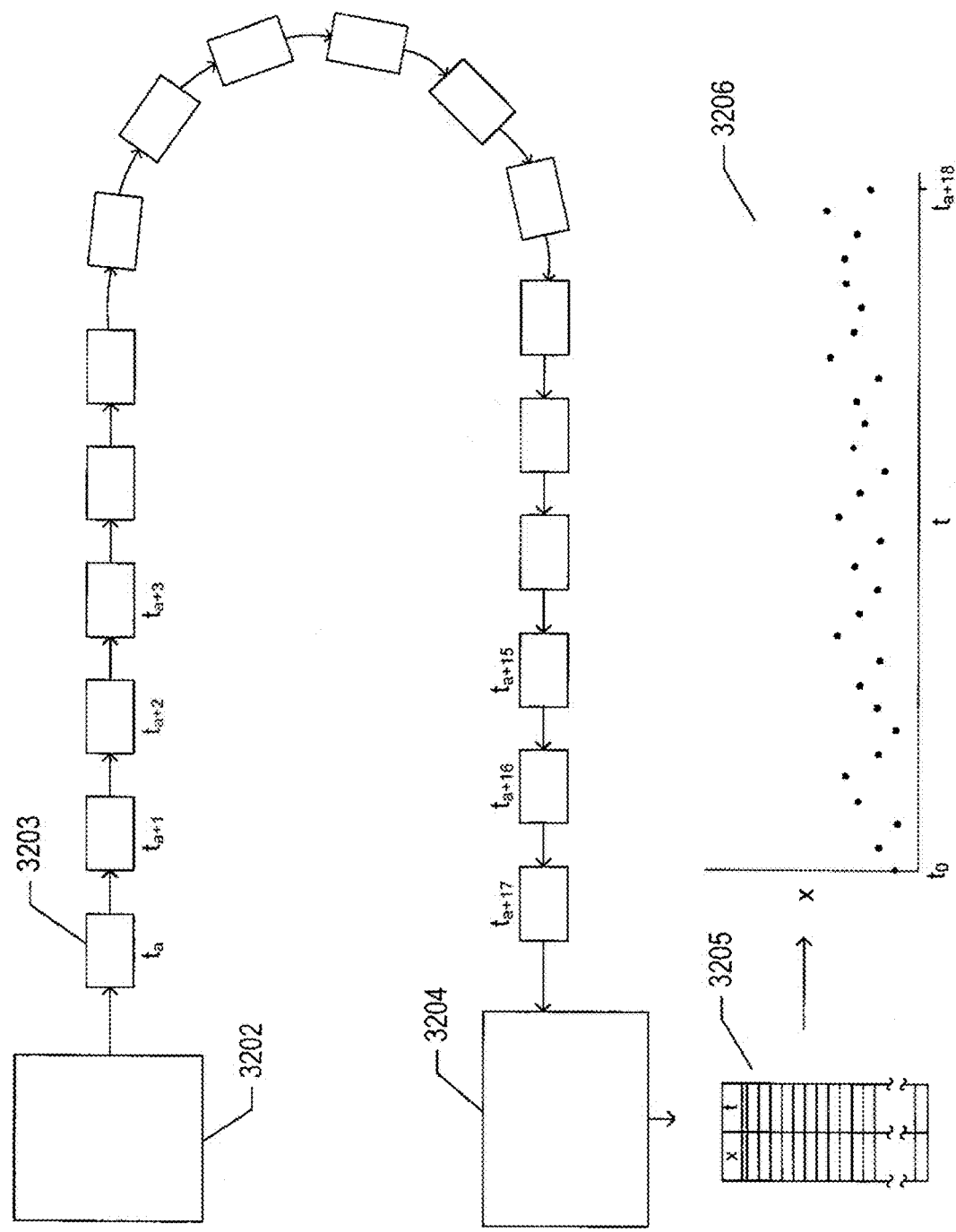

FIG. 32A illustrates metric data obtained from a series of log/event messages. Rectangle 3202 represents a component, device, executable, or subsystem of a distributed computer system, referred to below as a "log/event-message source." The log/event-message source emits, over time, log/event messages of a particular event type, such as log/event message 3203. The emitted log/event messages are transmitted by the log/event-message source to a message collector 3204 which, as discussed above, is a collection point for a log/event-message-processing system that includes message collectors, message-processing-and-ingestion systems, and other components. Ultimately, the log/event messages or values extracted from the log/event messages are stored and made available for query-based access. In essence, the time-ordered sequence of extracted values from log/event messages of a particular type emitted by a particular log/event-message source can be thought of as an example of the above-mentioned discrete function $x_i = f(t)$, which may be represented in tabular form 3205 or as a two-dimensional plot 3206.

Time-series analysis is well-developed field of mathematical analysis that is used to analyze, and generate predictions for, timeseries, such as the above-discussed discrete function $x_i = f(t)$ generated from metric values extracted from log/event messages. Many time-series-analysis techniques depend on the time points associated with values to occur at a fixed interval and, as discussed above, when metric values are not collected at a fixed interval, the collected values can be transformed into a set of fixed-interval metric values using various estimation and approximation methods. For certain types of time-series analysis, a time-ordered set of metric values can be modeled as an underlying random, white-noise signal combined with an information-containing signal, portions of which that can be modeled by a polynomial function applied to time windows of white-noise-signal data points.

Figure 32B:
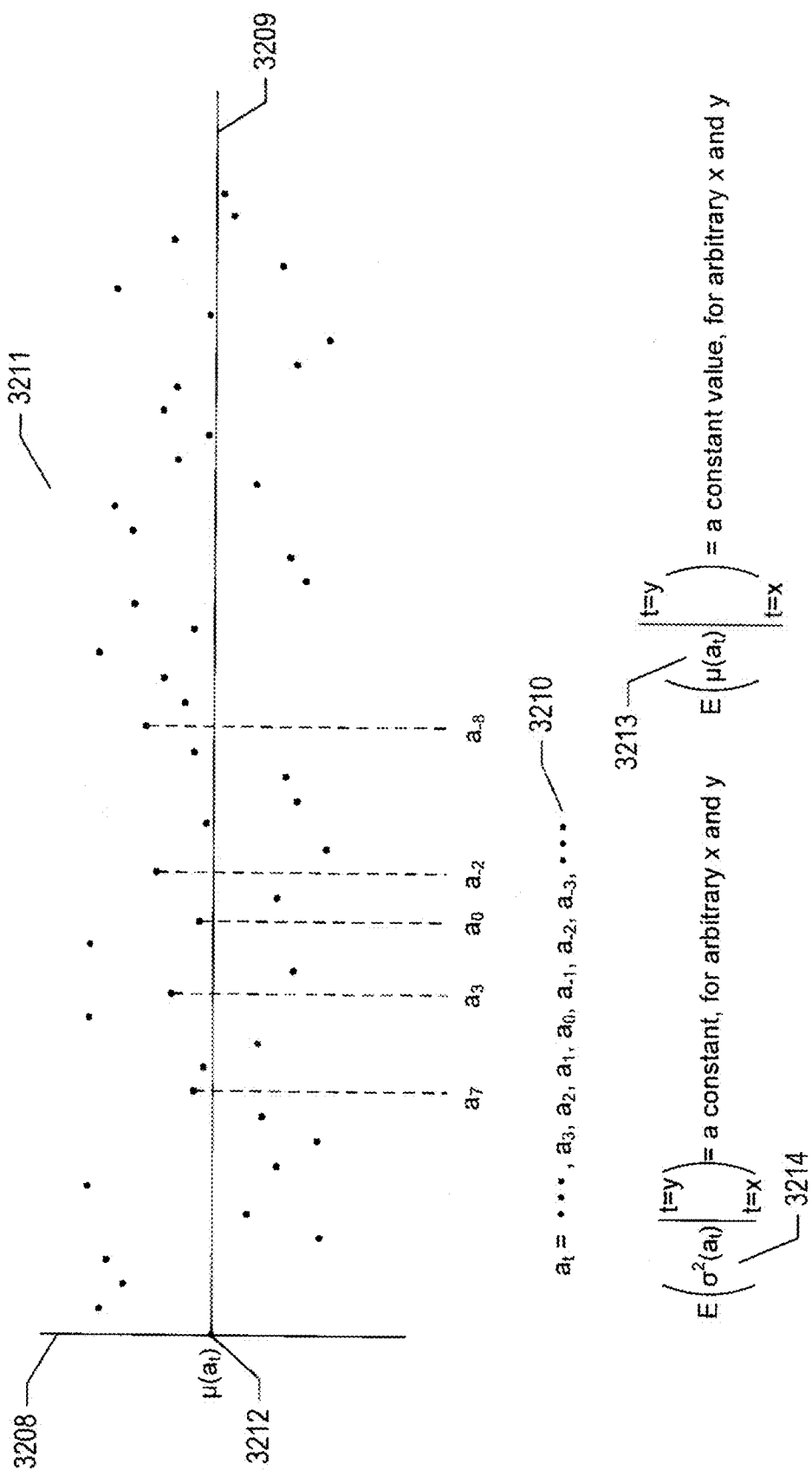

FIG. 32B shows a plot of a random white-noise signal with data points collected at a fixed, repeating time interval. The vertical axis 3208 represents white-noise-signal values and the horizontal axis 3209 represents time. The random, white-noise signal $a_t$ is a series of random, white-noise-signal data points ordered in time, as indicated by expression 3210. Each data point represents a value/time pair. Note that the time indices decrease in a rightward direction along the series, since the earlier-in-time data points are generated before the later-in-time data points. Integers are used to represent the time points with respect to an arbitrary origin. As can be seen in the two-dimensional plot 3211 of the random, white-noise signal, the values of the data points fluctuate about a mean value 3212. One characteristic of a random, white-noise signal is that predicted values of both the mean value 3213 and the variance 3214 computed for any particular time interval from the signal data points are constants, regardless of the width of the time interval and location of the time interval along the horizontal time axis.

Figure 32C:
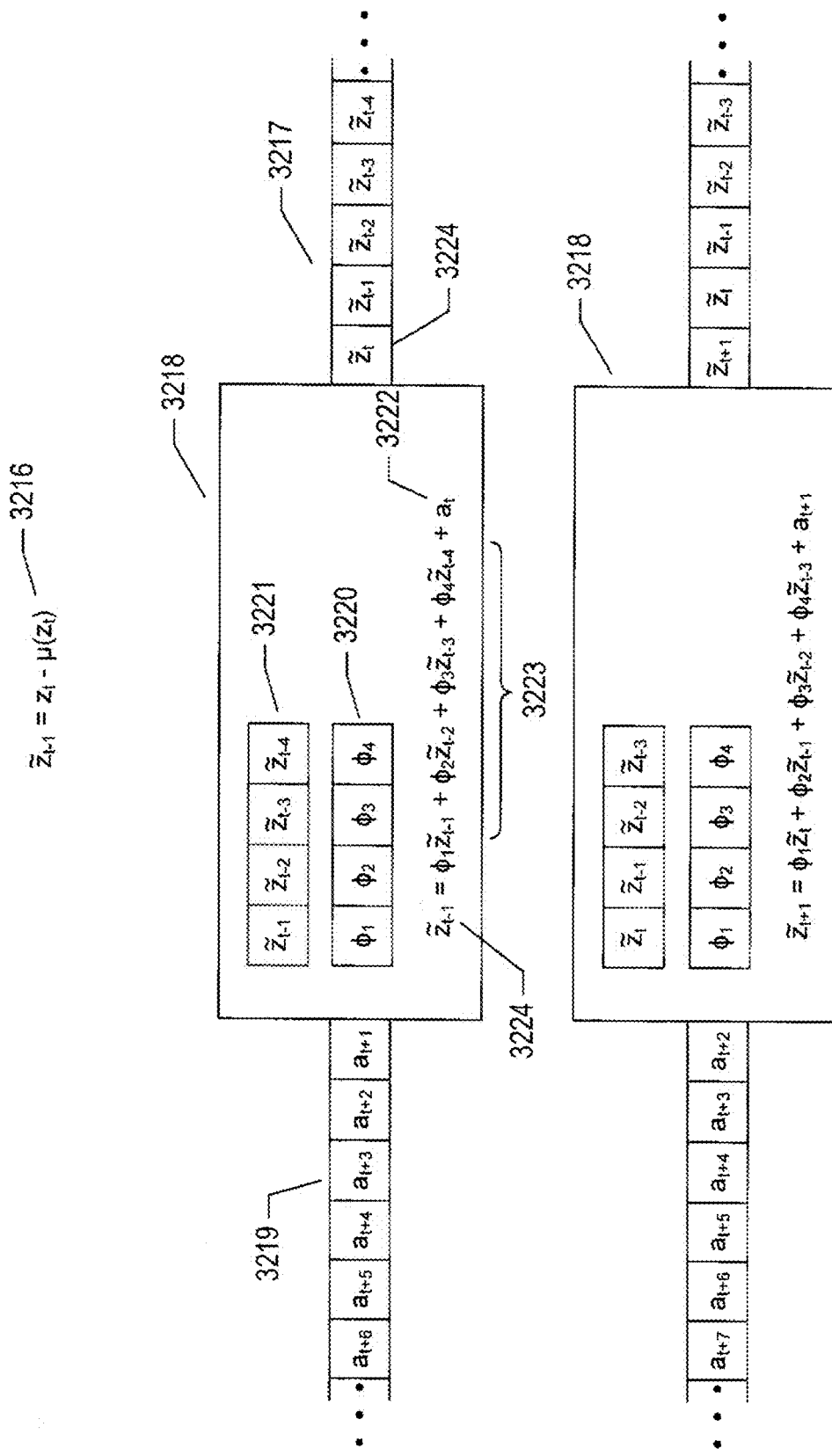
Figure 32D:
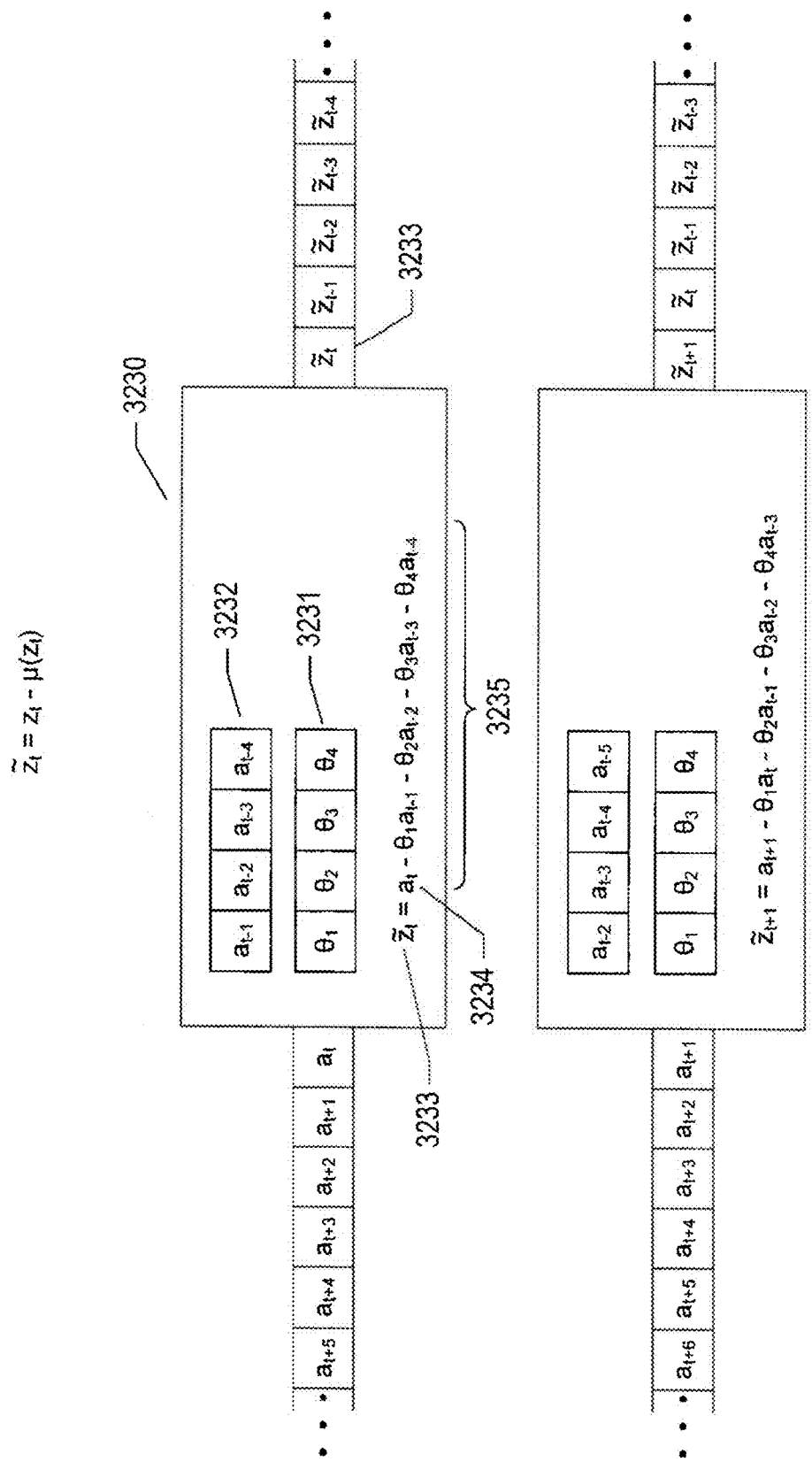

FIGS. 32C-D illustrate two different models for a time-series, such as a time-ordered set of metric values. In these figures, in subsequent figures, and in the accompanying discussion, the notation $z_t$ may refer to an entire time series over a sequence of time points t or to a particular data point, at time t, of the time series. The meaning should be clear from the context. In addition, various operators, discussed below, that can be applied to an entire time series can also be applied to individual data points of a time series. Similarly, $a_t$ may refer to the entire random, white-noise signal or to a particular data point of the random, white-noise signal for time t.

FIG. 32C shows a linear-filter representation of the time series $\tilde{z}_t$ as the output from a linear filter to which a random, white-noise signal is input. The time series $\tilde{z}_t$ is a series of deviations of the values of a metric-data series $z_t$ from the mean of the metric-data series $\mu(z_t)$, as indicated by expression 3216. The time series $\tilde{z}_t$ is output 3217 from the linear filter 3218 in response to input of the random, white-noise signal 3219. The linear filter 3218 includes a time-ordered set of coefficients 3220 and a history of the most recently generated $\tilde{z}_t$ values 3221. The currently input random, white-noise-signal data point $a_t$ 3222 is used, along with a set of terms 3223, each comprising one of the coefficients of the time-ordered set of coefficients 3220 and an associated historical data point selected from the history 3221, to generate a current value for the time series $\tilde{z}_t$ 3224, which is appended to the output signal 3217. Thus, each data point in the time series $\tilde{z}_t$ is computed from a polynomial based on a small set of preceding $\tilde{z}_t$ data points as well as the current input random, white-noise-signal data point. The lower portion of FIG. 32C illustrates operation of the linear filter 3218 for the next input random-white-noise-signal data point.

FIG. 32D illustrates an alternative, autoregressive representation of the time series $\tilde{z}_t$ as the output from a linear filter to which a random, white-noise signal is input. In this representation, the linear filter 3230 stores a set of time-ordered coefficients 3231 and a history of previously input random, white-noise-signal data points 3232. The current data point for the time series, $\tilde{z}_t$ 3233, is computed based on a polynomial with terms including the current input random, white-noise-signal data point $a_t$ 3234 and terms that each includes a coefficient and historical random, white-noise-signal data point 3235.

FIG. 32E provides expressions that illustrate ARIMA-model estimation of the values of future data points. The expressions employ numerous different time-series operators, shown in a first set of expressions 3240 at the top of FIG. 32E. The backward shift operator B, when applied to an element of a time series $z_t$ produces, as a result, the preceding element of the time series $z_{t-1}$, are shown in expression 3241. Two successive applications of the backward shift operator B, denoted by the notation $B^2$, produces the time series element that precedes the preceding element, $z_{t-2}$. This notation can be extended, as follows:

$B^R z_t = z_{t-n}.$

Similarly, the forward shift operator F, when applied to an element of a time series $z_t$ produces, as a result, the preceding element of the time series $z_{t+1}$, are shown in expression 3242. The backward difference operator $\nabla$, when applied to an element of a time series $z_t$ produces, as a result, the difference between the element of a time series $z_t$ and the preceding element of the time series $z_{t-1}$, as shown in expression 3243. Two successive applications of the backward difference operator, denoted by $\nabla^2$, produce the value $z_t-2z_{t+1}+z_{t+2}$. The backward difference operator can also be expressed in terms of the backward shift operator, as shown by expression 3244. As noted above, the time-series operators may be applied to a single data point in a time series, but may also be applied to an entire time series. In the latter case, for example, the backward shift operator, when applied to an entire time series, would shift the series backward in time by one time unit.

Using the operators discussed above, the linear-filter model for the deviations time-series $\tilde{z}_t$ discussed above with reference to FIG. 32C, can be expressed by expression 3245 or, more simply, by expression 3246. Similarly, the autoregressive model for the deviations time series $\tilde{z}_t$, discussed above with reference to FIG. 32D, can be expressed by expression 3247 or, by expression 3248. The mixed autoregressive-moving average-process model of order (p, q) combines both models, as shown in expression 3249, where p is the number of historical-deviations-time-series data points and q is the number of historical-random-white-noise data points used to calculate a current deviations time-series data point $\tilde{z}_t$. This model can be more concisely expressed using expression 3250 for homogeneous nonstationary models, where the parameter d is the number of complex roots of the equation $\varphi(B)=0$ which are unity, with the remaining roots lying outside of the unit circle. Using the backward difference operator, the model can be more concisely expressed by equation 3251. By multiplying both sides of equation 3251 by the inverse operator $(\phi(B)\nabla^d)^{-1}$, an expression 3252 for the time series $z_t$ is obtained, according to the ARIMA model. In other words, as indicated by expression 3253, the current value $z_t$ of the time series is modeled as a function $f$ of a number of historical time-series and random-white-noise-signal values. This model can be used to produce a function $f^*$ to estimate a future time-series value $\tilde{z}_{t+1}$, as indicated by expression 3254, by various different methods, some of which estimate future random, white-noise values by random selections of values of a random variable with variance and mean equal to that of the input random, white-noise signal.

Figure 32F:
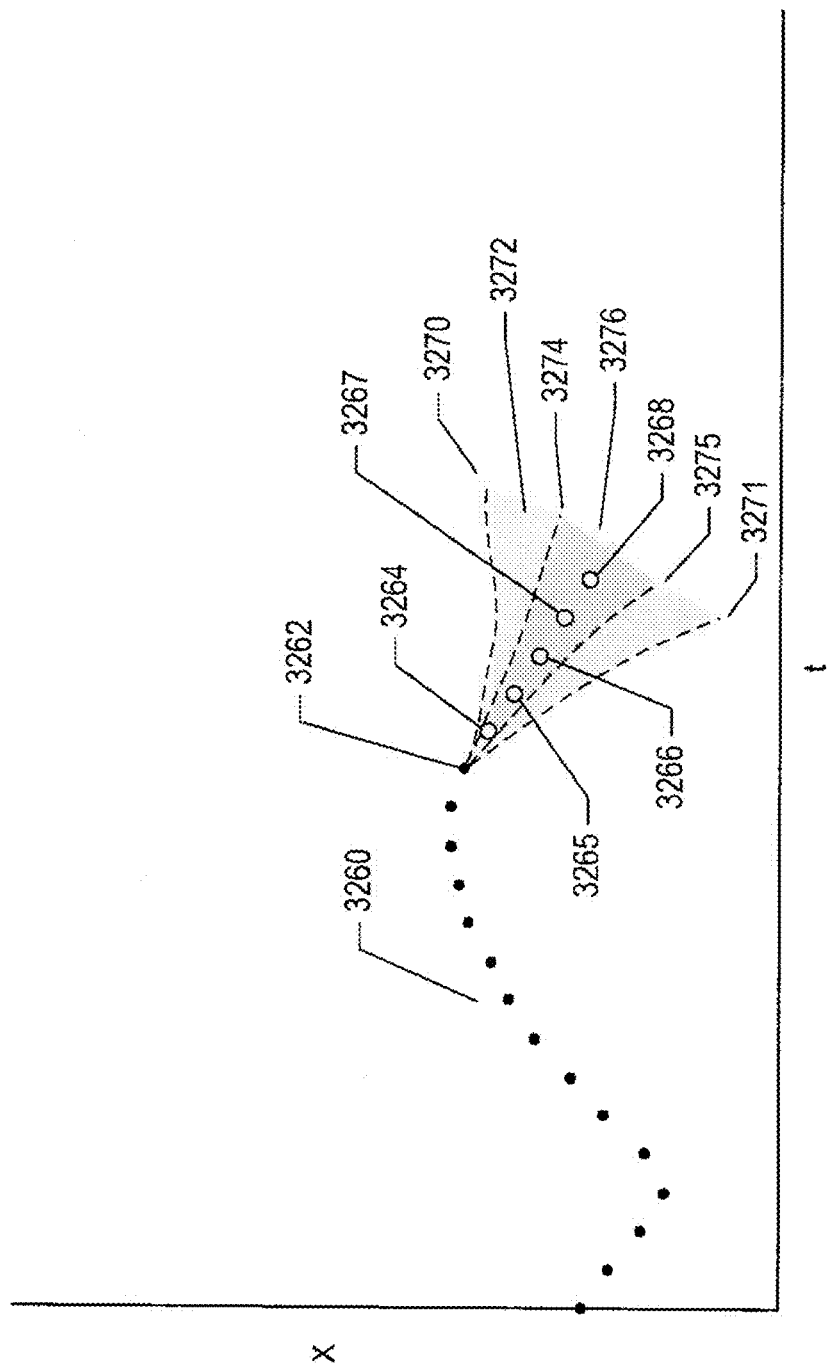

FIG. 32F illustrates the future data-point-value estimation process based on the ARIMA model. FIG. 32F shows a plot of a metric-data-value curve 3260 up to a present metric data point 3262. Unfilled circles 3264-3268 represent five successive predictions of future metric data points based on the observed metric-data points of the metric-data-value curve 3260. Dashed curves 3270-3271 represent confidence boundaries that define a lightly shaded region 3272 representing a 95% confidence interval for the predicted metric data points. Dashed curves 3274-3275 define a more darkly shaded region 3276 representing a 50% confidence interval for the predicted metric points. As indicated in FIG. 32F, the confidence intervals significantly increase for predictions of the metric data values further ahead, in time, from the last observed metric data value. Thus, ARIMA-model-based predictions of metric data values generally become increasingly less accurate for predictions further out in time. Of course, the rate of increase in confidence intervals depends on the relative magnitude of the random, white-noise-signal component of the metric-data timeseries to the information-signal component.

Currently Disclosed Methods and Subsystems

As discussed above, even moderately sized distributed computer systems can generate enormous volumes of log event messages over weekly, daily, and even hourly time periods. Various methods may be employed to compress log/event messages so that only those portions of log/event messages needed for subsequent analyses are stored in the log database. Furthermore, even compressed log/event messages are generally stored for only relatively short periods, on the order of days and weeks, since the frequency at which they are queried generally decreases sharply with the passage of time following their ingestion and storage. In many cases, different retention periods are assigned to different types of log-event messages, to prevent unnecessary storage of those types of log/event messages that are seldom retrieved from the log database by subsequent queries. Without log/event-message compression and without strict purging of the log database to remove stored log/event messages following time periods corresponding to the retention periods assigned to them, the capacities of data-storage facilities allocated for the log database would be quickly exhausted.

Figure 33A:
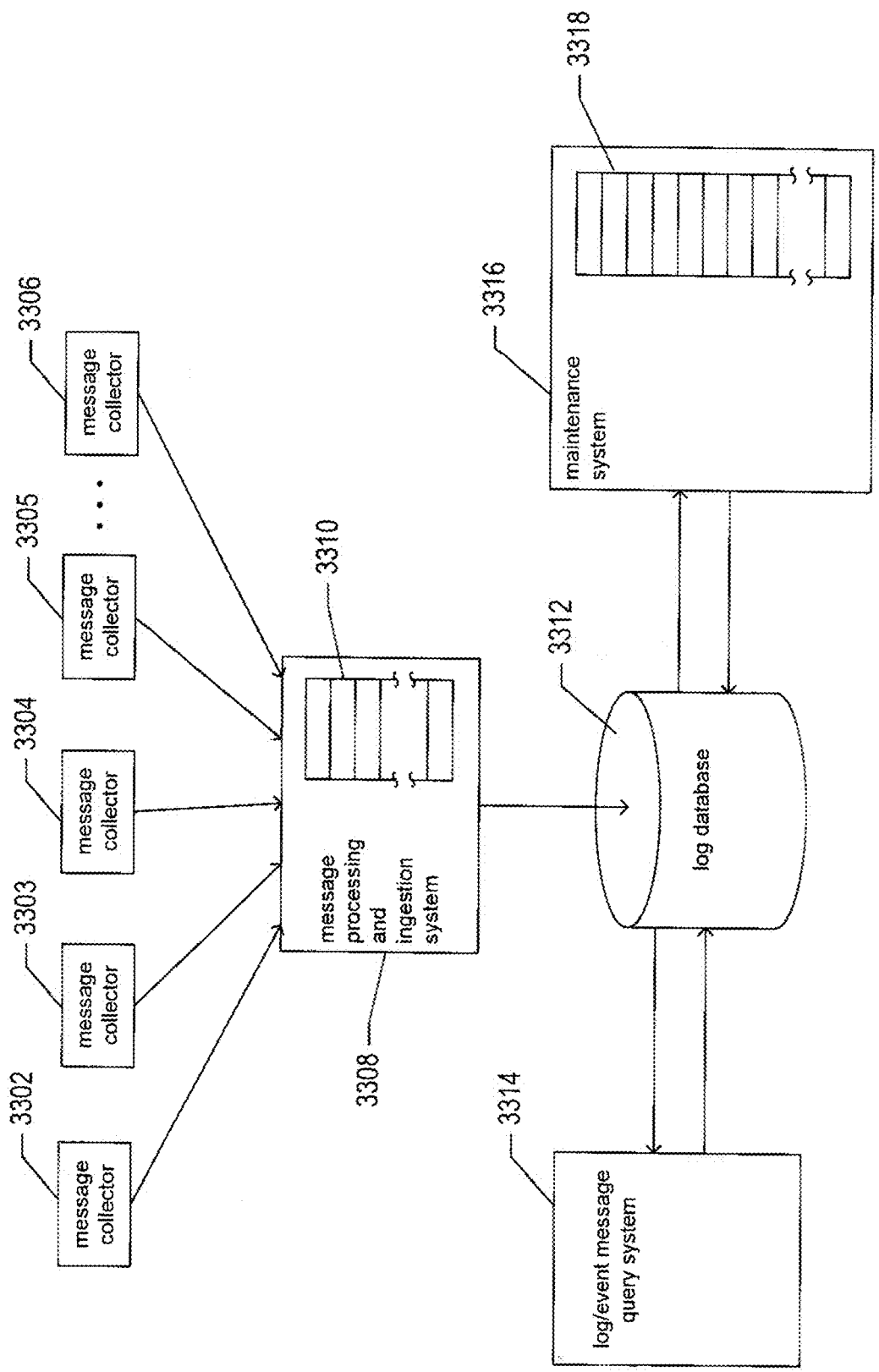
FIGS. 33A-C illustrate current methods used to determine data-storage-retention periods for log/event messages in a log/event-message-processing system.
Figure 33B:
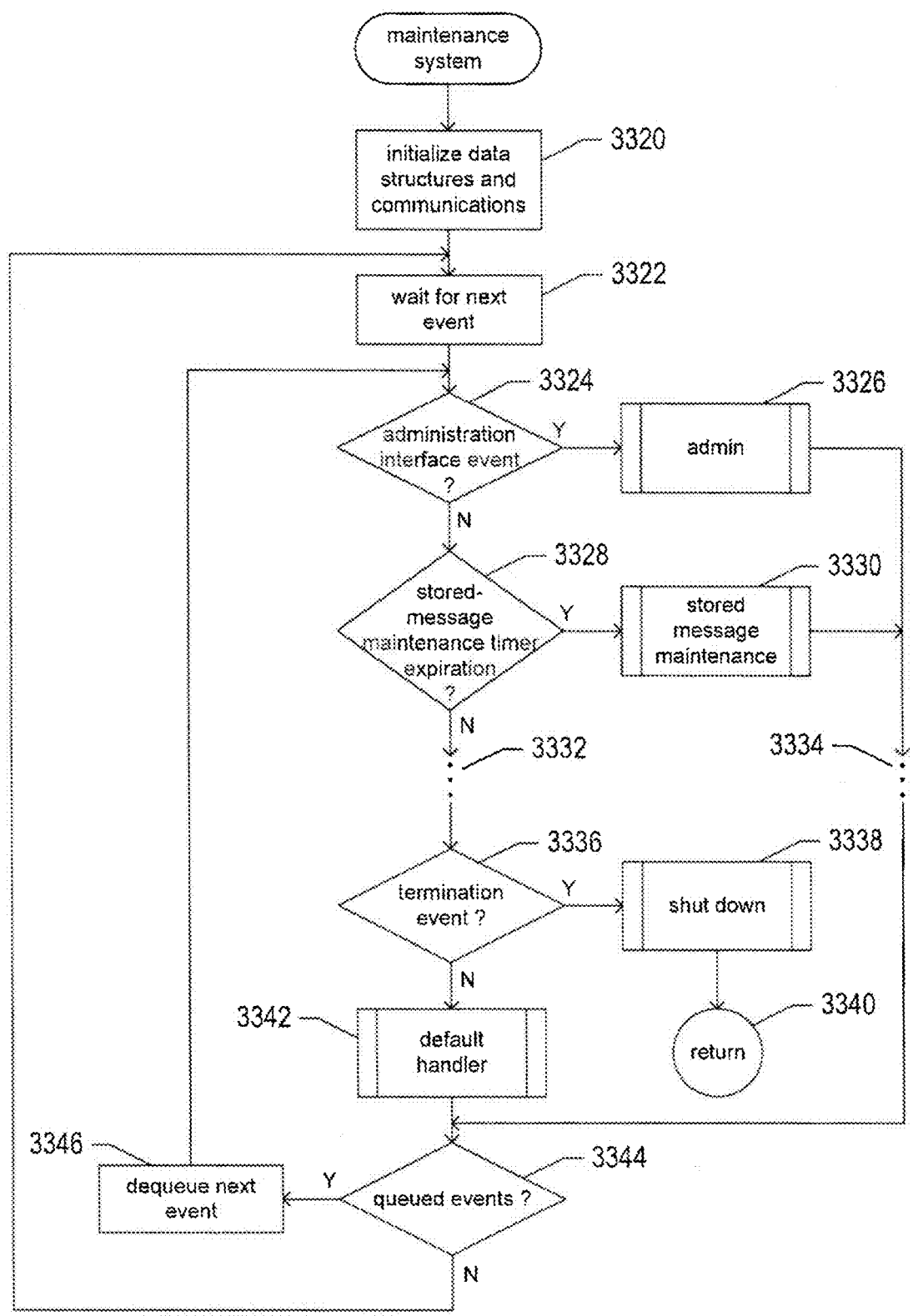
Figure 33C:
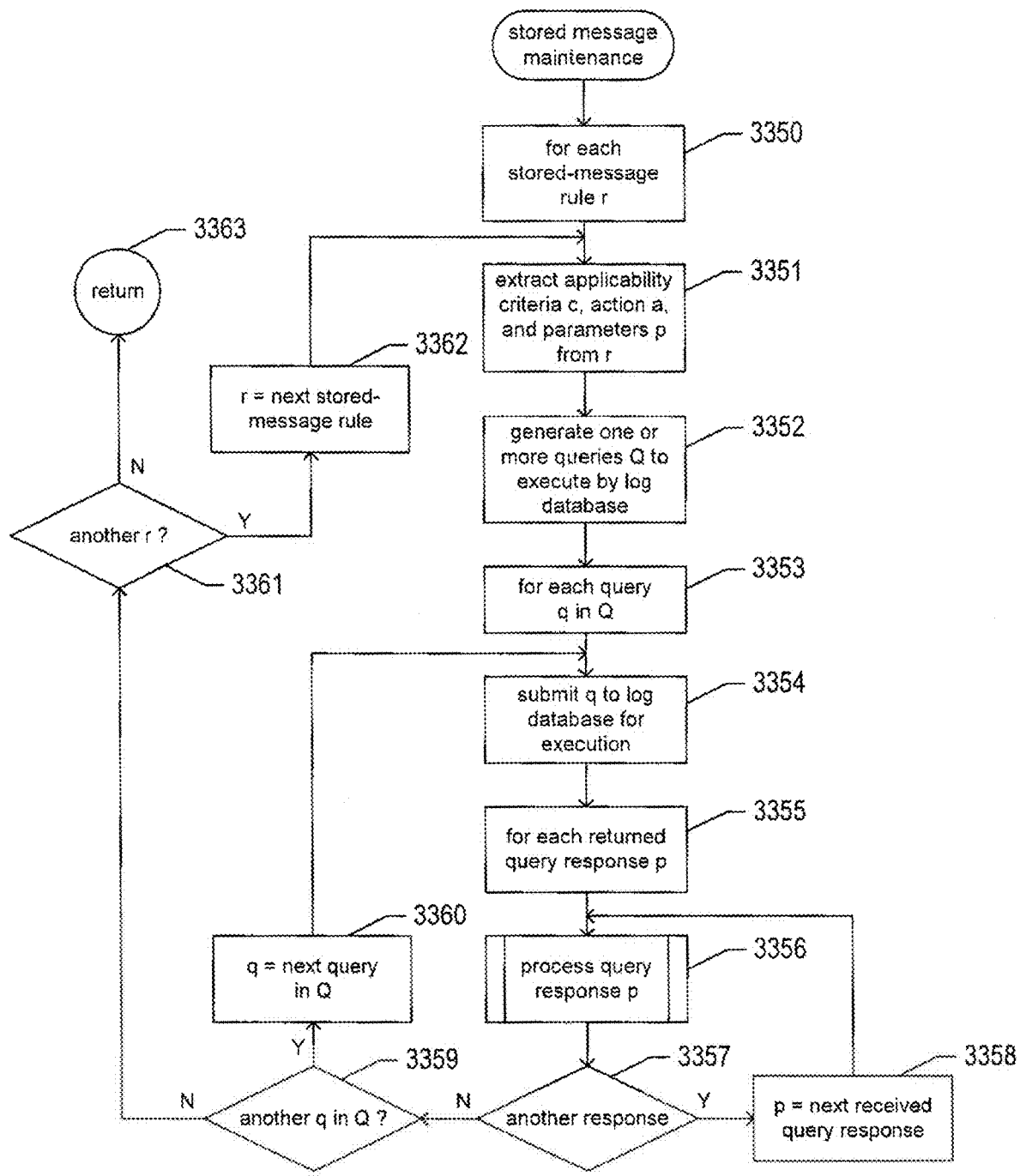

FIGS. 33A-C illustrate current methods used to determine data-storage-retention periods for log/event messages in a log/event-message-processing system. FIG. 33A provides a simple illustration of a log/event-message-processing system, including a maintenance system responsible for purging log/event messages from the log database following expiration of their retention periods. Multiple message collectors 3302-3306 forward log/event messages to a message-processing-and-ingestion system 3308. The message-processing-and-ingestion system employs a set of rules 3310 to determine storage parameters for the log/event messages received from the message collectors. These rules are used to determine whether or not received log/event message are persisted to the log database and, for those received log/event messages that are persisted to the log database, are also used to determine retention periods for the received log/event messages. For example, in certain log/event-message systems, the message-processing-and-ingestion system may filter all of the incoming log/event messages using the rule set in order to partition the received log/event messages into a first class of log/event messages that are not persisted to the log database, since they are either never subsequently queried or have a very low probability of being subsequently queried, and a second class of log/event messages that are persisted to the log database for different periods of time. In certain implementations, the retention periods may be persistently stored along with the log/event messages of the second class. In alternative implementations, the maintenance system may also apply rules to monitor and purge stored massages following expiration of their assigned retention periods. Log/event messages of the first class may be immediately discarded or may be processed for various purposes, including updating aggregate statistics, generating alarms, and for other reasons, before they are deleted. Log/event messages of the second class are processed and stored in the log database 3312 for subsequent retrieval by the log/event-message query subsystem 3314. As mentioned above, the maintenance system 3316, in certain implementations, employees a set of rules 3318 to determine retention periods for log/event messages and to determine at what point log/event messages should be purged from the log database.

FIG. 33B provides a control-flow diagram that illustrates overall operation of the maintenance system within a log/event-message-processing system. In step 3320, the maintenance system initializes various data structures, initializes communications with other components of the log/event-message-processing system, and carries out other types of initialization tasks in preparation for monitoring the log database, including, when necessary, retrieving the rules that control purging of log/event messages from one or more data-storage appliances or subsystems. In step 3322, following completion of initialization, an event-handling loop of the maintenance system waits for the occurrence of a next event. When the next occurring event is an administration-interface event, as determined in step 3324, an administration-event handler is called, in step 3326. Administration-interface events include reception of messages containing new rules for application by the maintenance system, reception of messages containing requests to delete existing rules, reception of messages containing values for operational parameters, and other such events related to administration and management of the log/event-message-processing system. When the next occurring event corresponds to expiration of a stored-message-maintenance timer, as determined in step 3328, a stored-message-maintenance handler is called, in step 3330. Ellipses 3332 and 3334 indicate that many additional types of events may be handled by the event-handling loop of the maintenance system. When the next occurring event is a termination event, as determined in step 3336, a shutdown routine is called, in step 3338, to carry out various termination-related tasks, including persisting memory-resident rules and operational parameters to data storage. Following completion of the shutdown routine, the event-handling loop terminates in step 3348. A default handler is called, in step 3342, to handle any rare or unexpected events. When additional events have been queued for handling, as determined in step 3344, a next event is dequeued, in step 3346, and control then returns to step 3324 to handle the next event. Otherwise, control returns to step 3322, where the event-handling loop waits for a next event to occur.

FIG. 33C provides a control-flow diagram that illustrates the stored-message-maintenance handling routine called in step 3330 of FIG. 33B. In the for-loop of steps 3350-3362, the stored-message-maintenance handling routine considers each stored-message rule r in the set of stored-message rules (3318 in FIG. 33A). In step 3351, the stored-message-maintenance handling routine extracts applicability criteria c, an action a, and a set of parameters p from the currently considered rule r. In step 3352, the stored-message-maintenance handling routine generates a set of one or more queries Q corresponding to the currently considered rule r for execution by the log database, using the extracted criteria c, action a, and parameters p. For example, when the currently considered rule r specifies that log event messages containing a particular phrase should be purged after they have resided in the log database for longer than 10 days, the stored-message-maintenance handling routine generates a query that deletes such log/event messages from the log database. In the inner for-loop of steps 3353-3360, each query q in the set of queries Q is considered. In step 3354, the currently considered query q is submitted to the log database for execution. Then, in the innermost for-loop of steps 3355-3358, each query response p returned by the log database is processed. Following completion of the inner for-loop of steps 3353-3360, the stored-message-maintenance handling routine determines whether or not there is a another stored-message rule to process. There is another stored-message rule, as determined in step 3361, the next stored-message rule is retrieved, in step 3362, and control returns to step 3351 for a next iteration of the for-loop of steps 3350-3362. Otherwise, the stored-message-maintenance handler routine returns in step 3363.

There are many problems associated with current methods for managing storage of log/event messages in the log database, described above. One set of problems is associated with the fact that, as discussed above, enormous volumes of log/event messages are generated during normal operation of a distributed computer system on even an hourly basis. Moreover, there are generally many thousands, tens of thousands, or more different types of log/event messages generated from many different components of the distributed computer system at various levels in the hierarchical organization of the distributed computer system. Because current methods involve rule-based decisions with regard to assigning retention times to log/event messages, and because there are so many different types of log/event messages that may require different retention times to optimize use of mass-storage capacities within a distributed computer system, it is a daunting, and often even infeasible, task for administrators and managers to develop sets of rules to address all the different types of log/event messages. Currently, automated rule generation is not available, and developing automated-rule-generation logic may represent a task even more difficult than manually specifying rule sets for managing log/event-message storage. Even the time required to manually specify rule sets for thousands of different types of log/event messages, when administrators and managers are aware of the rule sets needed to optimize log/event-message storage, would represent an imposing burden and cost. But, in fact, administrators and managers generally do not know how to develop rule sets that include criteria for properly identifying particular types or classes of types of log/event messages and, perhaps more significantly, do not know what log/retention times to assign to particular types or classes of types of log/event messages. For example, the criteria used in rules often involve parsing log/event messages to identify terms and short phrases specific to a particular type or class of types of log/event messages, but it is difficult to find a set of terms in short phrases that would partition an entire set of log/event messages into a desired type or type-class partitioning. The optimum log/retention times can only be determined when the patterns of subsequent access to stored log/event messages are known, but, in fact, access patterns can be extremely difficult to ascertain, since log/event messages are often accessed by analysis tools over periods of time ranging from hours to weeks. Moreover, patterns of log/event-message access may change, dynamically, over the course of the lifetime of a distributed computer system, as can the types and type classes of log/event messages. In short, assigning retention times to incoming log/event messages in order to optimize log/event-message storage within a distributed computer system is a very complex optimization problem that has not been adequately addressed by current log/event-message-system implementations.

Figure 34A:
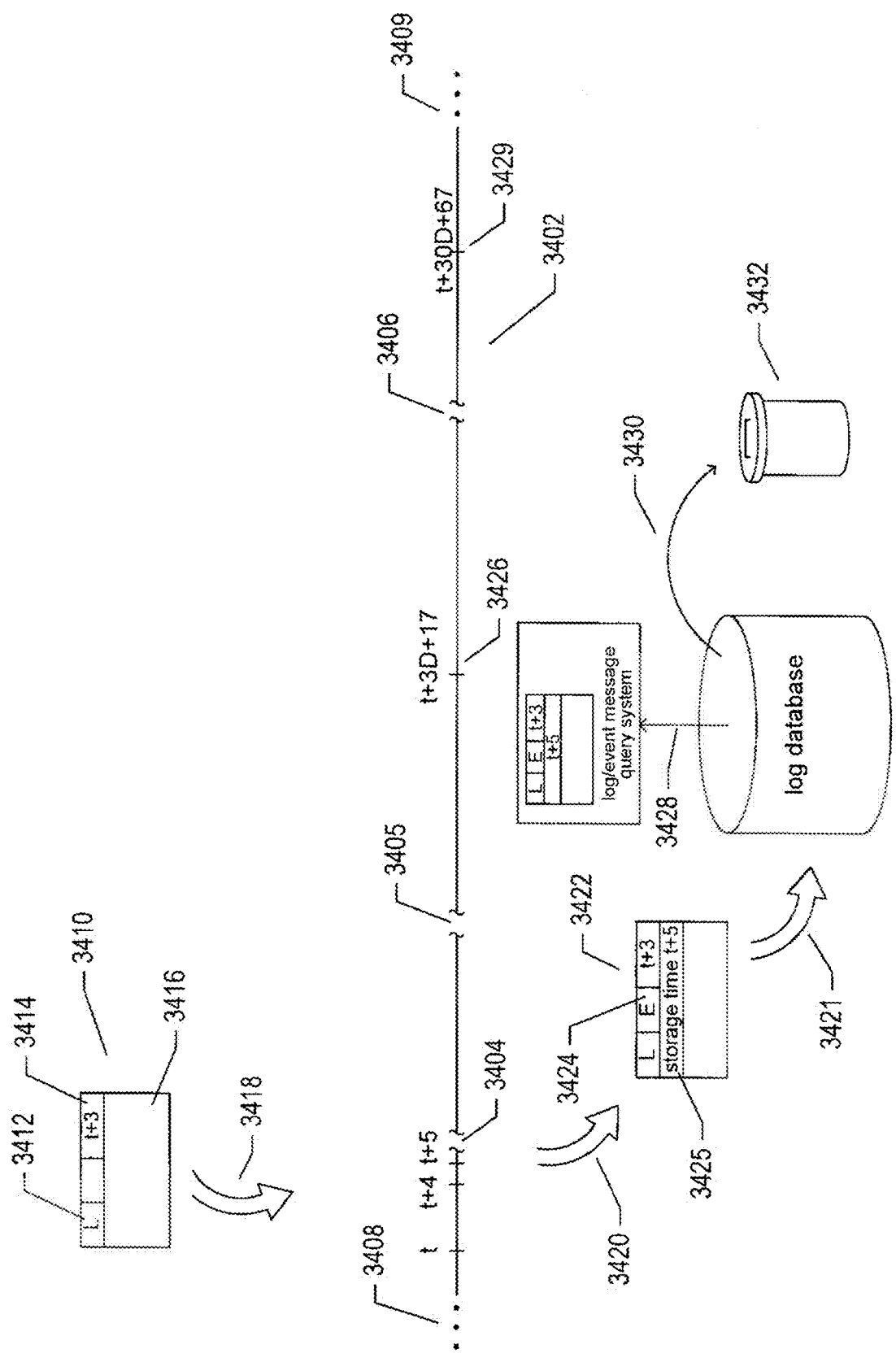
FIGS. 34A-C illustrate the lifetime of a log/event message within a log/event-message system and illustrate various lifetime-associated parameters.
Figure 34B:
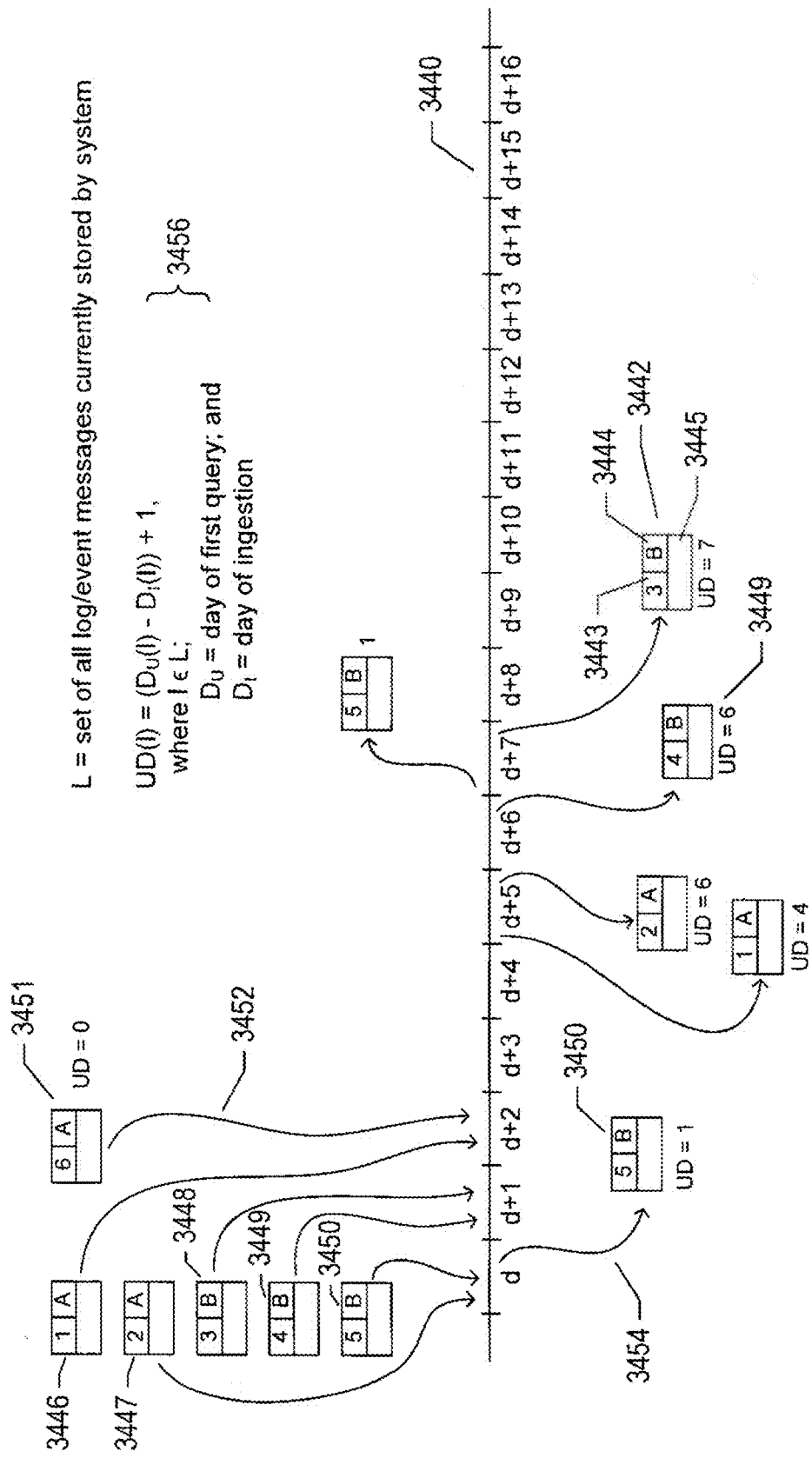
Figure 34C:
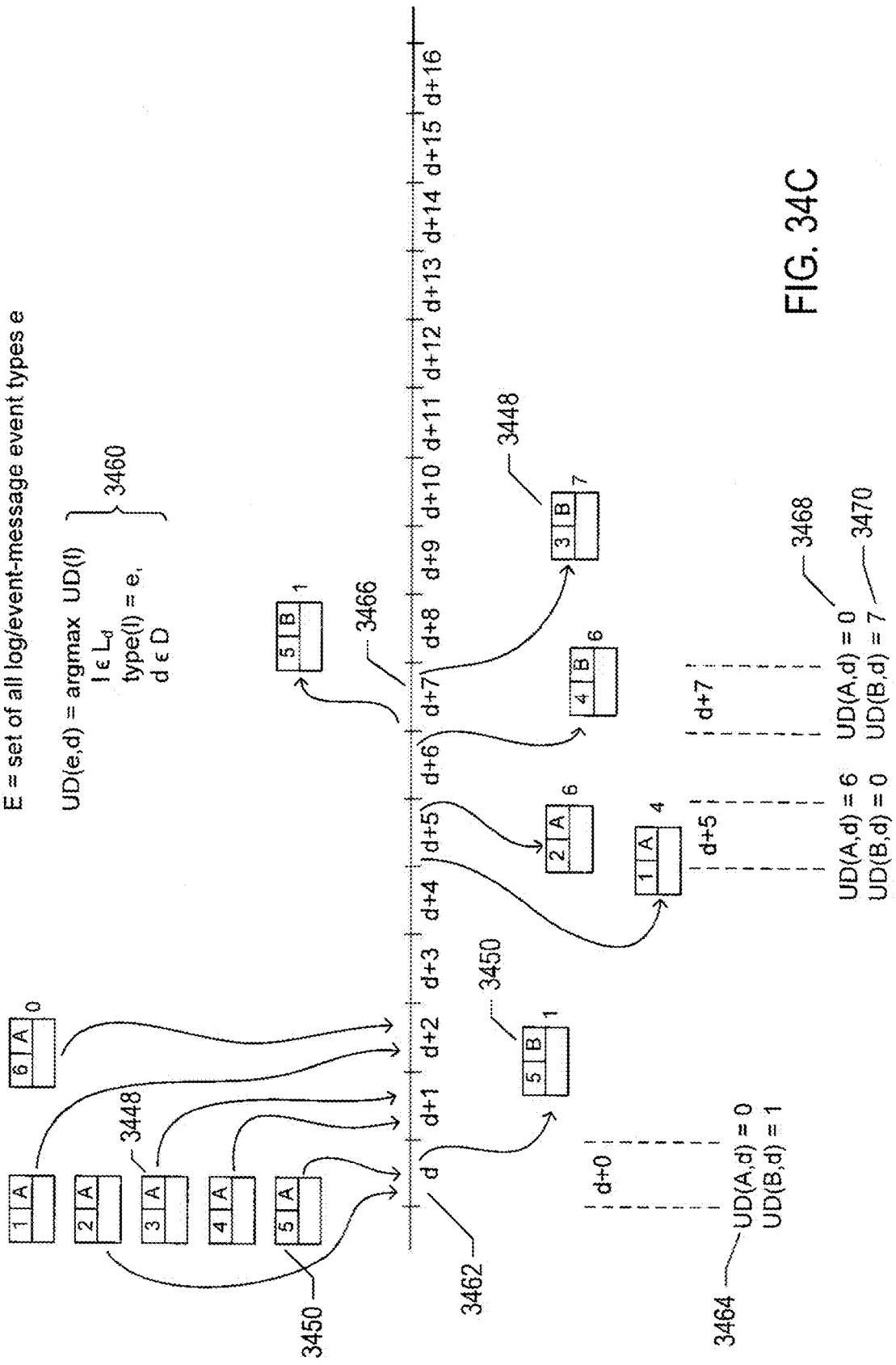

FIGS. 34A-C illustrate the lifetime of a log/event message within a log/event-message system and illustrate various lifetime-associated parameters. FIG. 34A illustrates the lifetime of a log/event message. A horizontal timeline 3402 is shown in the middle of FIG. 34A. Breaks in the timeline 3404-3406 indicate that the timeline may include additional portions not shown in FIG. 34A and ellipses 3408-3409 indicate that the timeline extends further in both the earlier-in-time and later-in-time directions. The log event message is represented by a rectangle 3410. The log/event message includes an identifier 3412, represented by the symbol "L," a creation time 3414, and a message body 3416. The identifier may be a timestamp, a combination of a timestamp and additional alphanumeric values, or another type of identifier. In FIGS. 34A-C, various times are shown relative to an arbitrary reference time t. The log/event message is generated at time t+3, is received by a message-ingestion-and-processing subsystem, as indicated by arrow 3418, is then processed by the message-processing-and-ingestion system and then transmitted to the log database for storage at time t+5, as indicated by arrows 3420-3421 and by the processed form of the log/event message 3422 shown below the timeline. The processed log/event message includes an event type 3424, represented by the symbol "E," as well as the storage time 3425. Subsequently, at time t+3D+17 (3426 in FIG. 34A), where "D" represents a unit of time corresponding to a day, the processed log/event message is retrieved, via a query, from the log database, as represented by arrow 3428, and executed by the log/event message query system. Log/event messages may be retrieved by various types of analytical processes or manually, by administrators and managers, in order to analyze causes for various problems that may emerge within the distributed computer system. A log/event message may be retrieved multiple times from the log database for various different purposes. Finally, at time t+30D+67 (3429 in FIG. 34A), the log/event message is purged from the log database by a maintenance routine, as indicated by arrow 3430 and trash-can symbol 3432.

FIGS. 34B-C illustrate several log/event-message-lifetime-associated parameters. The horizontal timeline 3440 in both of these figures is incremented in days. A number of different log/event messages are represented, in abbreviated fashion, by smaller rectangles, such as small rectangle 3442. Each small rectangle includes an identifier 3443, an event type 3444, and a message body 3445. Six different log/event messages 3446-3451 are received over the course of three days by a log/event-message system, as indicated by curved arrows, such as curved arrow 3452, from each of the six log/event messages to points along the horizontal timeline 3440. All six log/event messages are processed and stored in the log database. Subsequently, the first five of the six log/event messages are retrieved from the log database, as indicated by arrows, such as arrow 3454, from points along the horizontal timeline to representations of the log/event messages. The usage delay for a particular log/event message l, where l is a member of the set L of all log/event messages currently stored by the log/event-message system, is represented in functional notation as "UD(l)." As indicated by expression 3456, the usage delay for a log event message l is the sum 1 and the difference between the day on which a query first returned the processed log/event message l from the log database and the day of ingestion of the log/event message. For example, log/event message 3450 is retrieved in a query from the log database during the same day that it was ingested and processed by the log/event-message system. Therefore, it has a usage delay of (d−d)+1=1. As another example, log/event message 3449 was ingested and stored on day d+1 and subsequently accessed, for the first time, on day d+6, and therefore has a usage delay of ((d+6)−(d+1))+1=6.

FIG. 34C illustrates the usage delay for an event type. As indicated by expression 3460, the usage delay for an event type e computed for a particular day d, UD(e,d), is the maximum usage delay for any processed log/event message with event type e stored in the log database and queried on the particular date d. FIG. 34C shows the same six log/event messages that are shown in FIG. 34B, with the same times of ingestion and access. Examples of usage delays for event types are shown in FIG. 34C. For example, on date d+0 (3462 in FIG. 34C), the usage delay for event type A is 0 (3464 in FIG. 34C), since no log/event messages of type A are currently resident within the log database, and the usage delay for event type B is 1, since log/event message 3450 was both ingested and queried on day d+0, and is therefore associated with the log/event-message usage delay 1, as discussed above with reference to FIG. 34B. By contrast, on day d+7 (3466 in FIG. 34C), the usage delay for event type A (3468 in FIG. 34C) is 0, since no log/event message of type A was queried on day d+7 while the usage delay for event type B is 7 (3470 in FIG. 34C), since log/event messages 3448 and 3450 were queried on day d+7 and log/event message 3448 has the maximum log/event-message usage delay of 7 among the log/event messages 3448 and 3450.

Figure 35A:
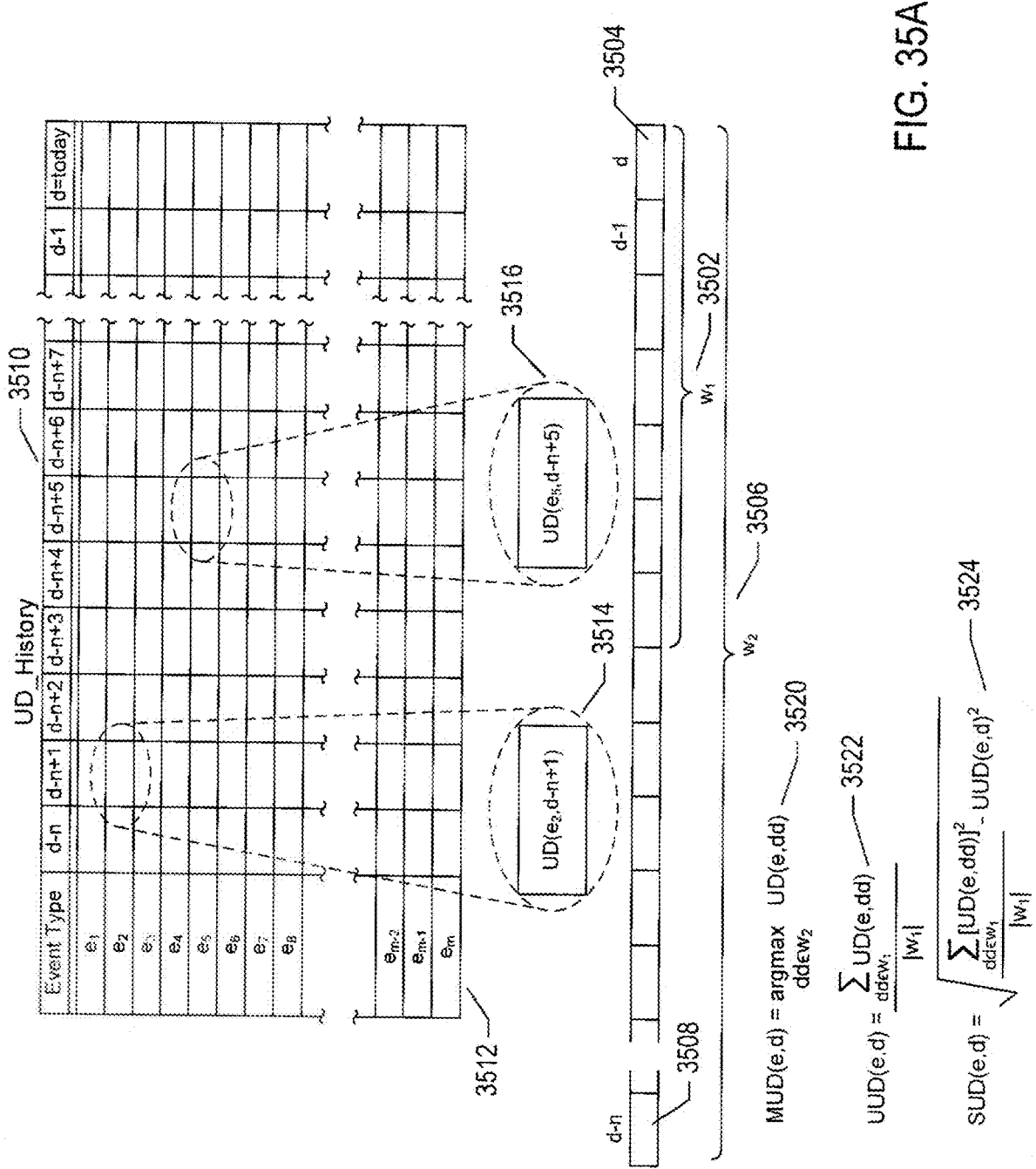
FIGS. 35A-B illustrates historical usage data and related statistics that are maintained by an enhanced log-database subsystem representing one implementation of the currently disclosed methods and systems.
Figure 35B:
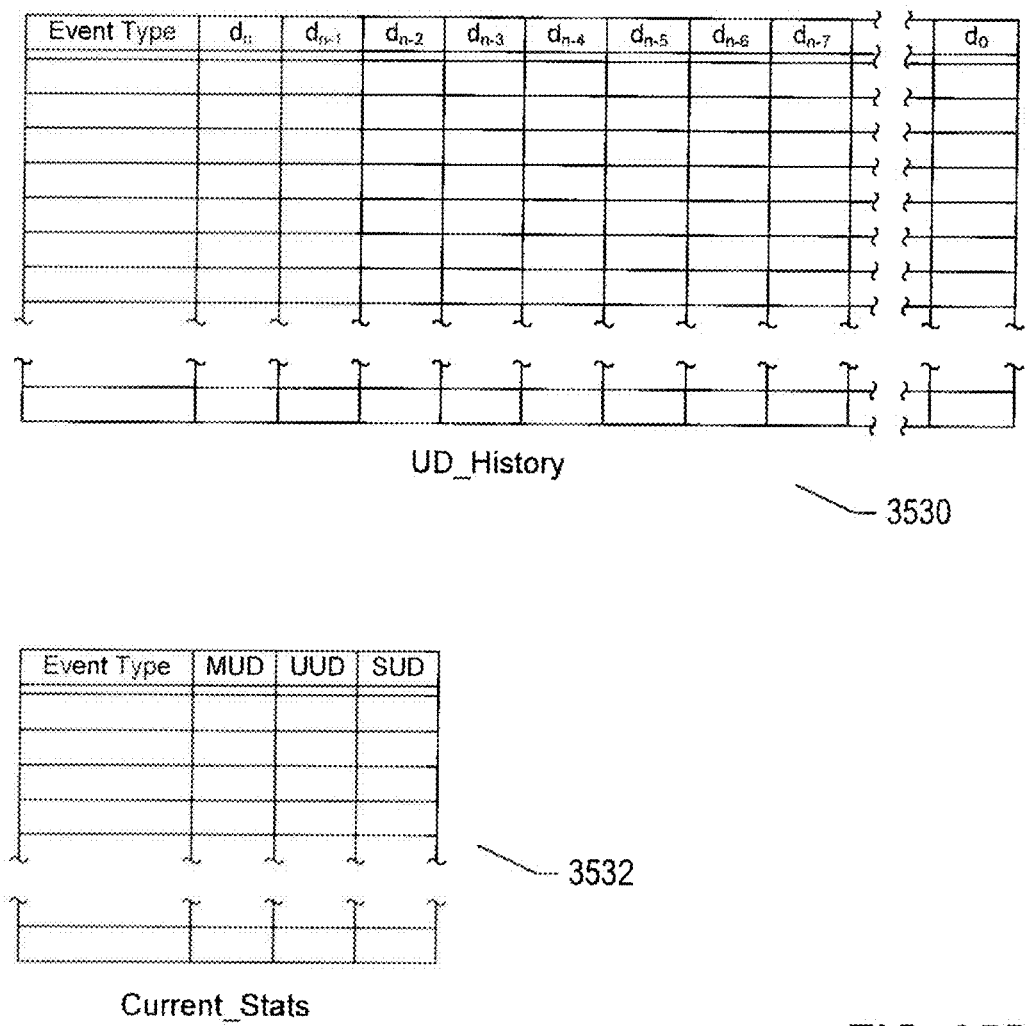

FIGS. 35A-B illustrates historical usage data and related statistics that are maintained by an enhanced log-database subsystem representing one implementation of the currently disclosed methods and systems. In this implementation, two different time periods, or time windows, are used for generating usage-delay histories and related statistics. A first time window $w_1$ includes the current day d 3502 and a number of preceding days d−1, d−2, ... within a second time window $w_2$ 3506 that includes the current day d 3502 and all preceding days down to day d-n 3508. The lengths of the two time windows $w_1$ and $w_2$, W1 and W2, are operational parameters for the enhanced log-database subsystem. A table 3510, referred to as the "UD_History table," stores the event-type usage delays, discussed above with reference to FIG. 34C, for the different event types of log/event messages. In FIG. 35A, the UD_History table is represented as a relational-database table, but the usage-delay-history data can be stored in any number of different types of data-storage media accessed and maintained by various different types of data-management facilities. The first column of the UD_History table 3512, "Event Type," corresponding to a first field in the event-type records represented by rows in the UD_History table, contains indications of the event types associated with the rows in the table. Each row in the table includes n+1 additional fields, represented by n+1 additional columns, for each day in the time window $w_2$. Each of these additional fields contains the event-type usage delay for the event type associated with the row and the day associated with the column corresponding to the additional field, as indicated by insets 3514 and 3516 in FIG. 35A.

Expression 3520 illustrates computation of a first statistic, the maximum usage delay ("MUD"), for a particular event type and a particular day. The maximum usage delay for event type e and day d is represented by the functional notation ("MUD(e,d)") and is the maximum event-type usage delay within the time window $w_2$ associated with the current day and with any stored log message of event type e. The usual usage delay ("UUD") for a particular event type on a particular day is represented by expression 3522. The usual usage delay for event type e and day d is represented by the functional notation ("UUD(e,d)") and is the average event-type delay of log/event messages of event type e within window $w_1$ relative to the current day. The standard-deviation usage delay ("SUD"), for a particular event type on a particular day, is represented by expression 3524. The standard-deviation usage delay for event type e and day d is represented by the functional notation ("SUD(e,d)") and is the standard deviation of the event-type delays of log/event messages of event type e within window $w_1$.

FIG. 35B shows an alternative, relational-database-table-based representation of the usage-delay histories and related statistics discussed above with reference to FIG. 35A. The usage-delay-history data and related statistics are stored in the previously discussed UD_History table 3530 and in a Current_Stats table 3532. Each row in each of these tables corresponds to a particular event type, and the rows in the table Current_Stats include fields MUD, UUD, and SUD corresponding to the above-discussed usage-delay-history-related statistics.

Figure 36:
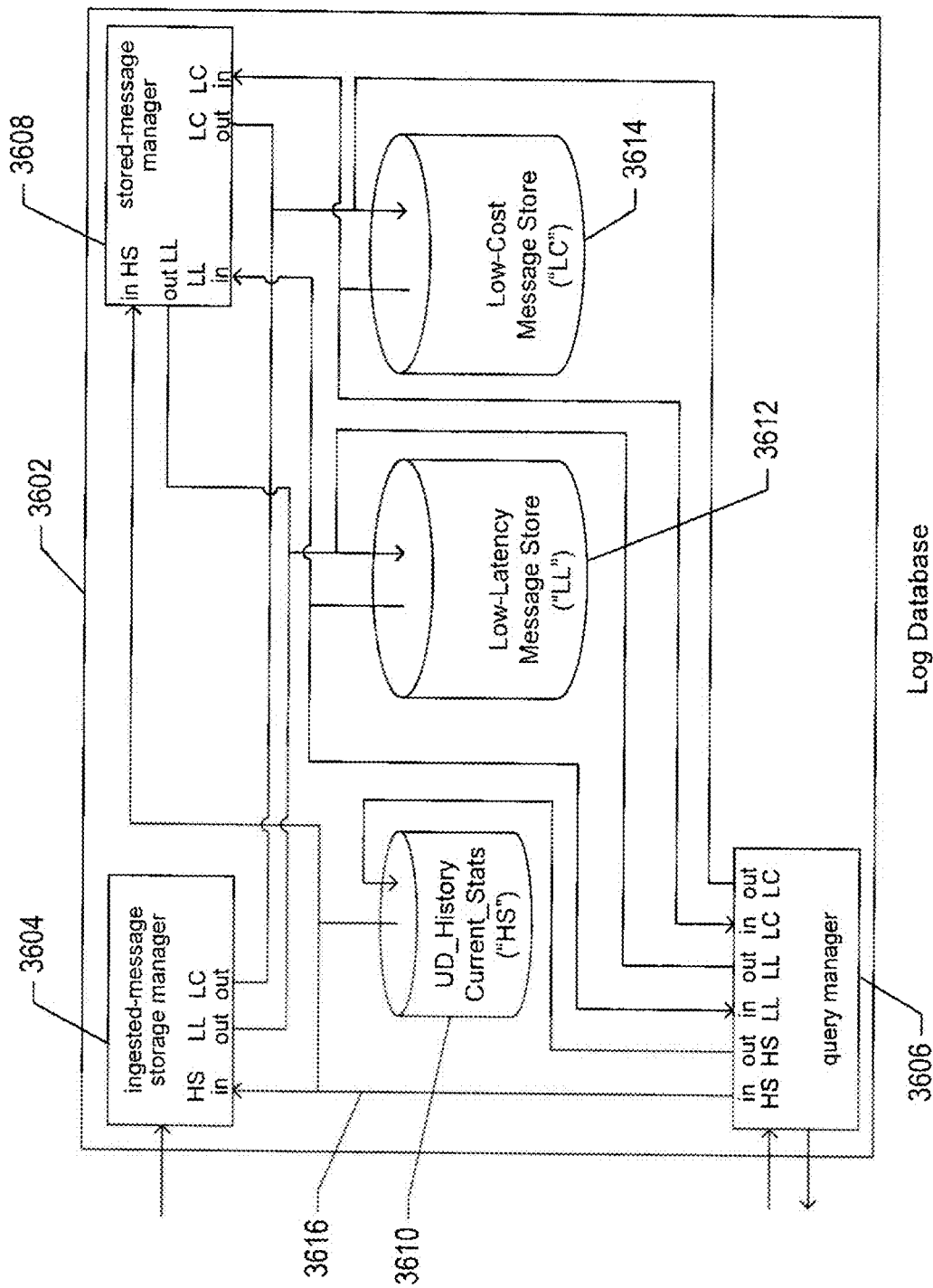
FIG. 36 illustrates an enhanced log-database subsystem that represents one implementation of the currently disclosed methods and systems.

FIG. 36 illustrates an enhanced log-database subsystem that represents one implementation of the currently disclosed methods and systems. The enhanced log-database subsystem 3602 includes an ingested-message storage manager 3604, which receives ingested-and-processed log/event messages from the message-processing-and-ingestion system (1408 in FIG. 14), and a query manager 3606, which receives queries from, and returns query responses to, a log/event message query subsystem (1412 in FIG. 14). The query manager additionally updates stored usage-delay histories and related statistics and transfers log/event messages between storage components of the enhanced log-database subsystem. The event-type usage-delay histories are used for automatically determining retention periods. In addition, the enhanced log-database subsystem includes a stored-message manager 3608, which is responsible for purging log/event messages from the enhanced log-database subsystem and for transfers of log/event messages between storage components of the enhanced log-database subsystem. The log-database storage components include a storage component 3610 that stores the UD_History and Current_Stats tables, discussed above with reference to FIG. 35B, or storage of alternative non-relational-database representations of usage-delay histories and related statistics, a storage component 3612, referred to as the "low-latency message store." or "LL", and a storage component 3614, referred to as the low-cost message store." or ("LC"). The LL is a relatively expensive data-storage medium or facility that provides rapid access to the stored data while the LC is a relatively inexpensive data-storage medium or facility that provides slower access to the stored data. With appropriate management of stored processed log/event messages, the data-storage costs can be optimized by storing processed log/event messages expected to be accessed within a relatively short future time period in the LL and storing processed log/event messages that are not expected to be accessed within a relatively short future time period in the LC. The various arrows, such as arrow 3616, shown in FIG. 36 within the enhanced log-database subsystem 3602 represent data exchange between the various managers and storage components of the enhanced log-database subsystem. These data exchanges are further described, below. In alternative implementations, the enhanced log-database subsystem may be a component of another log/event-message-system component or portions of the enhanced log-database-subsystem functionalities may be distributed among other log/event-message-system components. In alternative implementations, the enhanced log-database subsystem may accesses external storage components, rather than including the storage components.

Figure 37:
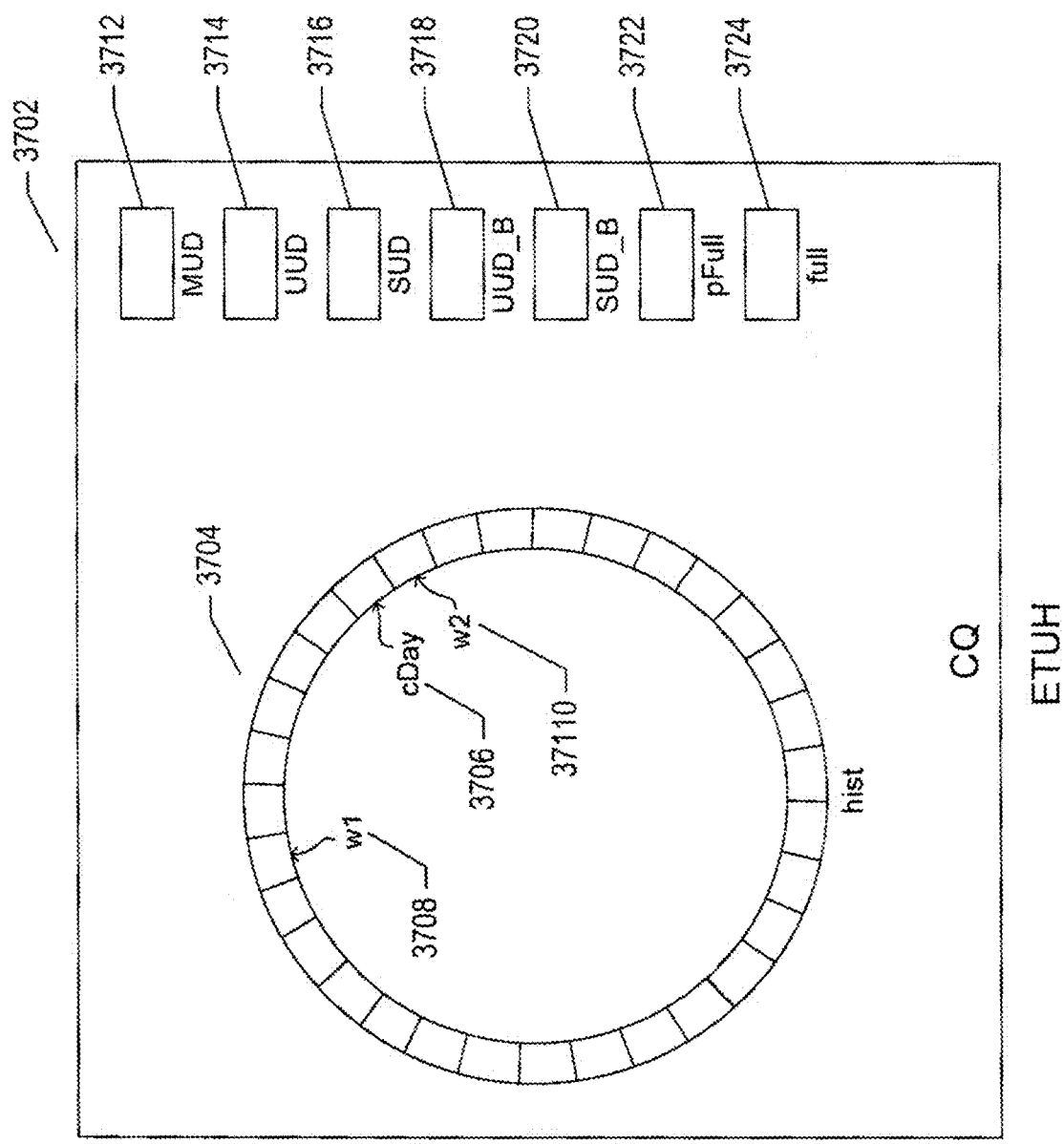
FIG. 37 shows an alternative representation of event-type-usage-delay-history and related-statistics storage.

FIG. 37 shows an alternative representation of event-type-usage-delay-history and related-statistics storage. In this alternate representation, rather than storing event-type usage-delay histories and related statistics in relational-database tables, such as the UD_History table and the Current_Stats table shown in FIG. 35B, an event-type usage-delay-history data structure ("ETUH") 3702 stores usage-delay data for a particular event type in a circular queue 3704 ("CQ"). The ETUHs for all of the different event types are contained in an ETUH array, in the disclosed implementation. Three pointers are associated with the CQ: (1) cDay 3706, which points to the event-type usage delay for the current day; (2) w1 3708, which points to the least-recent-in-time event-type usage delay within the time window $w_1$, discussed above with reference to FIG. 35A; and (3) w2 3710, which points to the least-recent-in-time event-type usage delay within the time window w2, also discussed above with reference to FIG. 35A. ETUH 3702 additionally stores the MUD 3712, UUD 3714, and SUD 3716 for the event type, discussed above with reference to FIG. 35A. In addition. ETUH 3702 stores the values UUD_B 3718 and SUD_B 3720 which are used for updating the stored UUD 3714 and the stored SUD 3716, respectively. Finally, ETUH 3702 stores a Boolean value pFull 3722 to indicate whether or not the CQ contains sufficient usage-delay-history data to fill the first time window $w_1$ that extends from the usage delay referenced by the pointer cDay, in a counterclockwise direction, to the usage delay referenced by pointer w1, and a Boolean value full 3724 to indicate whether or not the CQ is completely full, and thus contains sufficient usage-delay-history data to fill the second time window w2 that extends from the usage delay referenced by the pointer cDay in a counterclockwise direction to the usage delay referenced by pointer w2. The representation of the event-type usage-delay history for a particular event type shown in FIG. 37 is convenient for maintaining cumulative moving averages and simple moving averages, as further discussed below, and thus permitting efficient updates of the UUD and the SUD.

FIG. 38 illustrates two routines used to update the pointers cDay, w1, and w2 associated with the CQ of an ETUH, discussed above with reference to FIG. 37. The routine CQ.inc( ) 3802 increments a pointer and the routine CQ.dec( ) 3804 decrements a pointer. Both routines receive a pointer, by reference, as an argument. In step 3806, the routine CQ.inc( ) receives a reference to a CQ pointer p. In step 3807, the routine CQ.inc( ) increments the received pointer. When the current value of the pointer p is equal to the number of entries in the CQ, W2, as determined in step 3808, the pointer p is set to 0 in step 3809. The routine CQ.dec( ) receives a reference to a CQ pointer p, in step 3812. The routine CQ.dec( ) decrements this pointer, in step 3813. When the current value of the pointer p is less than 0, as determined in step 3814, the routine CQ.dec( ) sets the pointer to one less than the number of usage-delay-history elements in the CQ, in step 3815. Note that, in this implementation, the pointers have integer values from 0 to W2−1 and are used as indexes into a standard array of usage-delay-history elements. An array is thus transformed into a circular buffer or queue using the routines CQ.inc( ) and CQ.dec( ).

FIGS. 39A-F provide control-flow diagrams that illustrate operation of the query manager (3606 in FIG. 36). In step 3902 of FIG. 39A, the query manager calls an initialization routine to initialize in-memory data structures, communications connections, and carry out other, similar initialization tasks in preparation of executing within the enhanced log-database subsystem. When there is a recoverable usage-delay history stored within the enhanced log-database subsystem, as determined in step 3904, a routine is called, in step 3906, to recover the usage-delay history. Otherwise, in step 3907, the query manager allocates and initializes an array of ETUH data structures, one for each log/event-message event type, that is automatically maintained in memory as well as in mass storage, and determines the values for the parameters W1 and W2, which are the sizes, in usage-data-history elements, of the time windows w1 and w2, discussed above with reference to FIG. 35A. In the for-loop of steps 3908-3912, each event type e is considered. In step 3909, local variable i is set to the index of the ETUH within the ETUH array corresponding to the event type e. In step 3910, a routine "initialize ETUH" is called to initialize the ETUH data structure indexed by the value in local variable i. The for-loop of steps 3908-3912 iterates until the ETUH data structures in the ETUH array corresponding to event types of log/event messages are initialized. Then, in step 3914, shown in FIG. 39B, the query manager waits for a next event to occur. When the next occurring event is reception of a query, as determined in step 3915, a routine "query" is called, in step 3916, to handle the received query. When the next occurring event is a management-input event, as determined in step 3917, a management-input routine is called, in step 3918, to handle the event. Ellipses 3919 and 3920 indicate that many additional types of events may be handled by the query manager. When the next occurring event is a termination event, as determined in step 3921, the current usage-delay history is persisted, in step 3922, and execution of the query manager terminates, in step 3923. A default handler is called, in step 3924, to handle any rare or unexpected events. When additional events have been queued for handling, as determined in step 3925, a next event is dequeued, in step 3926, and control returns to step 3915. Otherwise, control returns to step 3914.

Figure 39A:
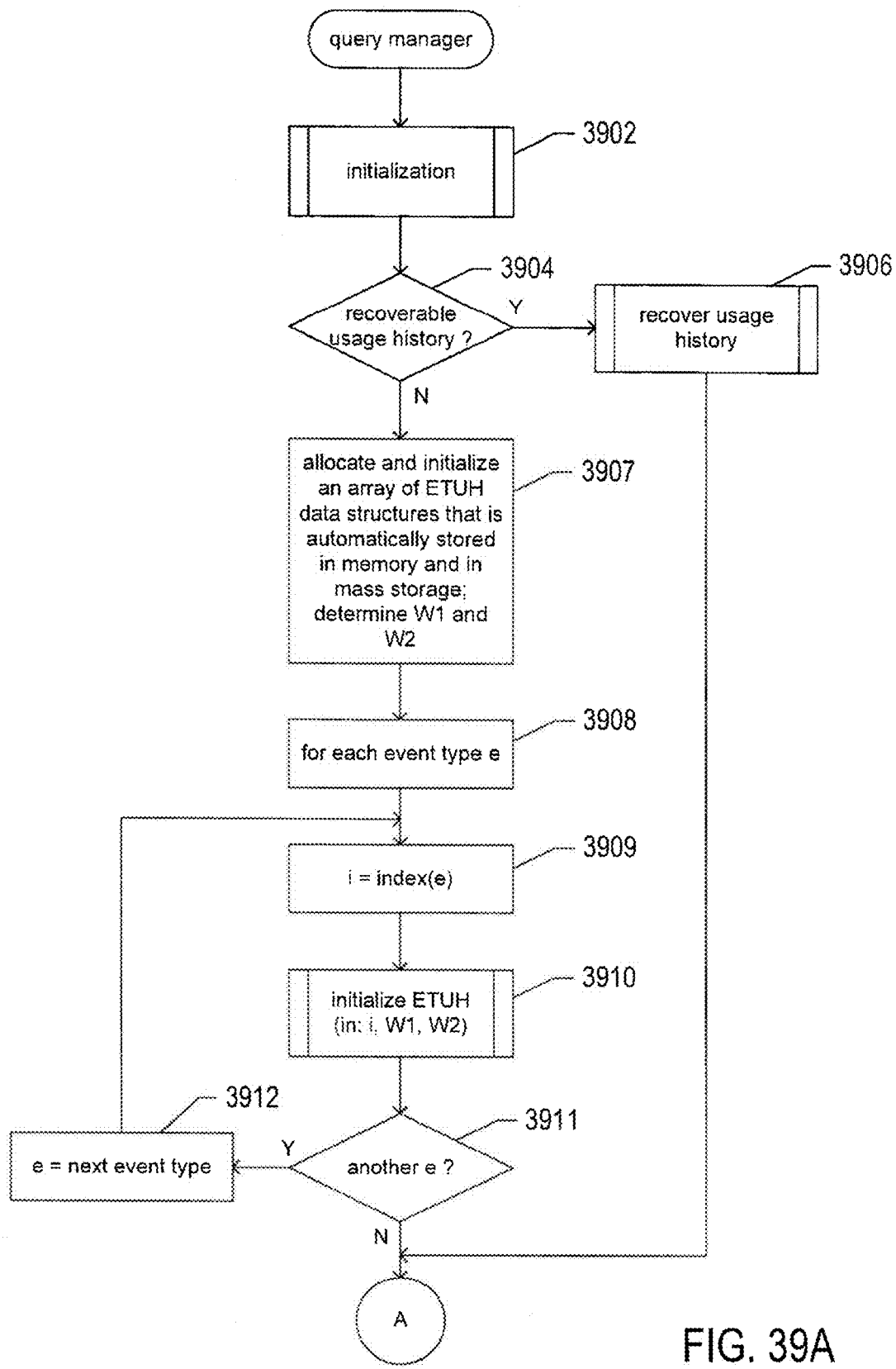
FIGS. 39A-F provide control-flow diagrams that illustrate operation of the query manager (3606 in FIG. 36)
Figure 39B:
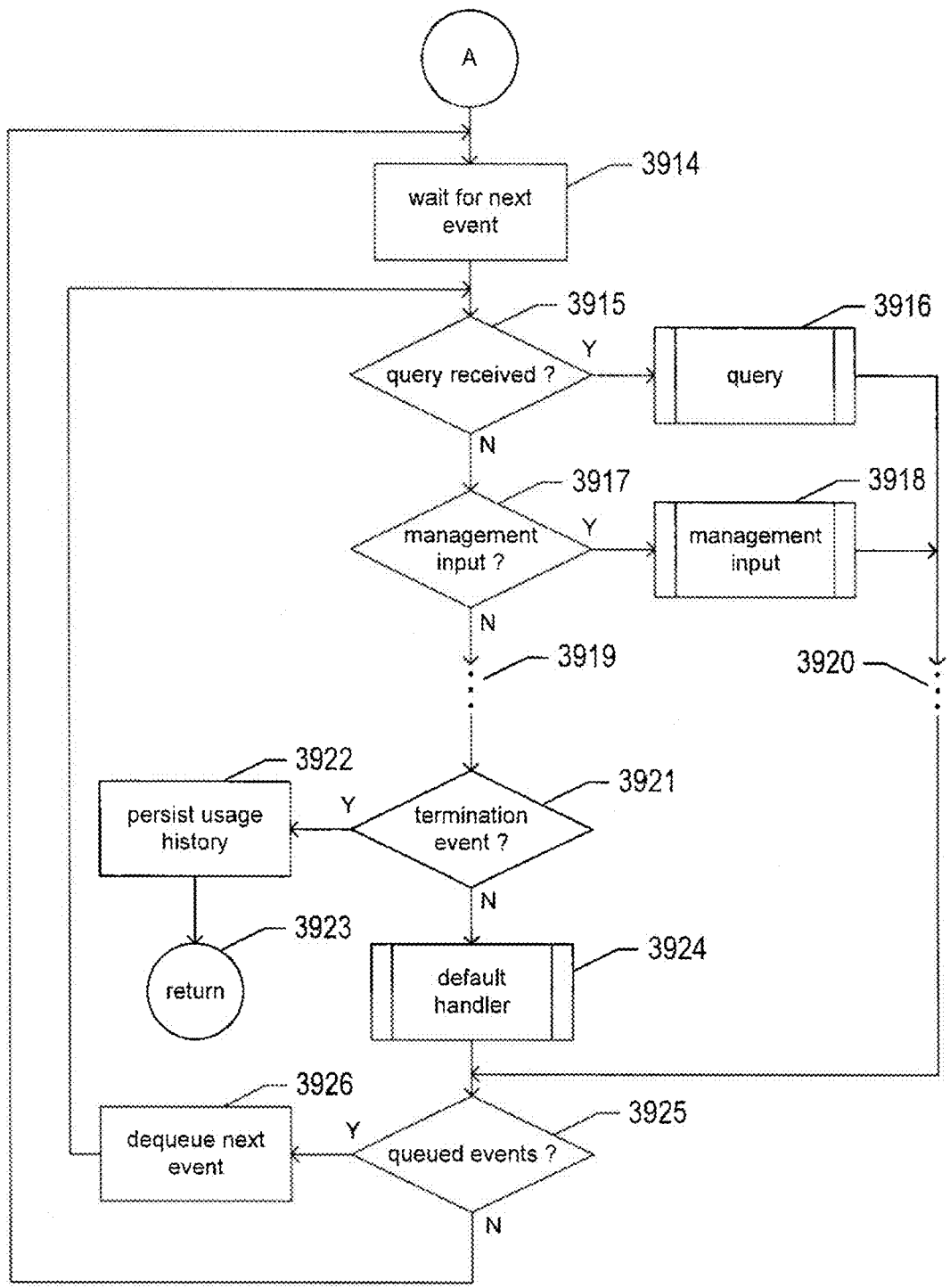
Figure 39C:
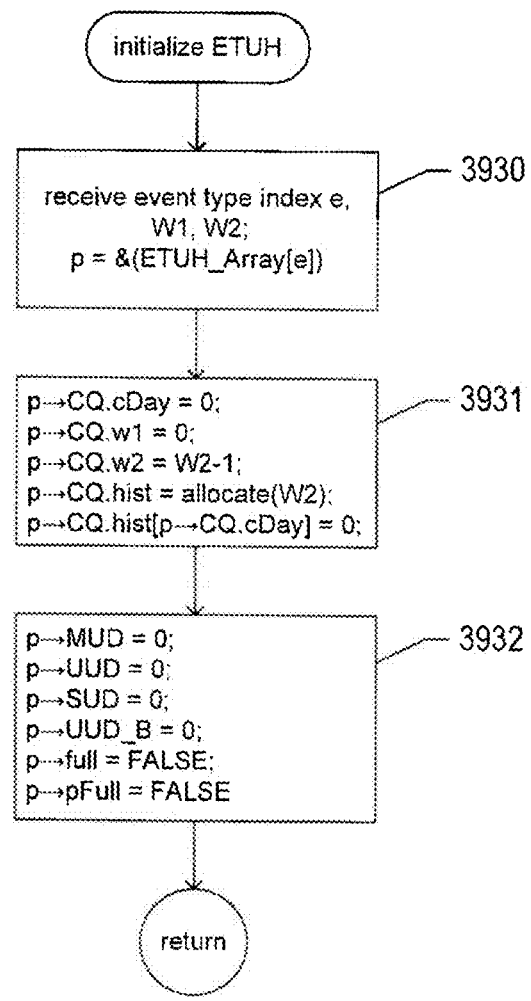

FIG. 39C provides a control-flow diagram for the routine "initialize ETUH," called in step 3910 of FIG. 39A. In step 3930, an index e for an ETUH is received, along with time-window parameters W1 and W2, and a pointer p is sent to point to the ETUH with index e. Then, in steps 3931 and 3932, the various elements of the ETUH data structure referenced by pointer p are initialized. Note that, initially, both the cDay and w1 CQ pointers are initialized to 0 and the w2 CQ pointer is initialized to one less than the size of the CQ.

Figure 39D:
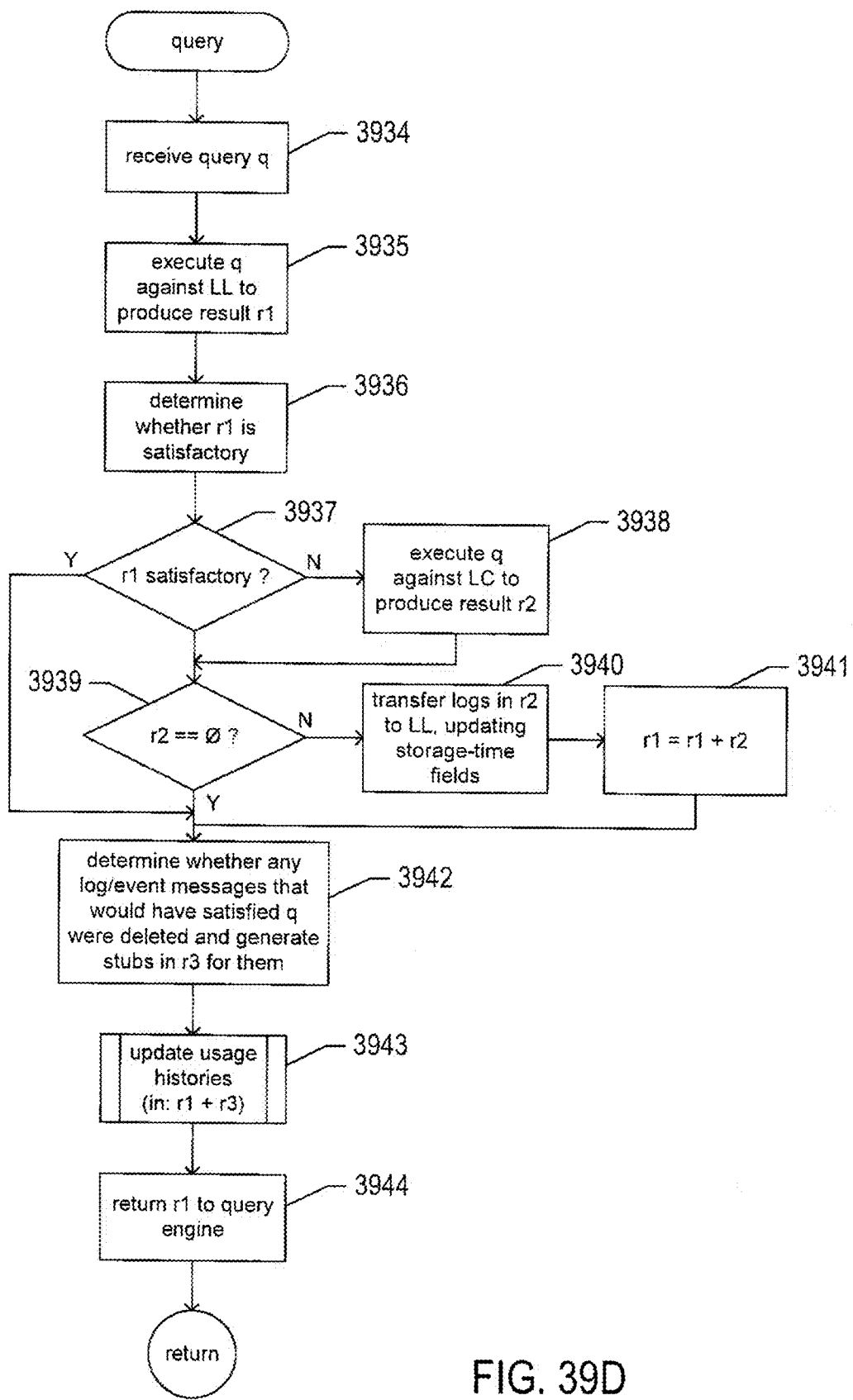

FIG. 39D provides a control-flow diagram for the routine "query," called in step 3916 of FIG. 39A. In step 3934, the routine "query" receives a query q. In step 3935, the routine "query" executes query q against the log/event messages stored in the LL to produce a result set of processed log/event messages r1. In step 3936, the routine "query" determines whether or not result r1 is satisfactory. Various criteria for a satisfactory result include the number of returned processed log/event messages and whether or not there is an expectation that a significant number of additional processed log/event messages that would be retrieved by the query q are currently resident in the LC. When the result set r1 is not satisfactory, as determined in step 3937, query q is executed against the log/event messages stored in the LC to produce a result set of returned processed log/event messages r2, in step 3938. When result set r2 is not empty, as determined in step 3939, the query manager transfers the processed log/event messages in the result set r2 to the LL, updating the storage-time fields of those messages, in step 3940, and adds the processed log/event messages in result set r2 to result set r1, in step 3941. In step 3942, the query manager determines whether any log/event messages that would have satisfied query q were deleted from the enhanced log-database subsystem and, if so, generates stubs for these processed log/event messages and places the stubs in the set r3. The stubs allow for estimation of event-type usage delays from log/event messages including the deleted log/event messages. In step 3943, the query manager calls a routine "update usage histories" to update the usage-delay histories maintained by the enhanced log-database subsystem. In step 3944, the processed log/event messages in result set r1 are returned to the log/event message query subsystem (1412 in FIG. 14).

Figure 39E:
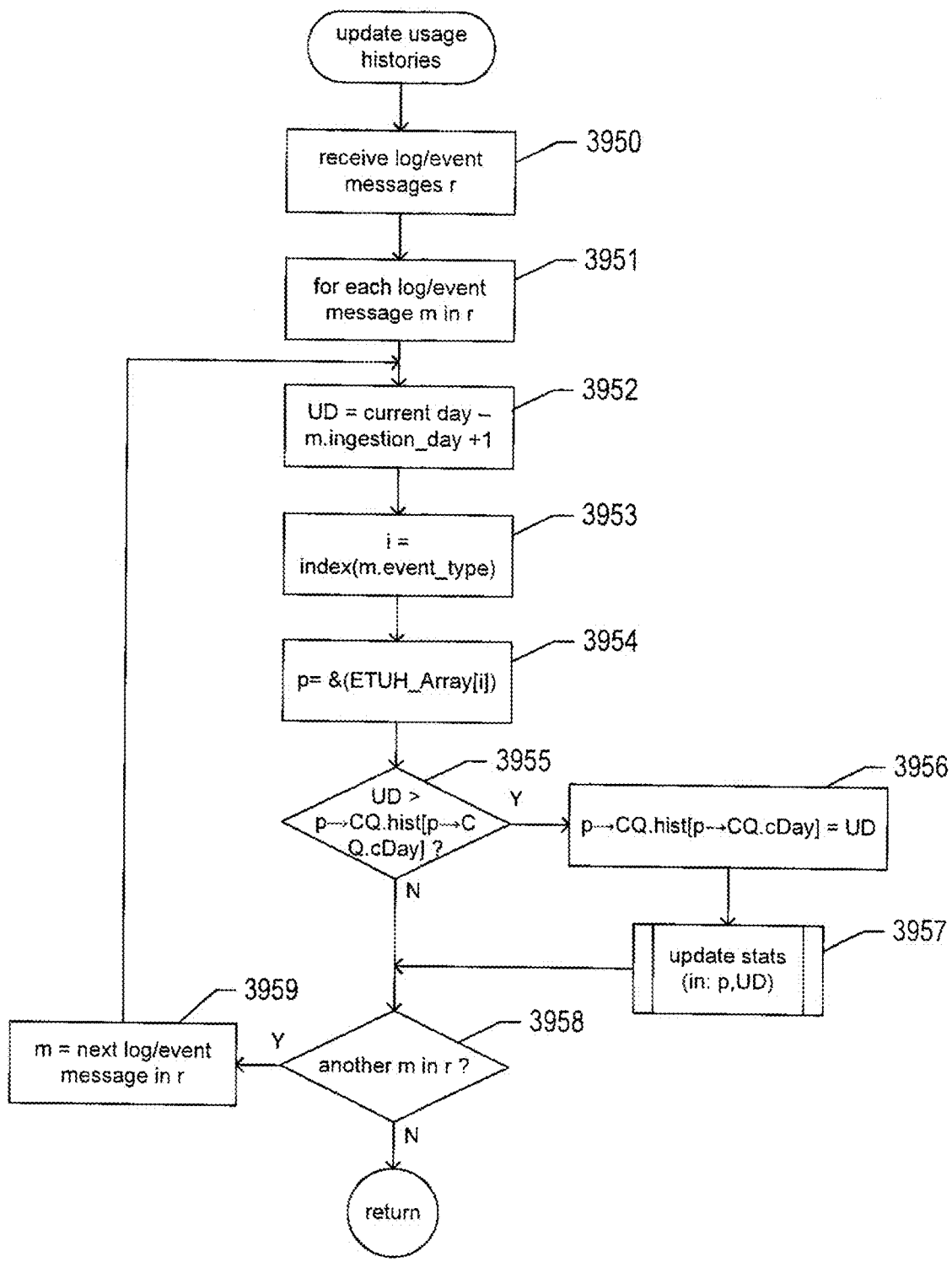

FIG. 39E provides a control-flow diagram for the routine "update usage histories," called in step 3943 of FIG. 39D. In step 3950, the routine "update usage histories" receives a set of log/event messages r. In the for-loop of steps 3951-3959, each log/event message m in the set of log/event messages r is considered. In step 3952, the routine "update usage histories" computes the usage delay for currently considered log/event message m. In steps 3953-3954, the routine "update usage histories" initializes a pointer p to reference the ETUH data structure corresponding to the event type of currently considered log/event message m. When the computed usage-delay for the currently considered log/event message m is greater than the event-type usage delay for the current day stored in the CQ, as determined in step 3955, the event-type usage delay for the current day is updated to the usage delay computed for the currently considered log/event message m, in step 3956. A routine "update stats" is called in step 3957. The for-loop of steps 3951-3959 iterates until all of the log/event messages in the received set of log/event messages r have been processed.

Figure 39F:
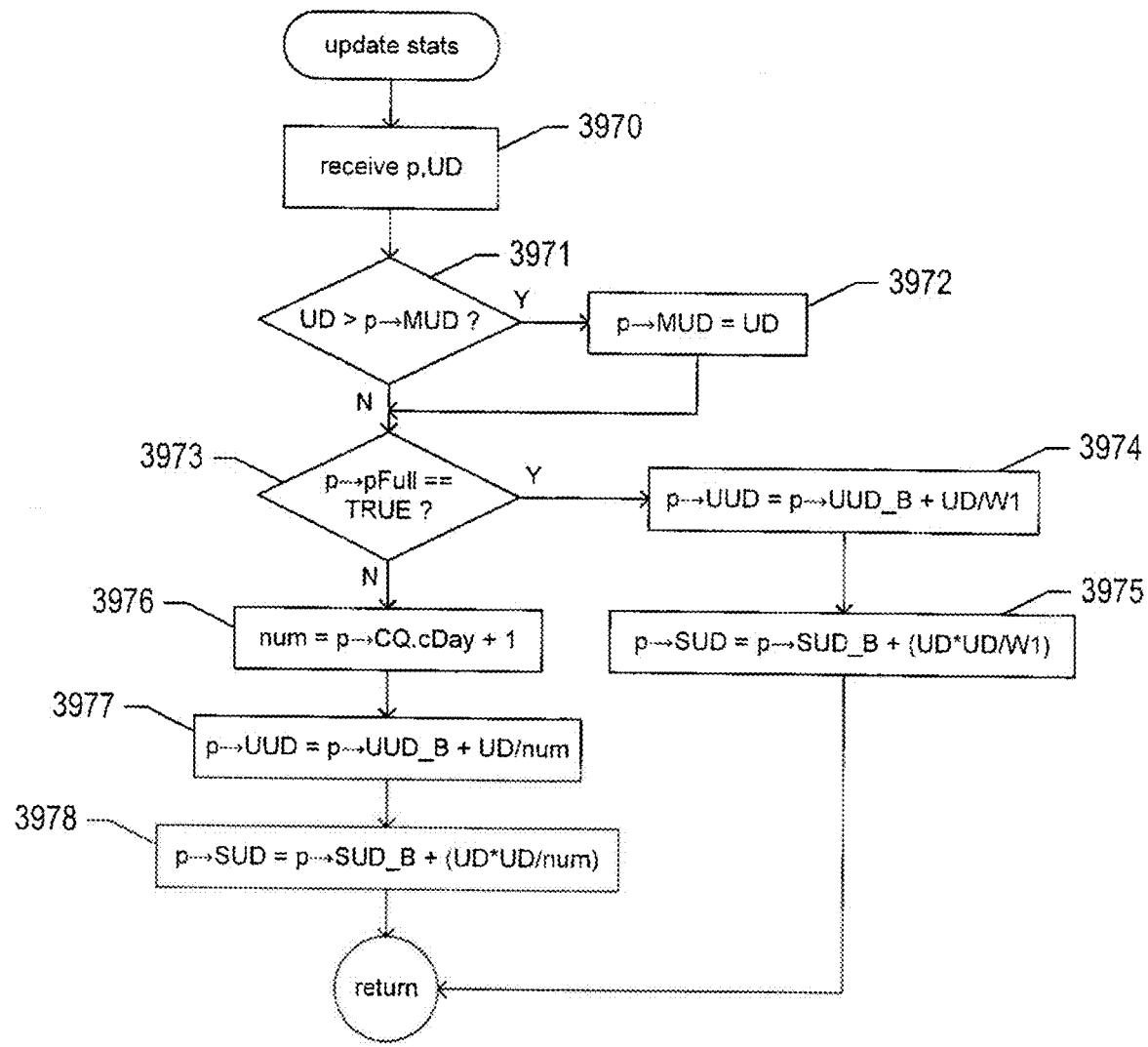

FIG. 39F provides a control-flow diagram for the routine "update stats," called in step 3956 of FIG. 39A. In step 3970, the routine "update stats" receives a pointer to an ETCH data structure and a usage delay for a log/event message with an event type corresponding to the ETUH data structure. When the received usage delay is greater than the value in the MUD element of the ETUH referenced by pointer p, as determined in step 3971, the MUD element of the ETUH is updated to contain the received usage delay, in step 3972. When the pFull element of the ETUH contains the Boolean value TRUE, as determined in step 3973, the UUD element of the ETUH is updated, in step 3974, via a simple-moving-average technique. The simple-moving-average technique updates a computed average across an ordered sequence of data points based on a fixed-length time-window extending backwards, in time, from the current data point. The UUD_B element contains the difference between the UUD for the previous day and the previous day's final usage-delay value divided by W1. Adding UD/W1 to UUD_B generates the current UUD for the current day. Similarly, the SUD element of the ETUH is updated, in step 3975, via the simple-moving-average technique. When the pFull element of the ETUH contains the Boolean value FALSE, as determined in step 3973, the UUD and SUD elements of the ETUH are updated, in steps 3976-3978, by a cumulative moving average technique. The cumulative-moving-average technique recomputes the average of a set of data points following each addition of a successive data point to the set.

Figure 40A:
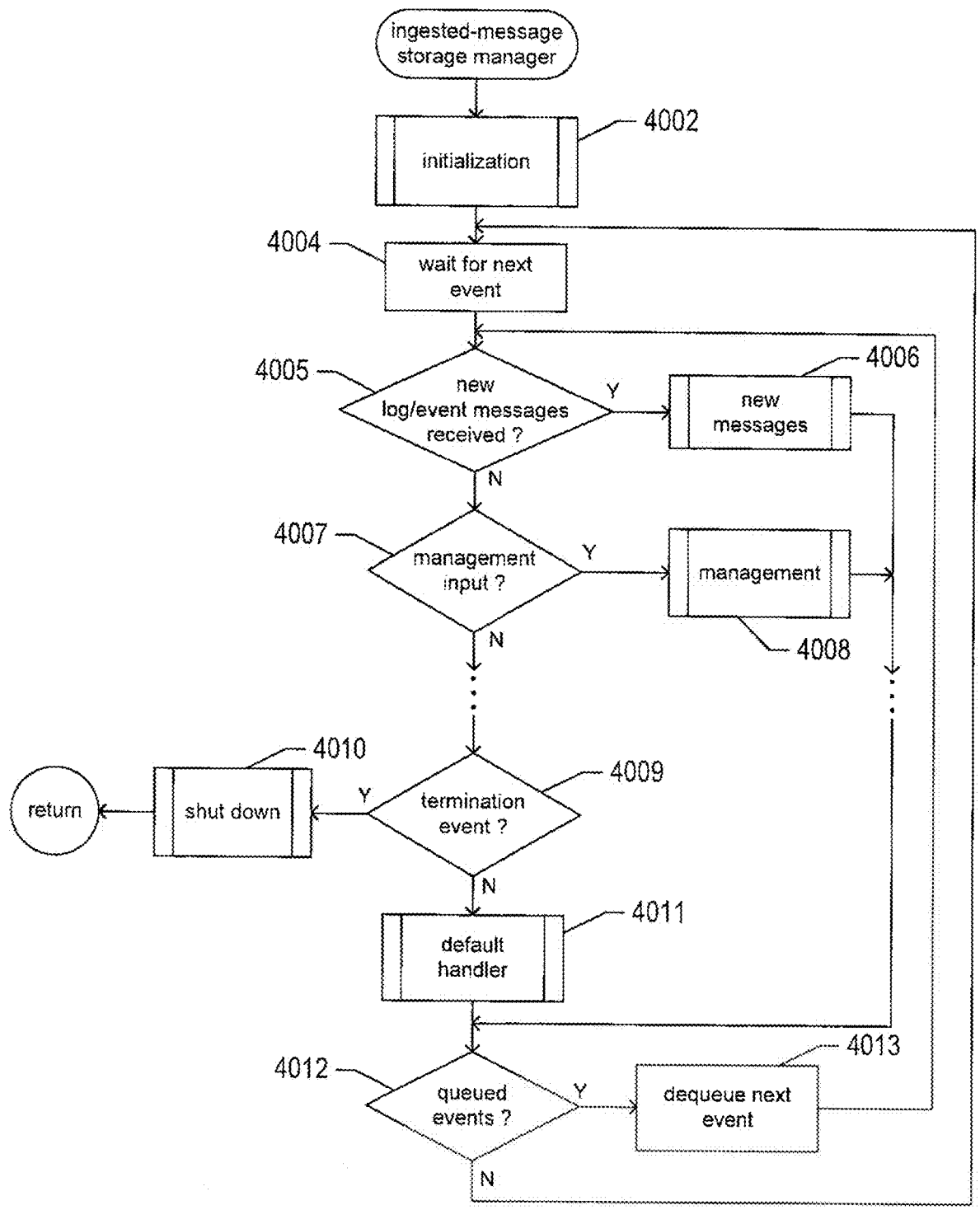
FIGS. 40A-B provide control-flow diagrams that illustrate operation of the ingested-message storage manager (3604 in FIG. 36).
Figure 40B:
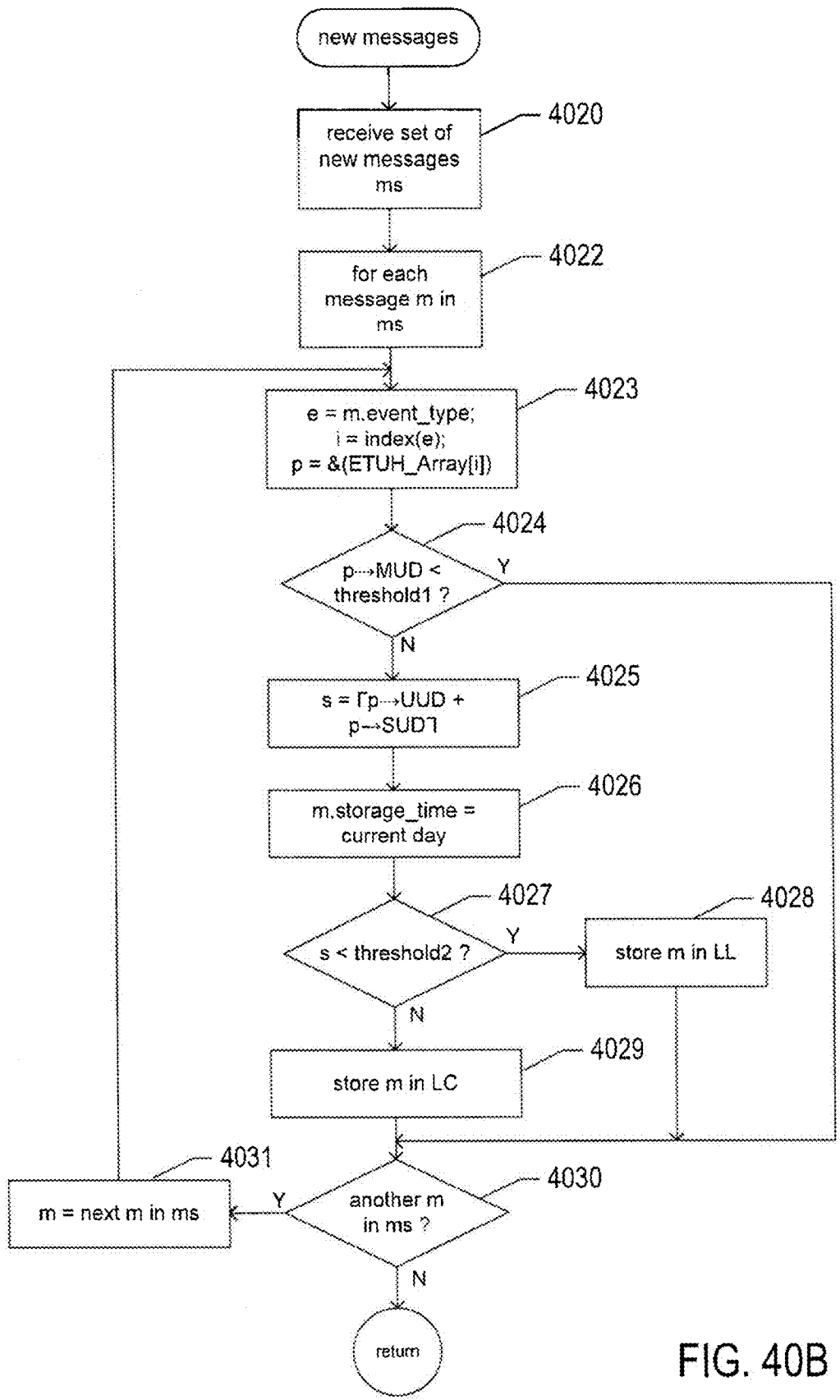

FIGS. 40A-B provide control-flow diagrams that illustrate operation of the ingested-message storage manager (3604 in FIG. 36). The ingested-message storage manager, like the query manager and like the stored message manager, discussed below, is implemented as an initial initialization step 4002 followed by an event loop of steps 4004-4013, similar to steps in the event loop for the query manager shown in FIG. 39B. The routine "new messages" is called, in step 4006, to handle new processed log/event messages input to the ingested-message storage manager by the message-ingestion-and-processing subsystem (1408 in FIG. 14).

FIG. 40B provides a control-flow diagram for the routine "new messages." called in step 4006 of FIG. 40A. In step 4020, the routine "new messages" receives a set of new messages ms. In the for-loop of steps 4022-4031, the routine "new messages" processes each log/event message m in the set ms. In step 4023, the routine "new messages" sets a pointer p to reference the ETUH for the event type of the currently considered log/event message m. When the MUD for the event type is less than the first threshold, there is a very low probability that the message will subsequently be retrieved from the enhanced log-database subsystem. Therefore, when the MUD for the event type is less than a first threshold, as determined in step 4024, the message is dropped rather than being stored in the enhanced log-database subsystem. In step 4025, local variable s is set to the ceiling of the sum of the UUD and SUD for the event type of the currently considered log/event message m. In step 4026, the storage_time field of the currently considered log/event message m is set to the current day. When the value in local variable s is less than a second threshold value, there is a high likelihood that the currently considered log/event message will be retrieved from storage in the near future. Therefore, when the value in local variable s is less than a second threshold value, as determined in step 4027, the currently considered log/event message m is stored in the LL, in step 4028. Otherwise, in step 4029, the currently considered log/event message is stored in the LC. The for-loop of steps 4022-4031 iterates until all messages in the received set of messages ms are handled.

Figure 41A:
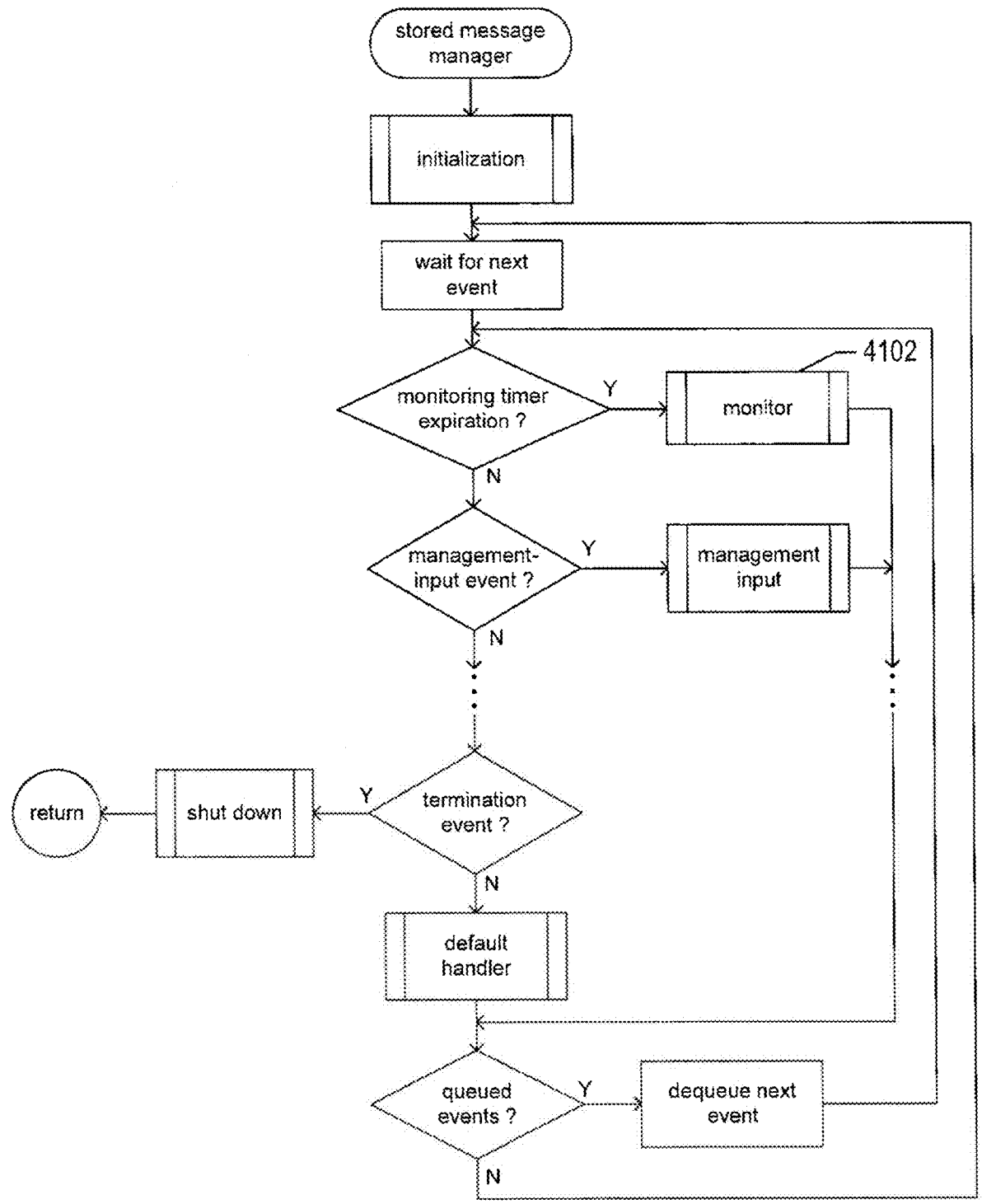
FIGS. 41A-F provide control-flow diagrams that illustrate operation of the stored-message manager (3608 in FIG. 36).

FIGS. 41A-F provide control-flow diagrams that illustrate operation of the stored-message manager (3608 in FIG. 36). FIG. 41A illustrates the underlying event loop of the stored-message-manager implementation, similar to the event loops discussed above with reference to FIG. 40A and FIG. 39B. In step 4102, a routine "monitor" is called in response to expiration of a monitoring timer. The routine "monitor" implements periodic monitoring of the processed log/event messages stored by the enhanced log-database subsystem in order to purge no longer needed processed log/event messages and to transfer processed log/event messages between the storage components of the enhanced log-database subsystem.

Figure 41B:
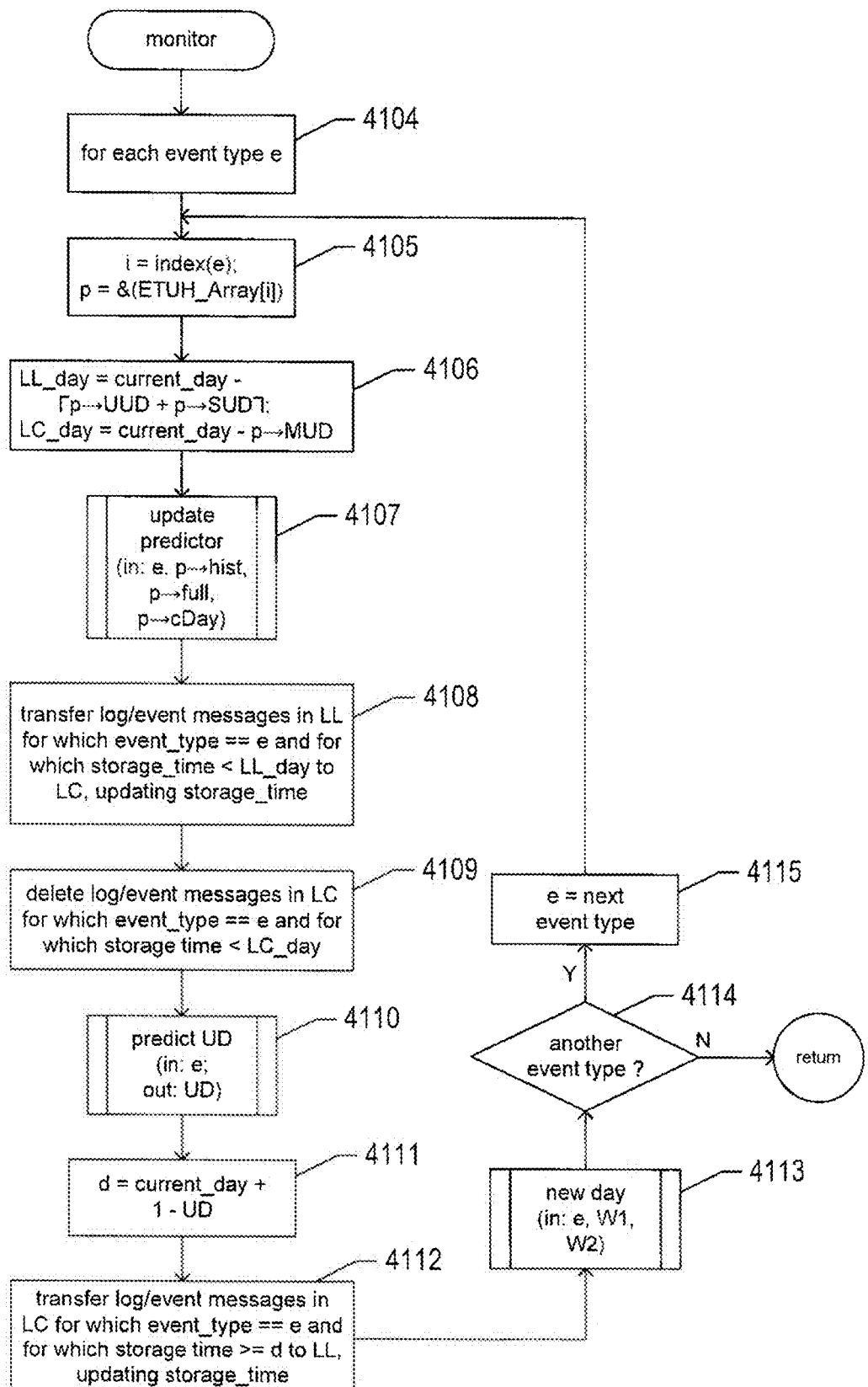

FIG. 41B provides a control-flow diagram for the routine "monitor." called in step 4102 of FIG. 41A. This routine is generally called at a point in time near to the transition from one day to the next day. The routine "monitor" comprises a for-loop of steps 4104-4115. The for-loop of steps 4104-4115 considers each event type e. In step 4105, the routine "monitor" sets a pointer p to reference the ETUH for the currently considered event type. Local variables LL_day and LC_day are set to the difference between the current day and the ceiling of UUD+SUD and to the difference between current day and the MUD, respectively, in step 4106. In step 4107, a routine "update predictor" is called. This routine uses the current usage-delay information for the currently considered event type to update an ARIMA-based or neuro-network-based event-type usage-delay predictor that predicts the event-type usage delays for the day following the current day. The update consists of the most recent observed usage delays. Predictors, as discussed above, are generally accurate only for a period of time extending into the future from the most recent observed data point, so it is important to continuously update a predictor. In step 4108, log/event messages of the currently considered event type currently residing in the LL with storage times greater than the ceiling of UUD SUD for the currently considered event type are transferred from the LL to the LC, since they have already resided in the LL for greater than their initial retention times. The storage time fields of the transferred log/event messages are updated with the current day. In step 4109, log/event messages of the currently considered event type which have resided in the LC for greater than MUD days are deleted, since these log/event messages have resided in the LC for a period of time equal to, or greater than, their retention periods. In step 4110, a routine "predict UD" is called to predict the event-type usage delay for the currently considered event type for the day following the current day. In step 4111, local variable d is set to the difference between the sum of the current day and l and the predicted usage delay. In step 4112, the stored message manager transfers log/event messages of the currently considered event type currently residing in the LC for which the storage time is greater than or equal to d to the LL, to anticipate a likely need to retrieve those log/event messages from the enhanced log-database subsystem on the following day. The storage_time fields of the transferred log/event messages are updated with the current day. In step 4113, a routine "new day" is called in order to transition the ETUH for the currently considered event type to the next day.

Figure 41C:
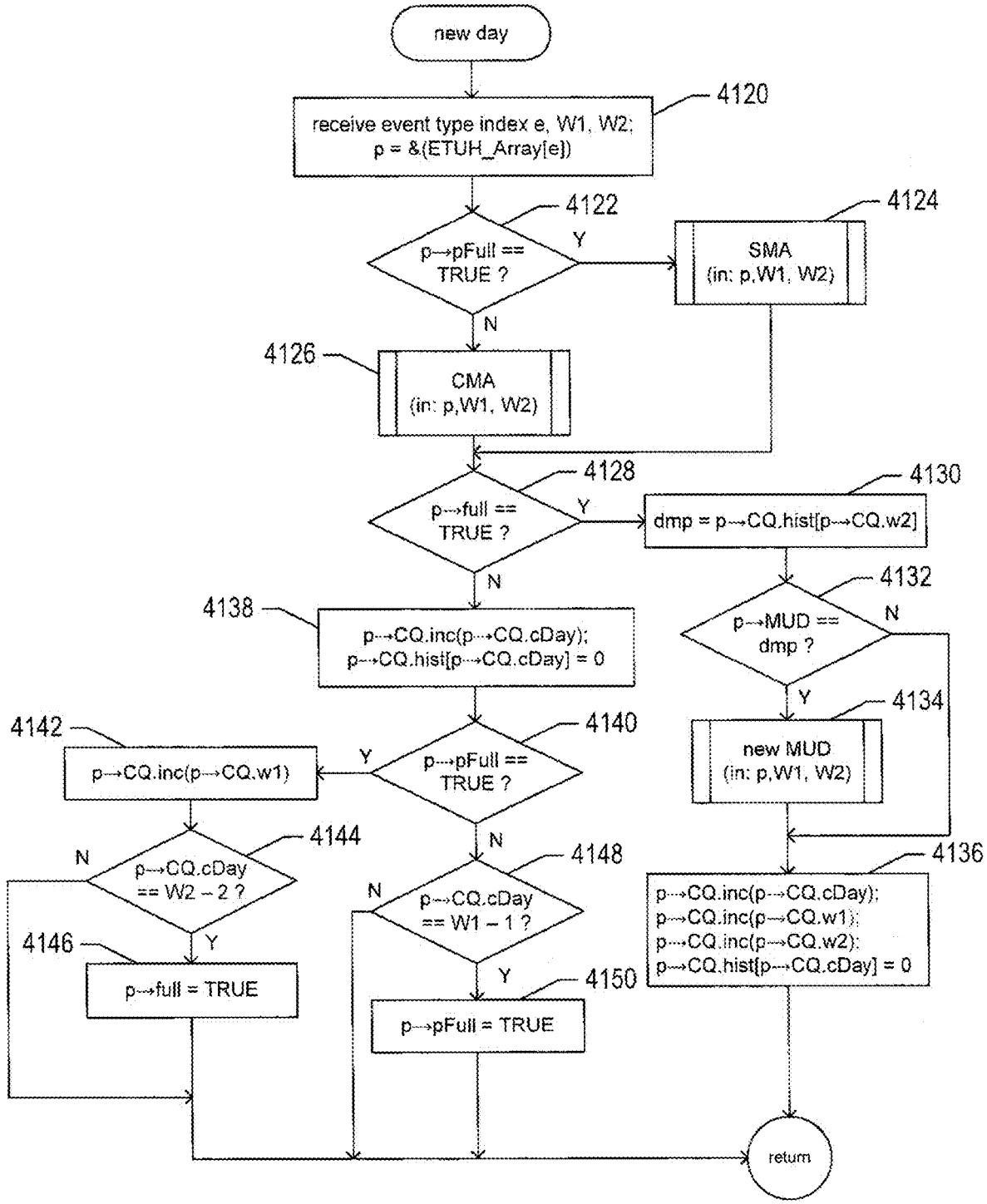

FIG. 41C provides a control-flow diagram for the routine "new day." called in step 4113 of FIG. 41B. In step 4120, the routine "new day" receives an event-type index e and the parameters W1 and W2. In addition, a pointer p is set to reference the ETUH for the event type with event-type index e. When the CQ of the ETUH is sufficiently filled so that usage-delay historical data for time window $w_1$ is present, as determined in step 4122, a routine "SMA" is called, in step 4124, to update values for the simple-moving-average technique stored in the ETUH. Otherwise, in step 4126, a routine "CMA" is called to update values for the cumulative-moving-average technique stored in the ETUH. When the CQ in the ETUH is full, as determined in step 4128, the local variable dmp is set to the least-recent event-type usage delay stored in the CQ, in step 4130. This usage-delay data point will be dropped in the transition to the next day. When the MUD for the event type with index e is equal to the value in dmp, as determined in step 4132, a routine "new MUD" is called, in step 4134, to determine a new MUD for the ETUH. In step 4136, the CQ pointers are incremented and the event-type usage delay in the element referenced by the CQ pointer cDay is set to 0. When the CQ of the ETUH is not full, as determined in step 4128, the CQ pointer cDay is incremented and the event-type usage delay referenced by the incremented CQ pointer cDay is set to 0, in step 4138. When the CQ is partially full, as determined in step 4140 the CQ pointer w1 is incremented, in step 4142. If the CQ pointer cDay is now equal to W2-2, as determined in step 4144, the ETUH element full is set to TRUE, in step 4146. However, when the CQ of the ETUH is not partially full, as determined in step 4140, and when the CQ pointer cDay is not equal to W1-1, as determined in step 4148, the pFull element of the ETUH is set to TRUE, in step 4150.

Figure 41D:
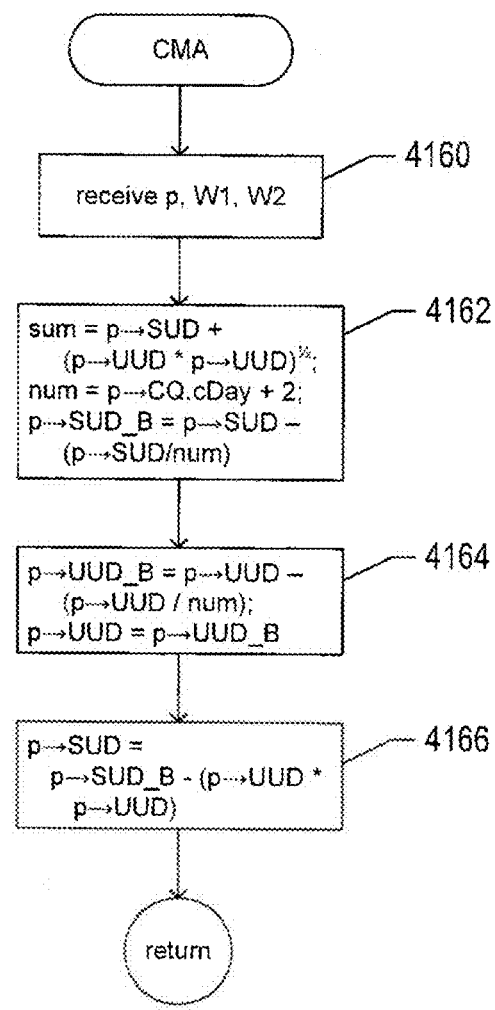
Figure 41E:
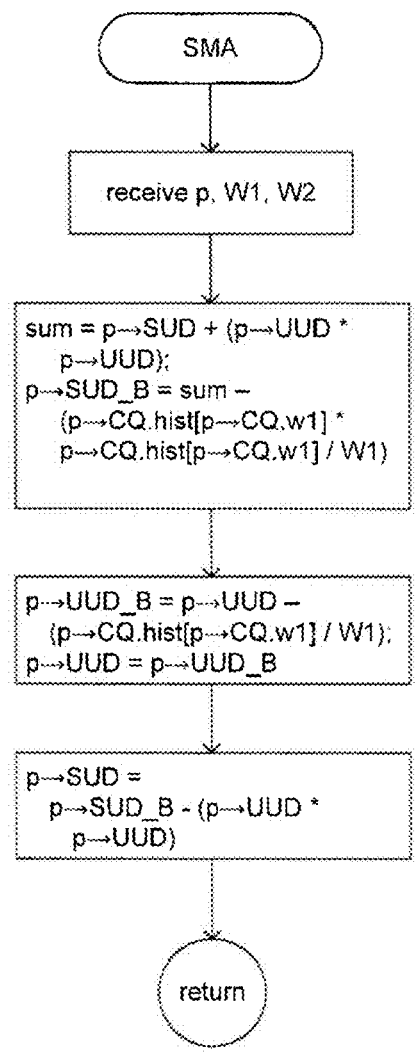

FIG. 41D provides a control-flow diagram for the routine "CMA," called in step 4126 of FIG. 41C. In step 4160, the routine "CMA" receives a pointer p to an ETUH data structure and the two parameters W1 and W2. In step 4162, the ETUH element SUD_B is updated to allow for application of the cumulative-moving-average technique to updated event-type usage delays for the current day. In step 4164, the ETUH element UUD_B is similarly updated, and the ETUH element LD is updated assuming that the current event-type usage delay for the current day is 0. In step 4166, the ETUH element UUD_B is updated assuming that the current event-type usage delay for the current day is 0. FIG. 41E provides a control-flow diagram for the routine "SMA." called in step 4126 of FIG. 41C. This routine is similar to the above-described routine "CMA." except that the updates to SUD, SUD_B, UUD, and UUD_B are made according to the simple-moving-average technique.

Figure 41F:
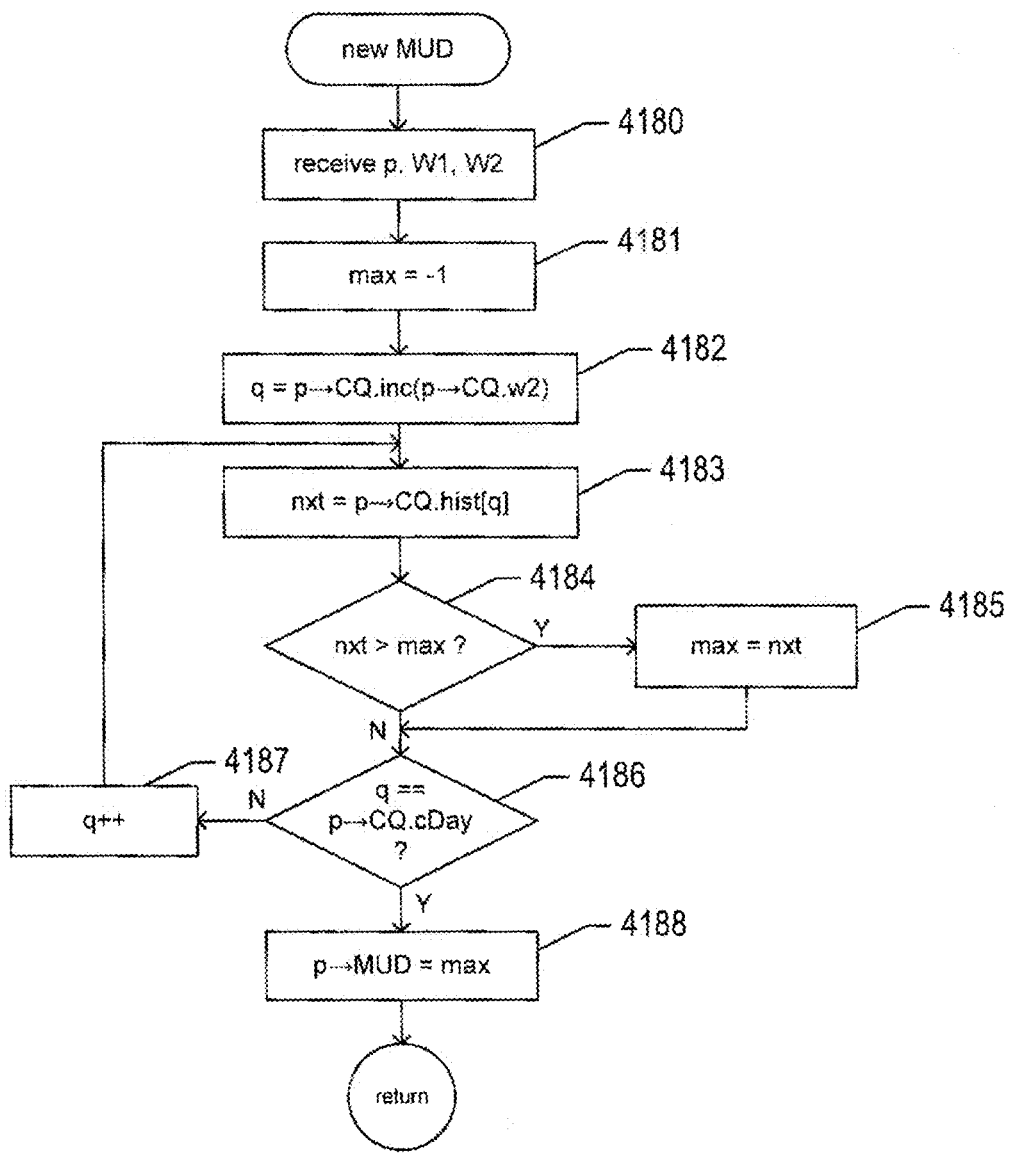

FIG. 41F provides a control-flow diagram for the routine "new MUD," called in step 4134 of FIG. 41C. In step 4160, the routine "CNA" receives a pointer p to an ETUH data structure and the two parameters W1 and W2. In step 4181, a local variable mar is set to −1. In step 4182, a pointer q is set to reference the second least recent event-type usage delay stored in the CQ. In step 4183, the local variable nxt is set to the event-type usage delay in the CQ element referenced by pointers p and q. When the value stored in local variable nxt is greater than the value stored in local variable mat, as determined in step 4184, local variable may is updated to the value stored in local variable nxt, in step 4185. When the pointer q is equal to the CQ pointer cDay, as determined in step 4186, the ETUH element IUD is set to the value stored in local variable max. Otherwise, pointer q is incremented, in step 4187, and control flows to step 4183.

The present invention has been described in terms of particular embodiments, it is not intended that the invention be limited to these embodiments. Modifications within the spirit of the invention will be apparent to those skilled in the art. For example, any of many different implementations of the log/event-message system can be obtained by varying various design and implementation parameters, including modular organization, control structures, data structures, hardware, operating system, and virtualization layers, and other such design and implementation parameters. For example, a variety of different techniques, other than the simple-moving-average and cumulative-moving-average techniques, can be used for updating the SUD and UUD statistics. The values of the various thresholds used to compute storage-retention periods may have different values in different implementations. In the discussed implementation, usage-delay values are computed based on time units of days, but, of course, the time units for usage delays and other statistics can differ with different implementations. In the described implementation, the enhanced log-database subsystem includes the logic for automatic determination of retention periods for log/event messages and enforces the retention periods, moves log/event messages between the LC and LL, and maintains usage-delay histories, but, in alternative implementations, one or more of these functionalities may instead be carried out by the message-processing-and-ingestion systems or by other components of the log/event-message system.

The invention claimed is:

1. An improved log/event-message system, within a distributed computer system, that collects log/event messages from log/event-message sources within the distributed computer system, stores the collected log event messages, and provides query-based access to the stored log/event-messages, the log/event-message system comprising:
   one or more message collectors, incorporated within one or more computer systems, each having one or more processors and one or more memories, which each receives log/event messages, processes the received log/event messages, and transmits the processed log/event messages to one or more message-ingestion-and-processing subsystems;
   the one or more message-ingestion-and-processing subsystems, incorporated within one or more computer systems, each having one or more processors and one or more memories, which each receives processed log/event messages from one or more of the one or more message collectors, processes the received processed log/event messages, and forwards processed log/event messages to a log-database subsystem;
   the log-database subsystem that receives processed log/event messages from one or more of the one or more message-ingestion-and-processing subsystems, automatically assigns retention periods to the received processed log/event messages, and manages storage of the received processed log/event messages for their assigned retention periods; and
   a log/event-message query subsystem that retrieves processed log/event messages from the log-database subsystem.

2. The log/event-message system of claim 1 wherein log/event-messages include text, alphanumeric values, and/or numeric values that represent various types of information, including notification of completed actions, errors, anomalous operating behaviors and conditions, various types of computational events, warnings, and other such information.

3. The log/event-message system of claim 1 wherein one or both of the one or more message collectors and the one or more message-ingestion-and-processing subsystems determine, during processing of received log/event messages, event types for the received log/event messages and associate the determined event types with the received log/event messages.

4. The log/event-message system of claim 3 wherein the log-database subsystem accesses:
   a low-latency processed log/event-message-storage component LL; and
   a low-cost processed log/event-message-storage component LC.

5. The log/event message system of claim 4
   wherein a log/event-message usage delay is equal to a sum of 1 and the difference, in time units, from a second time unit when the log/event-message is first retrieved from the log-database subsystem by the log/event-message query subsystem and a first time unit when the log/event-message is first received by the log/event message system; and
   wherein an event-type usage delay for a particular event type and a particular time unit is the maximum log/event-message usage delay for any log/event-message associated with the particular event type that is accessed during the particular time unit.

6. The log/event message system of claim 5 wherein the log-database subsystem additionally stores, for each different event type:
   a number W2 of event-type usage-delay values for successive time units extending from a current time unit backward in time to form a time window $w_2$;
   an MUD value, which is the maximum event-type usage delay within time window $w_2$;
   a UUD value, which is the average event-type usage delay within a time window $w_1$, contained within, and of shorter length than, time window $w_1$; and
   an SUD value, which is the standard deviation of the event-type usage delays within time window $w_1$.

7. The log/event message system of claim 6 wherein the log-database subsystem determines the retention period for a received, processed log/event message associated with an event type during a particular time unit by:
   when the MUD value for the event type is less than a first threshold value, determining the retention period to be 0, without storing the received, processed log/event message in either the LL or the LC;

when the MUD value for the event type is greater than or equal to the first threshold value,
setting s to the ceiling of the sum of the UUD value and the SUD value for the event type,
determining the retention period to be s,
when s is less than a second threshold, storing the received, processed log/event message in the LL, and
when s is greater than or equal to the second threshold, storing the received, processed log/event message in the LC.

8. The log/event message system of claim 6 wherein the log-database subsystem updates, for each new time unit, the stored event-type usage-delay values, the MUD value, the UUD value, and the SUD value for each event type.

9. The log/event message system of claim 8 wherein the log-database subsystem updates the UUD and SUD values using one of a cumulative-moving-average and a simple-moving-average update method.

10. The log/event message system of claim 8 wherein, in addition to updating the stored event-type usage-delay values, the MUD value, the UUD value, and the SUD value for each event type, the log-database subsystem predicts, for each event type, a future event-type usage delay and transfers log/event messages of the event type in the LC expected to be accessed during a subsequent time unit, based on the predicted future event-type usage delay, to the LL.

11. The log/event message system of claim 8 wherein, in addition to updating the stored event-type usage-delay values, the MUD value, the UUD value, and the SUD value for each event type, the log-database subsystem removes processed log/event messages from the LC which have resided in the LC for a period of time greater than the MUD value for the event type associated with the processed log/event messages.

12. The log/event message system of claim 8 wherein, in addition to updating the stored event-type usage-delay values, the MUD value, the UUD value, and the SUD value for each event type, the log-database subsystem transfers log/event messages that have resided in the LL for a period of time equal to or greater than their retention periods to the LC.

13. The log/event message system of claim 8 wherein, in addition to updating the stored event-type usage-delay values, the MUD value, the UUD value, and the SUD value for each event type, the log-database subsystem
predicts, for each event type, a future event-type usage delay and transfers log/event messages of the event type in the LC expected to be accessed during a subsequent time unit, based on the predicted future event-type usage delay, to the LL;
removes processed log/event messages from the LC which have resided in the LC for a period of time greater than the MUD value for the event type associated with the processed log/event messages; and
transfers log/event messages that have resided in the LL for a period of time equal to or greater than their retention periods to the LC.

14. The log/event message system of claim 6 wherein the log-database subsystem determines the retention period for a received, processed log/event message associated with an event type during a particular time unit by:
when the MUD value for the event type is less than a first threshold value, determining the retention period to be 0, without storing the received, processed log/event message in either the LL or the LC;
when the MUD value for the event type is greater than or equal to the first threshold value,
setting s to the ceiling of the sum of the UUD value and the SUD value for the event type,
determining the retention period to be s,
when s is less than a second threshold, storing the received, processed log/event message in the LL, and
when s is greater than or equal to the second threshold, storing the received, processed log/event message in the LC.

15. The log/event message system of claim 6 wherein the log-database subsystem updates, for each new time unit, the stored event-type usage-delay values, the MUD value, the UUD value, and the SUD value for each event type, updating the UUD and SUD values using one of a cumulative-moving-average and a simple-moving-average update method.

16. A method carried out by a log-database subsystem within a log/event-message system that includes one or more message collectors, one or more message-ingestion-and-processing subsystems, and a log/event-message query subsystem, the method comprising:
receiving a processed log event message from one of the message-ingestion-and-processing subsystems that is associated with an event type;
determining a retention period for the received, processed log/event message using historical event-type usage-delay information;
when the determined retention period is less than or equal to a threshold value, storing the processed log/event message in a low-latency processed log/event-message-storage component LL; and
when the determined retention period is greater than the threshold value, storing the processed log/event message in a low-cost processed log/event-message-storage component LC.

17. The method of claim 16
wherein the one or more message collectors are each incorporated within one or more computer systems, each having one or more processors and one or more memories, and each message collector receives log/event messages, processes the received log/event messages, and transmits the processed log/event messages to one or more of the one or more message-ingestion-and-processing subsystems;
wherein the one or more message-ingestion-and-processing subsystems are each incorporated within one or more computer systems, each having one or more processors and one or more memories, and each message-ingestion-and-processing subsystem receives processed log/event messages from one or more of the one or more message collectors, processes the received processed log/event messages, and forwards processed log/event messages to the log-database subsystem;
wherein the log-database subsystem receives processed log/event messages from one or more of the one or more message-ingestion-and-processing subsystems, automatically assigns retention periods to the received processed log/event messages, and manages storage of the received processed log/event messages for their assigned retention periods; and
wherein the log/event-message query subsystem retrieves processed log/event messages from the log-database subsystem.

18. The method of claim 16
wherein a log/event-message usage delay is equal to a sum of 1 and the difference, in time units, from a second time unit when the log/event-message is first retrieved from the log-database subsystem by the log/ event-message query subsystem and a first time unit when the log/event-message is first received by the log/event message system; and wherein an event-type usage delay for a particular event type and a particular time unit is the maximum log/event-message usage delay for any log/event-message associated with the particular event type that is accessed during the particular time unit.

19. The method of claim 18 wherein the log-database subsystem stores, for each different event type:
- a number W2 of event-type usage-delay values for successive time units extending from a current time unit backward in time to form a time window $w_2$;
- an MUD value, which is the maximum event-type usage delay within time window $w_2$;
- a UUD value, which is the average event-type usage delay within a time window $w_1$, contained within, and of shorter length than, time window $w_1$; and
- an SUD value, which is the standard deviation of the event-type usage delays within time window $w_1$.

20. A physical data-storage device that stores computer instructions that, when executed by processors within computer systems of a log/event-message system that includes one or more message collectors, one or more message-ingestion-and-processing subsystems, a log-database subsystem, and a log/event-message query subsystem within a distributed computer system, control the log-database subsystem to:
- receive a processed log/event message from one of the message-ingestion-and-processing subsystems that is associated with an event type;
- determine a retention period for the received, processed log/event message using historical event-type usage-delay information;
- when the determined retention period is less than or equal to a threshold value, store the processed log/event message in a low-latency processed log/event-message-storage component LL; and
- when the determined retention period is greater than the threshold value, store the processed log/event message in a low-cost processed log/event-message-storage component LC.

* * * * *